United States Patent [19]

Callahan et al.

[11] Patent Number: 5,319,301
[45] Date of Patent: Jun. 7, 1994

[54] INDUCTORLESS CONTROLLED TRANSITION AND OTHER LIGHT DIMMERS

[76] Inventors: Michael Callahan, 720 Greenwich, New York, N.Y. 10014; John K. Chester, 78 Washington Ave., High Bridge, N.J. 08829; Robert M. Goddard, 448 E. 20th St, New York, N.Y. 10009

[21] Appl. No.: 18,000

[22] Filed: Feb. 11, 1993

Related U.S. Application Data

[63] Continuation of Ser. No. 797,718, Nov. 25, 1991, abandoned, and a continuation-in-part of Ser. No. 336,014, Apr. 10, 1989, and a continuation-in-part of Ser. No. 943,381, Dec. 17, 1986, Pat. No. 4,823,069, and a continuation-in-part of Ser. No. 640,978, Aug. 15, 1984, Pat. No. 4,633,161, said Ser. No. 797,718, is a continuation of Ser. No. 615,760, Nov. 19, 1990, abandoned.

[51] Int. Cl.⁵ ............................................. G01N 27/82
[52] U.S. Cl. ................................. 323/235; 323/242; 323/239; 315/294; 307/647
[58] Field of Search ............... 323/235, 237, 239, 242, 323/267, 268, 271; 315/195, 199, 294, 295, 312, 317; 307/647

[56] References Cited

U.S. PATENT DOCUMENTS

| | | | |
|---|---|---|---|
| 3,142,781 | 7/1964 | Izenour | 315/194 |
| 3,193,728 | 7/1965 | Skirpan | 315/251 |
| 3,200,327 | 8/1965 | Fleming | 323/89 |
| 3,243,653 | 3/1966 | Locklin | 315/194 |
| 3,256,463 | 2/1966 | Davis | 315/158 |
| 3,274,484 | 9/1966 | Gebhardt et al. | 323/93 |
| 3,397,344 | 8/1968 | Skirpan | 315/194 |
| 3,667,030 | 5/1972 | Gordon et al. | 323/24 |
| 3,691,404 | 9/1972 | Swygert, Jr. | 307/252 |
| 3,706,913 | 12/1972 | Malatchi | 323/237 |
| 3,719,858 | 3/1973 | Gilbreath | 317/16 |
| 3,733,528 | 5/1973 | Gilbreath | 323/242 |
| 3,821,601 | 6/1974 | Kappenhagen et al. | 315/311 |
| 3,845,351 | 10/1974 | von Ballmoas et al. | 315/293 |
| 3,897,652 | 4/1975 | Billings | 307/252 OA |
| 3,898,516 | 8/1975 | Nakasone | 315/194 |
| 3,924,120 | 12/1975 | Cox, III | 250/199 |
| 3,943,397 | 3/1976 | Yancey | 315/317 |

(List continued on next page.)

FOREIGN PATENT DOCUMENTS

| | | |
|---|---|---|
| 143528 | 6/1981 | European Pat. Off. |
| 56-148172 | 11/1981 | Japan |
| 1332412 | 11/1971 | United Kingdom |

OTHER PUBLICATIONS

"Using VMOS for Direct and Reverse Phase Control!", C. F. Christiansen, M. Benedetti, Rev. Telegr. Electron. (Argentina), vol. 69, No. 819, pp. 499–503 (Jun. 1981).

"Power FET Controlled Dimmer for Incandescent Lamps", C. F. Christiansen, M. Benedetti, IEEE Trans. Ind. Appl. (USA), vol. 1A-19, No. 3, pt. 1, pp. 323–327, (May–Jun. 1983).

(List continued on next page.)

*Primary Examiner*—Marc S. Hoff
*Attorney, Agent, or Firm*—Kenyon & Kenyon

[57] ABSTRACT

A light dimmer with semiconductor power devices coupled between an alternating current supply and a lamp load, in the course of varying average power supplied to the lamp load, transitions the power devices under load between one and the other of substantially conductive and non-conductive conditions, increasing the duration of the transition by the power device itself from the minimum possible duration to reduce generated EMI. Undesirable effects of the high current demands of cold lamp filaments are reduced by initially increasing the conductive portion of half-cycles, relative to the proportion required to produce the desired amount of average power, while avoiding transitions at phase angles that would produce excessive losses. A transition shape may be employed in this mode and in normal operation that maximizes audible lamp noise suppression for a given level of thermal losses.

20 Claims, 35 Drawing Sheets

U.S. PATENT DOCUMENTS

| | | | |
|---|---|---|---|
| 3,990,000 | 11/1976 | Digneffe | 323/325 |
| 4,016,496 | 4/1977 | Eastcott | 328/35 |
| 4,057,751 | 11/1977 | Bonsignore et al. | 315/294 |
| 4,080,548 | 3/1978 | Johnson | 315/68 |
| 4,086,526 | 4/1978 | Grüdelbach | 323/34 |
| 4,219,761 | 8/1980 | Mustoe | 315/307 |
| 4,241,295 | 12/1980 | Williams, Jr. | 315/294 |
| 4,287,468 | 9/1981 | Sherman | 323/322 |
| 4,325,021 | 4/1982 | McMackin | 323/351 |
| 4,325,051 | 4/1982 | McMackin | 323/351 |
| 4,331,914 | 5/1982 | Huber | 323/324 |
| 4,355,309 | 10/1982 | Hughey et al. | 340/825.53 |
| 4,389,598 | 6/1983 | Smith | 315/291 |
| 4,392,187 | 7/1983 | Bornhorst | 363/233 |
| 4,417,183 | 11/1983 | Popard et al. | 315/291 |
| 4,423,478 | 12/1983 | Bullock et al. | 363/89 |
| 4,438,356 | 3/1984 | Fleisher | 307/571 |
| 4,447,765 | 5/1984 | Cote | 315/240 |
| 4,450,384 | 5/1984 | Krokaugger | 315/327 |
| 4,461,990 | 7/1984 | Bloomer | 323/235 |
| 4,484,190 | 11/1984 | Bedard | 340/825.57 |
| 4,500,802 | 2/1981 | Janutka | 307/571 |
| 4,504,779 | 3/1985 | Haman | 323/349 |
| 4,528,494 | 7/1985 | Bloomer | 323/237 |
| 4,540,893 | 9/1985 | Bloomer | 307/255 |
| 4,547,828 | 10/1985 | Bloomer | 361/86 |
| 4,567,425 | 1/1986 | Bloomer | 323/237 |
| 4,598,345 | 7/1986 | Kleeman | 362/233 |
| 4,617,508 | 10/1986 | Bloomer | 323/237 |
| 4,633,161 | 12/1986 | Callahan et al. | 323/242 |
| 4,649,302 | 3/1987 | Damiano | 307/584 |
| 4,688,154 | 8/1987 | Nilssen | 362/147 |
| 4,688,161 | 8/1987 | Covington | 363/37 |
| 4,689,547 | 8/1987 | Rowen et al. | 323/239 |
| 4,704,656 | 11/1987 | Neiger | 361/173 |
| 4,705,960 | 11/1987 | Lovrenich | 307/149 |
| 4,705,962 | 11/1987 | Kinoshita | 307/247.1 |
| 4,763,220 | 8/1988 | Belbel et al. | 361/93 |
| 4,823,069 | 4/1989 | Callahan et al. | 323/235 |
| 4,931,916 | 6/1990 | Callahan | 363/272 |
| 4,949,020 | 8/1990 | Warren et al. | 315/297 |
| 4,972,125 | 11/1990 | Cunningham et al. | 315/291 |
| 4,975,629 | 12/1990 | Callahan et al. | 323/235 |
| 4,977,484 | 11/1990 | Cunningham et al. | 361/429 |
| 4,984,143 | 1/1991 | Richardson | 362/293 |
| 4,987,348 | 1/1991 | Wong | 315/307 |
| 5,004,969 | 4/1991 | Schanin | 323/235 |
| 5,005,211 | 4/1991 | Yuhasz | 455/603 |
| 5,015,921 | 5/1991 | Carlson et al. | 315/208 |

OTHER PUBLICATIONS

"Bright New World?–Part III", M. Callahan, Lighting Dimensions magazine, vol. VII, No. 3, Jun. 1983, pp. 35–42.

TBA Technology, "Magic Lantern, The Low Voltage Solution" brochure, undated.

Lighting Methods, Inc., L86/I5M data sheet, undated.

Electronics Diversified, Inc., "Problem/Solution" USITT TD&T publication, Winter 1991, vol. XXVII, No. 1, p. 22.

Electronics Diversified, Inc., "Omega", Theatre Crafts Directory, Jun./Jul. 1988, vol. 22, No. 6, p. 69.

Comprehensive Video Supply Co. IR-1000 Dimmer listing, Lighting Dimensions 1985/86 Buyers Guide & Directory, Sep. 1, 1985, vol. IX, No. 5, p. 151.

"Product Report Union Connector's SU-1/DIGI-1" Reprinted from Theatre Crafts magazine, May 1984.

Union Connector Co., Inc., Series 2400 Wireless Remote Control Stage Lighting System data sheet, 1984.

"Skirpan Design Fills TV Gap" Reprinted from TV Technology, Aug. 1984.

Union Connector Co., Inc., Unitrol Dimming System brochure, 1986.

"Power Supply Aspects of Semiconductor Equipment", H. A. Gauper, Jr., J. D. Harden, Jr., A. M. McQuarrie, IEEE Spectrum (USA), vol. 8, No. 10, pp. 32–43, (Oct. 1971).

"Lamp Acoustical Noise and the Reverse Phase Controlled Dimmer", R. M. Burkhart, R. W. Burtness, 1971 Sixth Annual Meeting of the IEEE Industry and General Applications Group, Cleveland, Ohio, USA, Oct. 18–21, 1971 (New York, USA: IEEE 1971) pp. 949–966.

"Lamp Acoustical Noise and the Reverse Phase Controlled Dimmer", R. M. Burkhart, R. W. Burtness, IEEE Trans. Ind. Appl. (USA), vol. 1A-8, No. 1, pp. 84–88, (Jan.–Feb. 1972).

"Reverse Phase Control Dimmer for Incandescent Lighting", R. M. Burkhart, D. L. Ostrodka, Industrial Applications Society IEE-IAS Annual Meeting, Toronto, Ontario, Canada, Oct. 1–5 1978 (New York, USA: IEEE 1978) pp. 614–617.

"Reverse Phase Control Dimmer for Incandescent Lighting", R. M. Burkhart, D. L. Ostrodka, IEEE (List continued on next page.)

OTHER PUBLICATIONS

Trans. Ind. Appl. (USA), vol. 1A-5, No. 5, pp. 579-583, (Sep.-Oct. 1979).

Electro Controls, QD$^{tm}$ Series Dimmer brochure, undated.

Strand Lighting, Lightboard XP/DC90 Dimmer brochure, undated.

Vari-Lite, Inc. VL3 Wash Luminaire data sheet, 1987.

"Stage Lighting and the State of the Art in Twenty Years", J. F. Rubin, Lighting Dimensions magazine, vol. VII, No. 1, Mar. 1983, pp. 52-60.

"Bright New World? Tour System Design for the 1980s", M. Callahan, Lighting Dimensions magazine, vol. VII, No. 1, Mar. 1983, pp. 62-73.

"Dimming and Lighting Control . . . State of What Art?", J. M. Good III, International Technical Conference, Theatre, Television, and Film Lighting, Committee of Illuminating Engineering Society, Oct. 5, 1987, Montreal, Quebec, Canada.

Theatre Crafts magazine, vol. 20, No. 8, Oct. 1986, p. 14.

Production Arts Lighting, Inc. Model 96-2400 High Density Dimmer Rack data sheet, 83-V-6.

"Dimming Controls Provide Stage Production Sparkle", M. O'Neal, Contractor's Electrical Engineering magazine, vol. 39, No. 4, Apr. 1987, pp. 46-48.

"The ET Dimmer Test", John Huntington, Lighting Dimensions Magazine, vol. XV, No. 7, Oct. 1991, pp. 94-105.

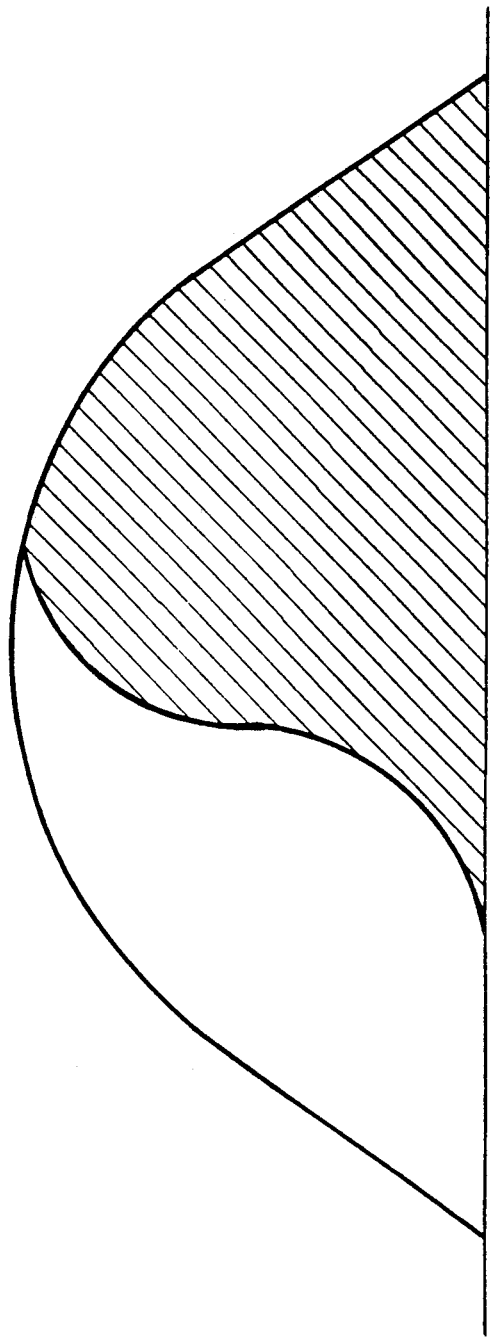

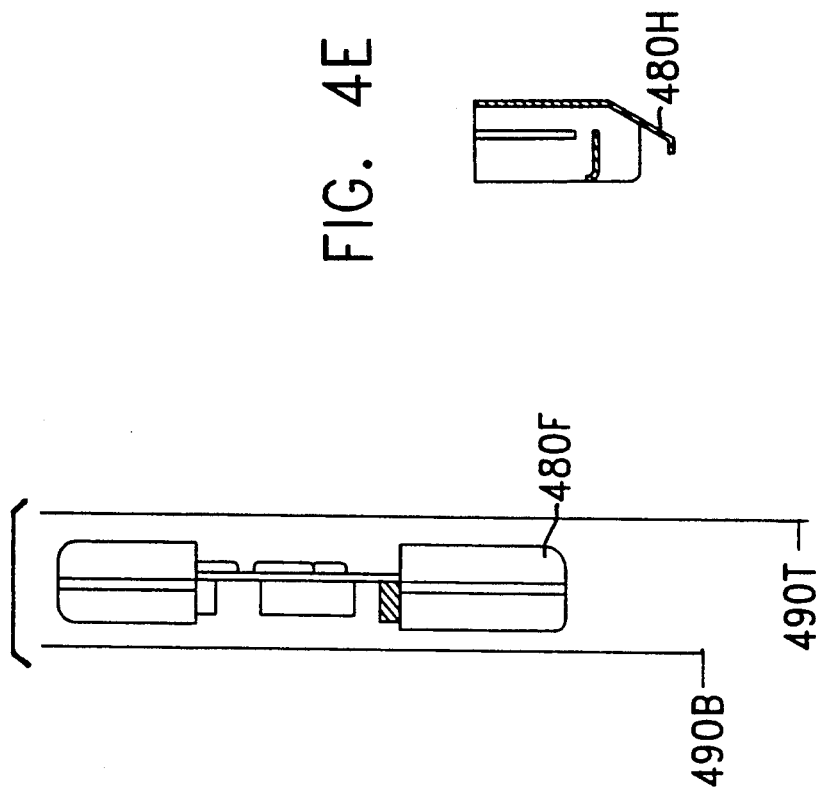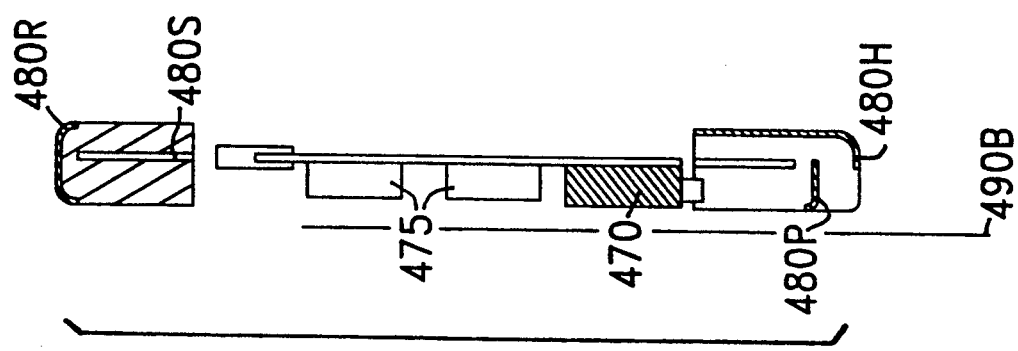

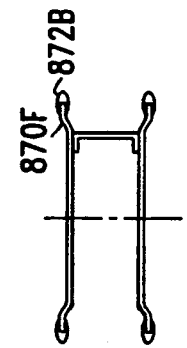
FIG. 8E
FIG. 8F
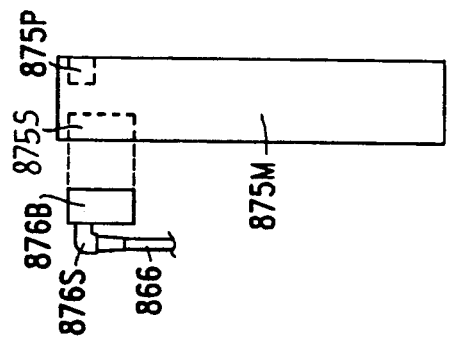
FIG. 8C
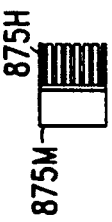
FIG. 8D
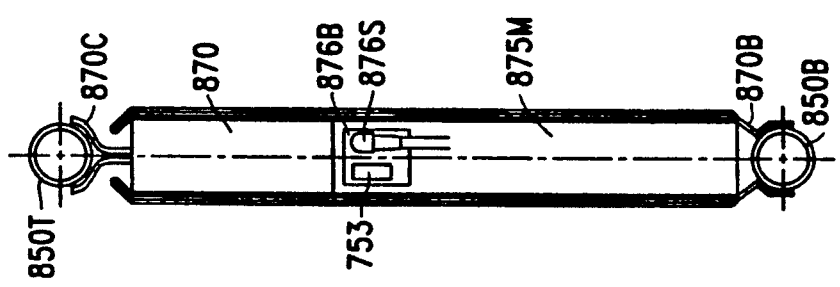
FIG. 8B

INDUCTORLESS CONTROLLED TRANSITION AND OTHER LIGHT DIMMERS

This application represents a continuation of application Ser. No. 797,718, filed Nov. 25, 1991, abandoned which is a continuation of application Ser. No. 615,760 filed Nov. 19, 1990 abandoned; and a continuation-in-part of application Ser. No. 336,014, filed Apr. 10, 1989; a continuation-in-part of application Ser. No. 943,381, filed Dec. 17, 1986, now U.S. Pat. No. 4,823,069; a continuation-in-part of application Ser. No. 640,978, filed Aug. 15, 1984, now U.S. Pat. No. 4,633,161, included in their entirety by reference, and contains information in Disclosure Documents Nos. 250,376 and 250,381.

This application relates to lighting control, and, more specifically, to controlled transition and other light dimmers.

Prior related applications disclose various improvements to light dimmers, especially those used in entertainment lighting. Some of these improvements are to dimmers directly controlling the duration of the transition of a semiconductor power controlling means capable of modulating the instantaneous current or voltage of the power passed, between one and the other of its substantially conductive and substantially non-conductive conditions, so as to limit EMI without the need for a conventional choke. Other disclosed improvements are applicable to the design of lamp dimmers of both the controlled transition and of other types, notably those packaged for distributed applications.

The present application discloses several such improvements addressing prior difficulties, such difficulties being summarized in the context of disclosing such improvements below.

SUMMARY OF THE INVENTION

One aspect of the invention relates to methods of driving the semiconductor power controlling means so as to reduce the demands posed by the low load impedance and therefore the high current demands of cold lamp filaments.

One such method maintains a supply of preheat voltage to a nominally "off" filament that warms the filament sufficiently to substantially reduce the current demands of the filament when turned "on", but which is not sufficient to cause the filament to emit light.

A second method, applicable to power stages beginning the half-cycle substantially in conduction and transitioning to substantial non-conduction at the desired phase angle, causes the semiconductor power controlling means to respond to levels of current demand greater than design norms by transitioning early in the half-cycle for high currents, and transitioning late for moderately high currents. This approach has the effect of both protecting the semiconductor power device from excessive current demands and of actually speeding up the apparent response of the lamp filament.

Additional methods of limiting excess device dissipation are disclosed.

A second aspect of the invention relates to a change in the shape of the current/voltage transition between one and the other of substantially conductive and non-conductive conditions having the effect of markedly reducing, for a given rise or fall time, undesirable audible noise electro-magnetically induced in lamp filaments and in distribution wiring and equipment, relative to what had previously been regarded as best performance. Such improved noise suppression can either be used to generate substantially better acoustic performance from a dimmer with a given level of thermal dissipation, or be used to produce the prior art level of audible noise suppression despite reduced dissipation.

Another aspect of the present invention relates to various approaches whose object is to decrease the complexity and/or improve the versatility of circuits used in controlled transition dimmers. Additional approaches are disclosed by which accurate phase information can be generated without access to a neutral, and further, how the semiconductor device used for a transition in one half-cycle can be initialized to its original condition, prior to the next half-cycle of the same polarity, at a point subsequent to the zero-crossing ending the half-cycle in which it conducts, such that accurate zero-crossing information is not required for power device initialization. Improved methods of generating power supply for the active electronics of a dimmer power stage are disclosed.

Various mechanical embodiments of both conventional and distributed design are disclosed, having particular advantages in their applications.

BRIEF DESCRIPTION OF THE DRAWINGS

FIG. 1H illustrates a transition minimizing the rate of change in the rate of voltage rise.

FIG. 4B is a section through FIG. 4A.

FIG. 4C is an assembled side elevation from the same perspective as FIG. 4B.

FIG. 4E is a section along the same cutting plane as FIG. 4B of an alternative front cap design.

FIG. 8B is a side elevation of the dimmer enclosure of FIG. 8A installed in a drop frame truss.

FIG. 8C is a view of a module containing power devices and connectors unplugged from the dimmer enclosure.

FIG. 8D is a plan view of one possible embodiment of the module illustrated in FIG. 8C.

FIG. 8E is a partial section through the enclosure of FIG. 8A illustrating the clearances that permit the insertion of the module illustrated in FIG. 8D.

FIG. 8F is a partial section through the enclosure of FIG. 8F, illustrating how the side panel and components mounted on it can be protectively recessed.

DETAILED DESCRIPTION

Figure 1A:
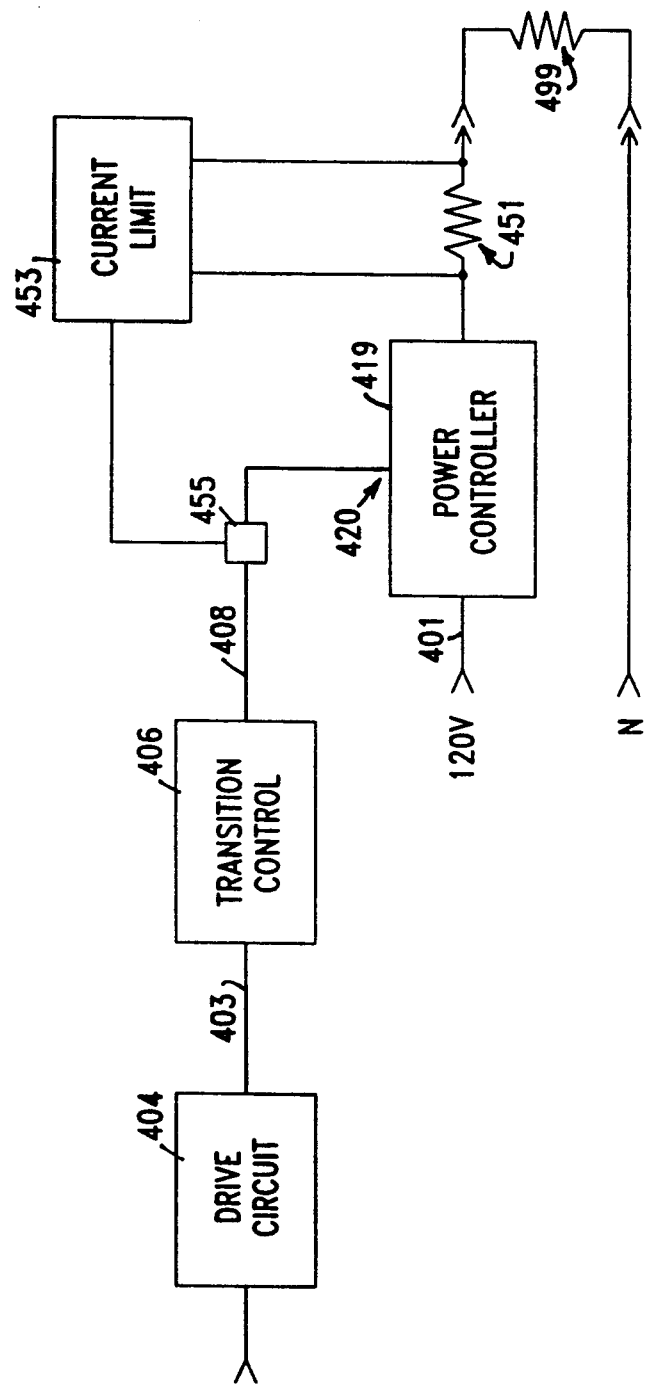
FIG. 1A is a block diagram, reproduced from prior related applications, of a generalized controlled transition dimmer.

The instant application relates to controlled transition dimmers, as are disclosed in the great-grandparent application, now U.S. Pat. No. 4,633,161. The operation of such dimmers may be better understood by reference to FIG. 1A, a block diagram reproduced from the prior related applications.

Like prior art phase-control dimmer power stages, a controlled transition power stage employs a semiconductor power controller means 419 series-connected between an input 401 from the AC mains supply and a lamp load 499.

Unlike most prior art dimmers, a controlled transition power stage employs semiconductor devices capable of modulating the voltage or current supplied to load 499 under the active control of their gate voltage or current.

The employment of such devices per se is neither novel nor does it lead directly to significant benefits. The active gate control afforded by such devices does allow electronic current-limiting and FIG. 1A accordingly illustrates the combination of a current sensor 451, current limiting circuit 453, and clamp 455.

A practical controlled transition power stage achieves such benefits with the addition of a third element in combination with the power devices 419 and a triggering circuit 404. This third element is illustrated as a transition control means 406 interposed between the output 403 of drive circuit 404 and the gate input 420 of devices 419.

When the output of drive circuit 404 turns on, it does so instantly. At the output of transition control means 406 it slews from off to on at a slower rate, established by the circuit's design as 300–700 microseconds. Accordingly, the output devices 419, which accept the output 408 of transition control means 406 as their gate input 420, do not turn on instantly, but slew from zero load voltage or current to full conduction over a period on the order of 300–700 microseconds. The power stage thus controls the duration of the transition between conduction and non-conduction to produce an output waveform similar to a properly filtered prior art phase control dimmer, but does so without the use of any passive inductor.

Prior related applications have disclosed improvements to and distributed application of such "controlled transition" dimmers, which are distinguished by their control of the duration of device transition from one to the other of substantially conductive and substantially non-conductive conditions. Application to conventional and reverse phase control output waveforms, and to both symmetrical and asymmetrical output waveform patterns, as well as to multiple transitions per half-cycle and to variations in waveform and/or waveform patterns depending upon the average power level required have all been disclosed.

CONTROLLED RATE OF VOLTAGE RISE OR FALL

Figure 1B:
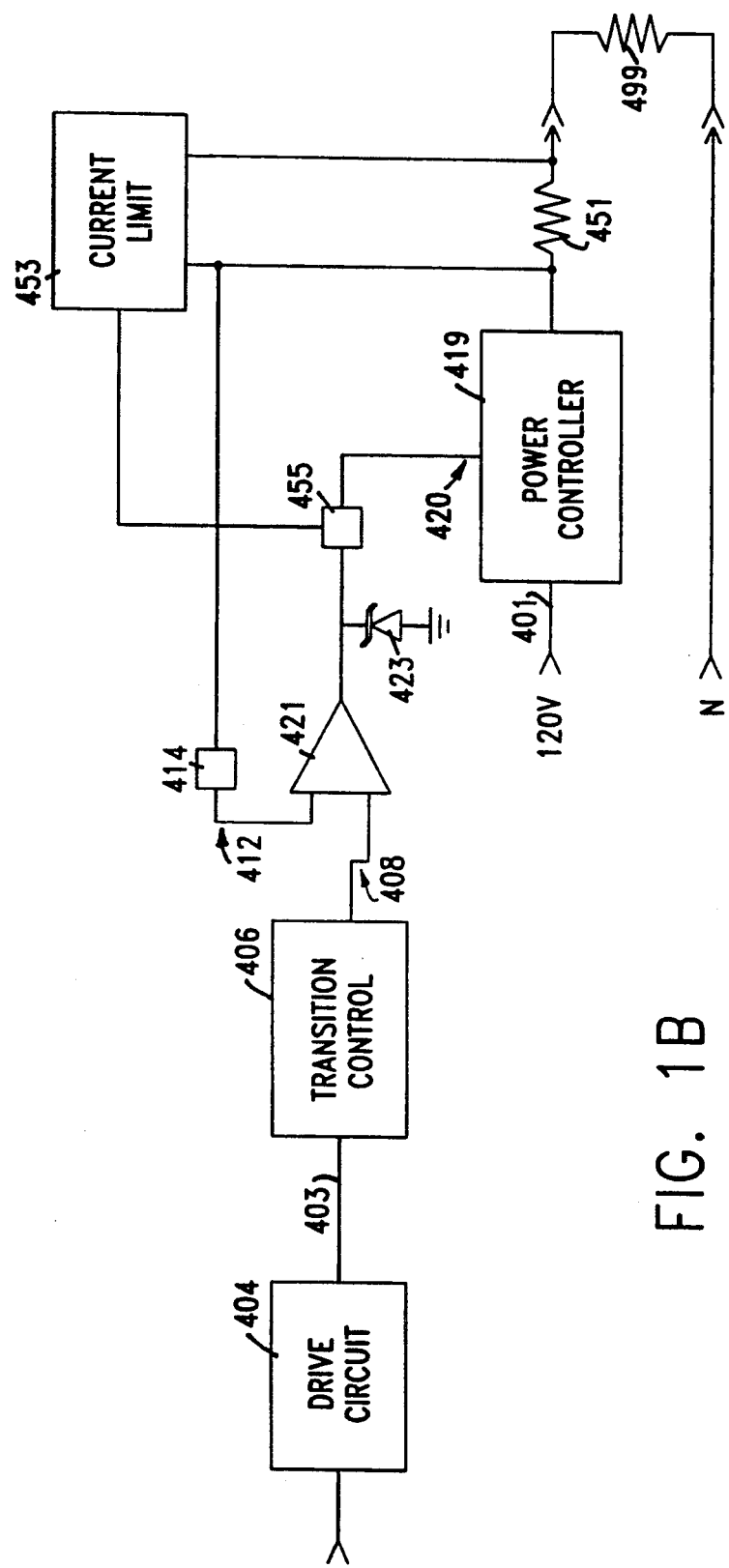
FIG. 1B is a block diagram, reproduced from prior related applications, of various improvements to controlled transition dimmers disclosed in those prior applications.

One aspect of controlled transition dimming is the relationship between the impedance of load 499 (which varies markedly with the number and wattage of filaments connected, as well as their temperature) and the current demands on the semiconductor power control means. Prior related applications disclose how semiconductor devices having an input voltage/output current relationship (such as field effect devices) can be employed in a manner that compensates for such variability in current demand. FIG. 1B is reproduced from the prior related applications. Parts with the same function in FIG. 1A are identified with the same reference number.

The input voltage at the gate of a field effect device controls its output current. Therefore, for a given input voltage in the device's linear region, the actual voltage at load 499 is a factor of the impedance it presents, which varies with the number of filaments connected and their temperature. This mechanism has no effect on the dimmer when off or in full conduction, but during the transition period it results in variations in the duration of the transition with variations in the load impedance—and as such, undesirable variations in average power, audible lamp noise, and thermal losses in the devices.

Preferably a controlled transition power stage corrects this variation by controlling the rate at which voltage rises (or falls) during the transition. This object may be achieved by the use of a semiconductor power controlling means with an input voltage/output voltage relationship (such as a power transistor in an emitter-follower relationship). Where devices having an input voltage/output current relationship are employed, means for this correction is required, illustrated in FIG. 1B as a transition feedback circuit comprising differential amplifier 421 interposed between transition control means 406 and the gate input 420 of the power devices 419, accepting as its second input, the dimmer output voltage via conductor 412 and feedback network 414. Feedback network 414 shapes, rectifies, or attenuates the load voltage derived from load 499, as may be required. Some embodiments will provide two means analagous to amplifier 421 and network 414, one provided for each half-cycle. The actual output voltage produced by the interaction of the current resulting from a given gate input voltage with the impedance of load 499 is compared with the desired value, and the gate input voltage corrected accordingly. Such a power stage is therefore capable of maintaining the same duration of transition at each phase angle and as such, consistent curve, thermal losses, audible noise, and EMI suppression despite variations in load impedance.

The gate voltage/output current relationship of field effect devices also permits limiting output current by limiting maximum gate input voltage. Accordingly, FIG. 1B illustrates zener diode 423 as clamping maximum gate voltage.

The prior related applications included in their entirety by reference, disclose suitable circuits in detail. No restrictions are imposed upon the circuit designs with which such dimmers can be constructed. While, for example, analog designs have been disclosed, prior related applications also embrace digital techniques.

Figure 1C:
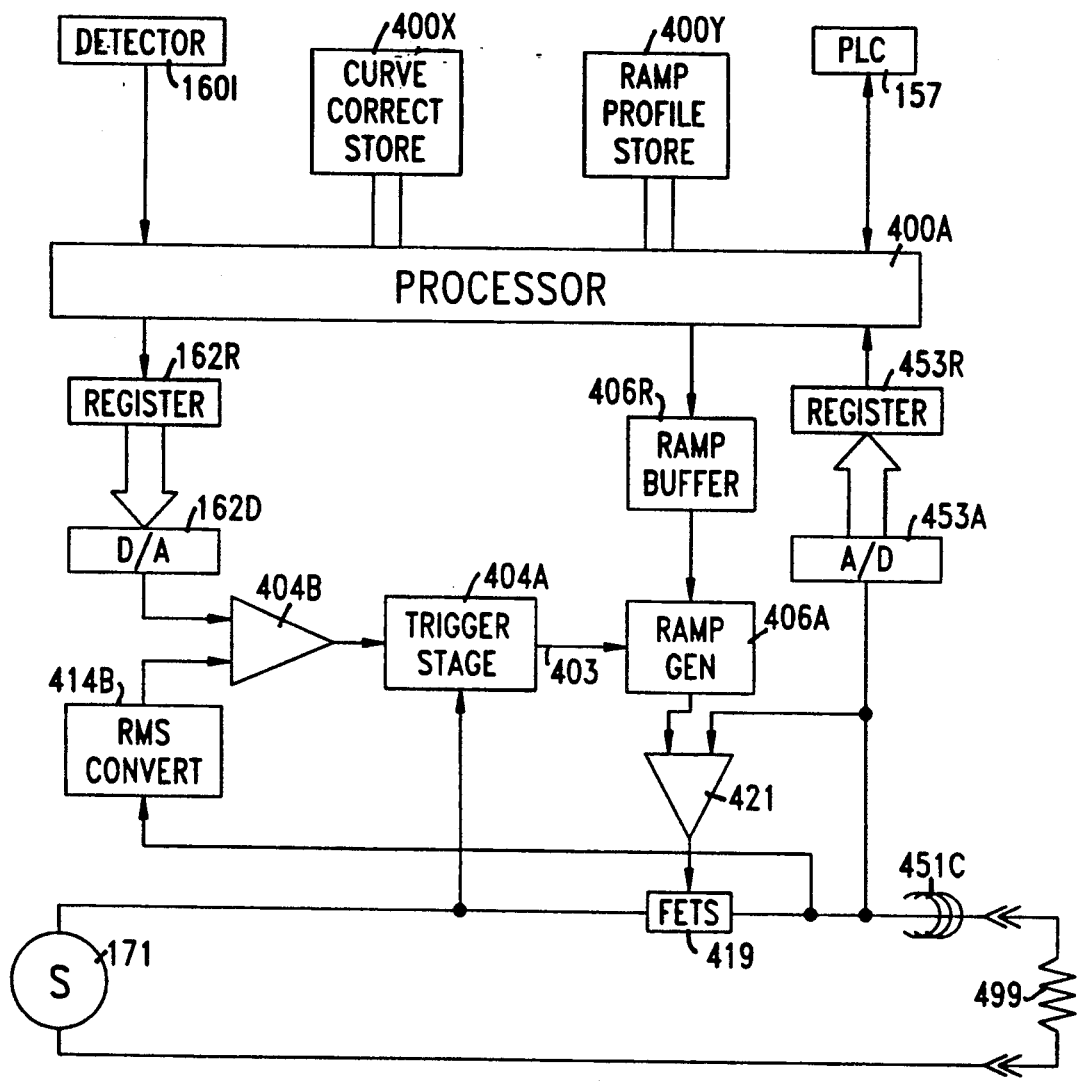
FIG. 1C is a detailed block diagram, reproduced from the parent application, illustrating one method of implementing disclosed improvements to controlled transition and other dimmers.

FIG. 1C, reproduced from the parent application, represents a detailed block diagram of a dimmer incorporating various improvements and employing a processor.

At its core is a simple, known open-loop phase control triggering circuit 404A that accepts an analog voltage at its input and produces a change in the state of its output at the desired firing angle. This triggering circuit is part of a feedback loop formed by differential amplifier 404B that compares the input value with the dimmer's output voltage. A RMS-to-DC converter 414B may be placed between the input to the differential amplifier 404B and the dimmer's AC output so that the feedback loop stabilizes RMS voltage, the advantages of which have previously been described.

FIG. 1C also illustrates a dimmer whose input value, transmitted and isolated by an LED, is received by photodetector 190I. That value is held by register 162R, and converted to an analog input voltage to the triggering stage by D/A converter 162D.

FIG. 1C also illustrates that processor 400A can be used in the overall design of the dimmer, although it is not necessary for any of the functions previously described However, if provided, it can serve several functions, one of which can be the servicing of a serial input, and another the curve correction function, the benefits of which, in highly-fedback dimmers, have been described in the parent application.

In the latter case, the processor's Curve Correct Store 400X holds the input value corrected to produce the desired "curve", which may also include a "floor" under the minimum values used to provide an active preheat function.

Although many of the previously-described techniques can be used with inductively-filtered power stages, the power stage illustrated in FIG. 1C is of the "controlled transition" type.

In FIG. 1C, the output of the triggering stage is provided to a transition control section. This includes a ramp generator 406A that is responsible for producing a transition with the desired profile. That profile or the values required to calculate it are stored in Ramp Profile Store 400Y and provided by the processor to a buffer store 406R. Upon the state change at the output of the triggering stage, ramp generator 406A produces a transition of the semiconductor power devices 419 between one and the other of their substantially conductive and non-conductive states having the specified profile. Current sensor 451C and comparator 421 form a second feedback loop that is responsible for compensating for variations in device performance and load impedance. Current information may also be used for current-limiting by means of hardware and/or by appropriate programming of the processor 400A responding to current information received from current sensor 451C via A/D 453A and register 453R.

ACTIVE PREHEAT

While the circuits disclosed in prior related applications account for variations in load impedance, their range of adaptability ultimately depends upon the ability of the semiconductor power controlling means to pass current. The greatest demands are placed on such means when the dimmer attempts to drive a cold lamp filament—for the impedance of a given lamp load has been found to vary by a factor of as much as 12:1 over the range from cold filament to full on, and 2.5:1 over the range of visible output. Semiconductor devices must, therefore, be selected that are capable of passing sufficient current to heat a cold lamp filament to incandescence. When confronted by excessively low load impedance caused by a cold filament, a properly-designed dimmer will dissipation-limit by transitioning to substantial non-conduction at a point where current flow is still within the capabilities of the selected device to transition. This approach has the disadvantage of delaying the perceived response of the filament, relative to the results achieved with a conventional thyristor-based power stage, because of the additional time required to pump sufficient energy into the filament in order to raise its temperature and impedance to the point that the dimmer need no longer current-limit.

One method of reducing this differential is to supply a minimum voltage to the load 499, so as to preheat the filament sufficiently to reduce the differential between it impedance when nominally "off" and "full" without generating visible light in the former state. The controller can be programmed or set to provide such a minimum level, but, ideally, the dimmer itself provides this capability, so as to make it independent of the choice or operation of the controller. In analog or digital triggering stages, a minimum phase angle may be defined. Specifically, in FIG. 1C, processor 400A or its associated Curve Correct Store 400X may define a minimum such phase angle. Alternatively, a delay responsive to zero-crossing may be provided that causes a transition to conduction sufficient to supply minimum preheat voltage to the lamp, regardless of the status or nature of the control and triggering means. Although this minimum phase angle can be fixed, it is preferably regulated so as to compensate for fluctuations in line voltage. Alternatively, a minimum output voltage can be defined, and the minimum phase angle varied to maintain that voltage.

An active preheat function can be provided with a time-out to conserve power and/or turned off when serial transmissions to the dimmer cease.

Such active preheat circuits have proven to reduce the on/off filament resistance ratio from 12:1 to 3:1, with a considerable improvement in the current demands on the semiconductor device required to handle a given nominal lamp wattage.

IMPROVED DISSIPATION LIMITING METHOD

The problem of excessive current demands of cold lamp filaments can also be addressed by a novel mode of operation. The impedance of incandescent lamps is a non-linear function of applied voltage. A 120 v lamp with just 5 volts applied to it will be warmed to a point that its impedance will be approximately ⅓rd of its "full on" impedance. While it may require as long as 35 cycles of a 60 Hz AC line for a lamp to warm fully, within approximately 4 cycles the current demand will have fallen to approximately 1.5 times the "full on" current. Thus, while incandescent lamps switched on rapidly require much more current than they will in operation, such current demands are of short duration, and occur before the lamp is producing much useful light.

Previous related applications disclose three different types of current and dissipation limiting. One, illustrated in FIG. 1B by gate clamp 423, is a means that limits the peak or maximum instantaneous current passed by the semiconductor power controlling means. A second, described in prior related applications as a "long time current limit", is analogous to a circuit breaker, in that it protects the dimmer from a steady-state demand for excessive current as in the case where a 2000 watt load is connected to a dimmer rated for only 1000 watts.

The third is a short term current limit that terminates conduction in any given half-cycle if a preset current limit is exceeded. This short term limit is higher than the setting of the long term limit, but lower than the setting of the peak limit. This intermediate limit reflects the ability of such devices to withstand modest excess current flows over short periods, and is of use in sourcing above-normal currents for a period sufficient to aid in warming a cold filament. It will be appreciated (in that a 1000 watt lamp drawing 8.3 Amperes when heated can draw more than 90 Amperes when cold) that a dimmer with no such intermediate limit will require considerable time to warm a lamp to normal operating temperatures if its ability to deliver current is capped at its long term limit.

The present application discloses an improvement to the limiting means, and is applicable to dimmers having a transition from substantial conduction to non-conduction during the course of a half-cycle (so-called reverse phase control dimmers). In the improved method, a setting for such a short term limit is chosen that represents a value (in one example) of approximately 4 times the maximum current demand of fully-warmed load of a wattage equal to the maximum rating of the dimmer, the precise value being related to the maximum current that the power device can successfully transition to non-conduction. In the event that this limit is exceeded, the dimmer will, in the manner previously disclosed, immediately transition to non-conduction. As taught in the prior related applications, it is desirable that such a transition have a duration less than that employed at nominal current levels so as to reduce dissipation, but greater than instantaneous so as to minimize EMI.

The improved limiting means of the present invention requires the addition of another current limit point, one set at a value that is greater than the long term limit, but less than the short term limit. As an example, this might represent 2 times the maximum current demand of a fully-warmed load whose wattage is equal to the dimmer's rating. Further, this additional current limit is coordinated with the transition control means as follows:

The appropriate semiconductor power device will be in conduction at the start of a given half-cycle. With a normal load impedance, the dimmer will transition to substantial non-conduction at some point in the half-cycle, the phase angle at which the transition takes place being determined by the average power desired. As the half-cycle begins and power begins to flow, current demand is monitored. Should the current demand exceed the short term limit before the transition initiated by the triggering means, an earlier transition to non-conduction will be initiated. If, however, the current demand of the additional limit is exceeded, without also exceeding the short term current limit, then the dimmer will respond by postponing the transition to non-conduction initiated by the triggering means until after the current demand falls back below this, additional limit.

While the result of this improvement is to prolong the period during which the semiconductor power controlling means must pass an amount of current greater than its long term limit (although less than its short term limit) the effect of this arrangement is also to greatly lower the maximum changes in junction temperature in the power devices. This is a product of the fact that transition losses in the power device of a controlled transition dimmer with a rise or fall time sufficient to suppress EMI to professional standards are significantly greater than losses in the saturated device. As a consequence, power devices may be found that are capable of passing 4 to 6 times the rated load of the dimmer, but which also cannot transition a load only 3 times higher than the dimmer rating.

In one example, a dimmer drives a lamp load, which, by virtue of low filament temperature demands 2.5 times the current of the same filament once warmed. Further, the desired average power to the lamp requires a phase angle of 90° for the transition. With the appropriate device in conduction at the start of the half-cycle, current will begin to rise until a point at which the additional limit set (in this example) at 2 times nominal current is reached—at approximately 53 degrees after zero-crossing. Upon reaching this point, the transition at a 90° phase angle will be postponed until the current again falls below the 2 times limit. This will occur at approximately 127°, at which point the transition will be permitted. It can be shown that the power loss in the delayed transition is approximately 80% of that which would be encountered were the transition to occur at the scheduled 90° phase angle with the worst-case, 2 times losses allowed in normal operation (and produced just before the trip point for the transition current limit).

In another example, a current demand of 3.9 times hot rated load will result in a delay of the transition to approximately 150 degrees, when current demand falls below 2 times that of the rated hot load. Power loss will be about half the worst-case loss at 90°, and of a value similar to that of the same dimmer driving the heated load for which it is rated.

Undesirable effects on the dimmer's performance are minimal. A dimmer operating into an unusually low load impedance (such as a short) will still be protected by the peak current limiting means. A dimmer operating into a cold lamp may, for the first few half-cycles, trip its short term current limit as current demand continues to rise past that trip point, but will enter delayed transition immediately thereafter, and remain in this mode until the load has been warmed sufficiently that transitions can occur at the desired phase angle. In fact, because the transition is postponed during this intermediate period, additional energy is delivered to the lamp, and the response of a cold lamp is improved.

Figure 1D:
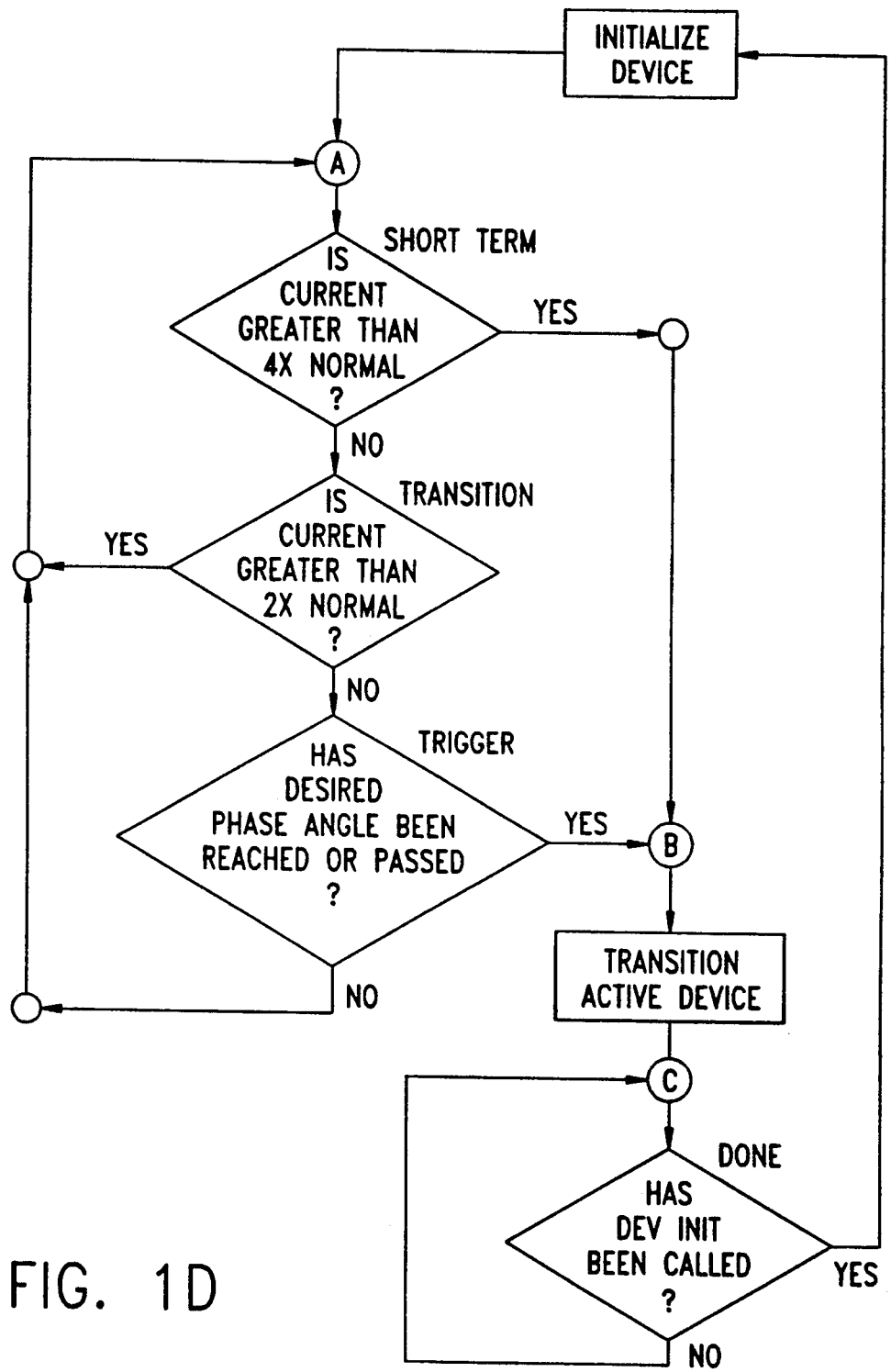
FIG. 1D represents a method of implementing improved current and dissipation limiting approaches disclosed.

FIG. 1D discloses how the various features can be coordinated. The illustrated method can be incorporated in hardware or software. Diamonds indicate decision points. Various current limits are expressed, for purposes of this example, as multiples of "Normal" current, the exact values being determined by the characteristics of the power semiconductors employed. Peak and long term limits are not illustrated in this Figure.

Beginning at point "A", at the start of the half-cycle, the appropriate power device is preset in conduction. Instantaneous current is sensed and first compared with the short term current limit, which is related to the amount of current that the device can successfully carry. If this short term limit is exceeded, the power device is quickly transitioned to non-conduction, preferably with the dissipation-limiting transition technique disclosed in the prior related applications. If this short term limit is not exceeded, then current is compared with the additional "transition" limit disclosed, which is related to the amount of current that the power device can successfully transition.

If the amount of current drawn exceeds the "transition" limit, here set at twice "Normal", then the process returns to point "A". It will be seen that the "transition" limit will generally be encountered before the short term limit, as current draw increases with increasing voltage after the start of the half-cycle. If current demand then continues to increase past the higher short term trip point, then the power device will be quickly transitioned to non-conduction. If, however, current demand exceeds the "transition" limit without exceeding a higher limit, the loop-around to point "A" will continue until current again falls below the "transition" limit, at which point any transition that had been scheduled for the period during which current exceeded the "transition" limit will be performed. Once, however, the load is warmed and current demand falls below the various limits, normal operation of the dimmer will resume and transitions will be taken at the desired phase angle, whether it represents desired average power or the "floor" or minimum phase angle required to supply the desired level of preheat (if implemented), whichever is lower.

Regardless of the event that initiates transition, the condition of the power device will be initialized prior to the next half-cycle in which the same power device is required.

Additionally, a dimmer can project the rate of increase in current over time as voltage increases at the start of the half-cycle so as to predict the amount of current that will be demanded both prior to and during a transition at the desired phase angle. Such a dimmer can arrive at a strategy for a half-cycle early in that half-cycle.

Further, as disclosed in prior related applications, the length of the transition can be increased where the connected lamp load and/or its temperature provides an otherwise unused "margin" in allowable dissipation.

Figure 1E:
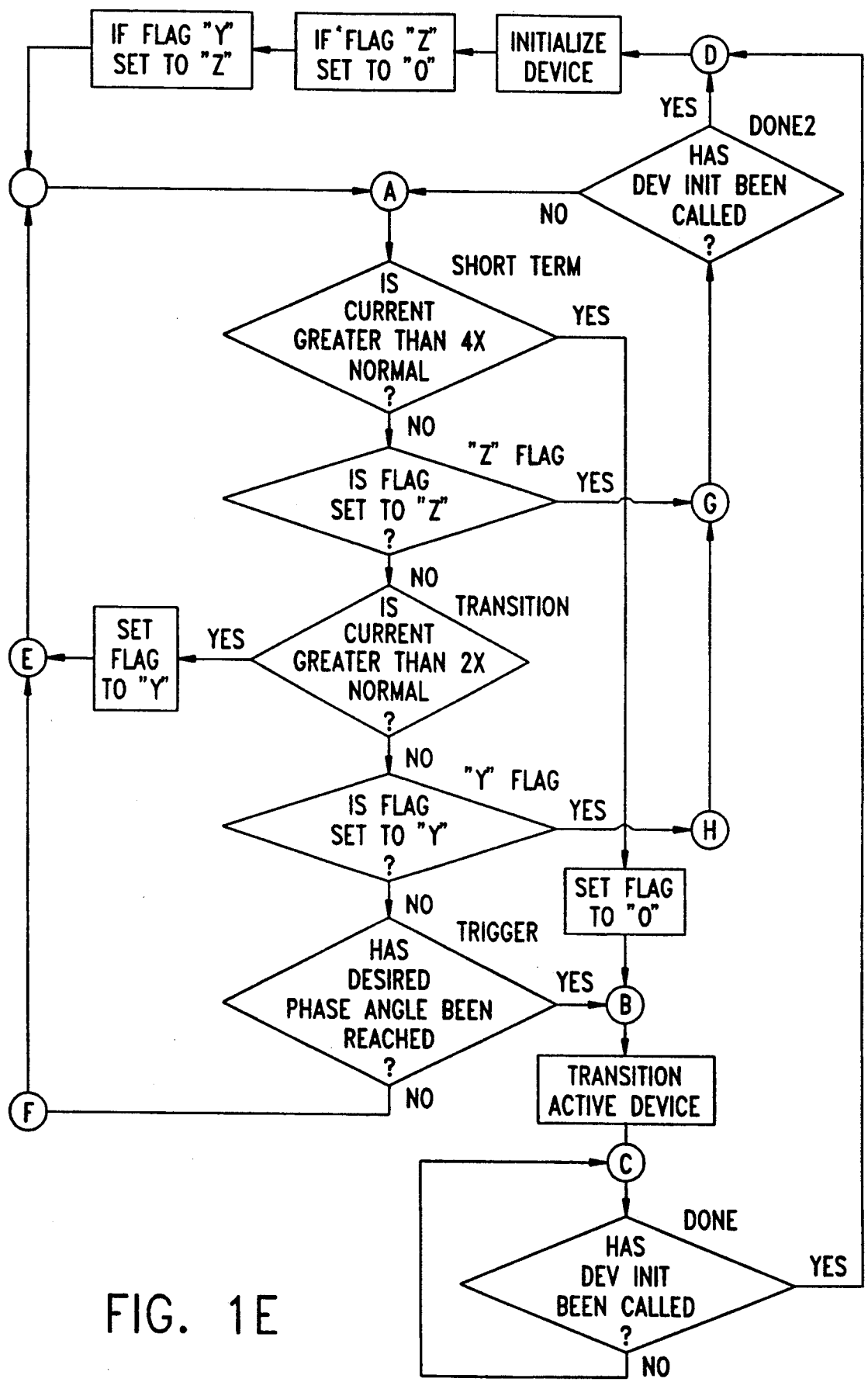
FIG. 1E represents another method of implementing an improved current and dissipation limiting approach.

Additionally, a dimmer can respond to excess current demands above its "transition" limit but below its short term limit by passing entire half-cycles, rather than simply delaying transitions in them. FIG. 1E illustrates one method of producing this result. In that Figure a flag is provided that may be set to any one of three possible states: "0", "Y", or "Z". It will be seen that a current draw in excess of the "transition" limit will result in the setting of the flag to its "Y" state, and the loop-around via points "E" and "A" until either of two events: a further increase in current past the short term limit (which will result in a transition to non-conduction for the balance of the half-cycle and the setting of the flag to a "0" state); or the fall in current draw below the "transition" limit near the end of the half-cycle. In the latter case, the process takes the route via points "H" and "G" (and potentially a loop-around via points "A", "H", and "G") until the power device is initialized at or after the end of the half-cycle. Thus, the illustrated process results in an entire half-cycle being passed if the current draw proves to be greater than the "transition" limit but never more than the short term limit. Thus, even more energy is delivered to the filament, speeding its warming, without the requirement that the device transition any load.

Further, in the illustrated embodiment, the "Y" flag state set when a first half-cycle has been "transition-limited" is changed to a "Z" state flag. The illustrated process will loop-around via points "G" and "A"

throughout the next half-cycle (provided that the short term limit is not exceeded), such that a second entire half-cycle will be passed. One benefit is the further increase the response time of the filament.

IMPROVED LONG TERM DISSIPATION LIMITING MEANS

There is a requirement in all dimmers for a means of protecting the dimmer and its power-handling components from the effects of long-term excessive current demands, such as are produced by plugging a 2000-watt lamp into a dimmer rated for only a 1000-watt load. Typically, a thermal, thermal-magnetic, or magnetic circuit breaker is provided for this function, and electronic equals of such a circuit breaker can be built. However, such means respond to the actual amount of current passed to the load, which will be reduced at reduced phase angles. A 2000-watt lamp may be operated on a 1000-watt dimmer having a 10 Ampere circuit breaker, provided that the dimmer is not operated at a level greater than half. In a controlled transition dimmer, as taught in prior related applications, power devices can be destroyed by excessive dissipation although the current passed to the load is limited to within safe norms. Further, this dissipation is at a maximum at a 90° phase angle. Thus, a controlled transition dimmer rated at 1000 watts will be sorely abused if operated with a 2000-watt load at a setting of half, and yet, neither a fuse or circuit breaker, nor their electronic equal, will protect the dimmer from such abuse.

Doing so requires a means that responds to or enables predicting the long term power losses in the devices. These power losses reflect two sources: one being losses produced during a transition of the power device between its conductive and non-conductive states; and the second being conduction losses. The contributions of the two sources will vary depending upon the phase angle at which the transition is taken. The conduction losses vary as a function of the integral of the current let through the power device. The transition losses vary with the current flow through the power device at the time of transition.

One method involves sensing the instantaneous current demand via, for example, a current sense means similar to 451 in the various Figures.

As the point in the AC waveform at which maximum dissipation will occur (at a 90° phase angle) is also the point at which current demand will be greatest during the half-cycle, a long-term average of the maximum peak current in each half-cycle can be developed either by software or by analog filtration and used to trip the long term limit, on the basis that there is a sufficiently general correspondence between maximum peak current and the worst-case condition for device dissipation. (In the manner previously disclosed, the generally inverse ratio between allowable current and the duration of such current may be employed to permit the dimmer to supply higher than nominal current levels for short periods to warm cold lamp filaments. The time constant selected, however, should shut down the dimmer should this excess demand continue for a period that would result in excessive dissipation in the power devices.) This method has proven adequate to protect the power devices from destruction due to losses during transition of an excessive lamp load.

In the matter of excessive dissipation, however, averaged maximum peak current alone is not regarded by the applicants as the best basis for protecting the devices against abuse by an excessive lamp load. One reason is that the maximum peak current is developed at a 90° phase angle. Provided that the power device is conducting at that phase angle, peak current in the half-cycle provides a yardstick by which the impedance of the lamp load can be estimated. However, if the phase control transition is moved to other phase angles, the actual transition losses will be less than the worst-case losses at the 90° phase angle for which the trip point has been set. Further, depending upon whether the duty cycle is increased above or decreased below 50% by the change in phase angle, the contribution of conduction losses will also be varied. Further, if the duty cycle is decreased below 50% the maximum peak current produced by the same lamp load relative to that produced at the 90° phase angle will be reduced by the reduced maximum voltage at which the power device is conducting. As a result, the average maximum peak current method is not the most accurate possible approach, and may over- or under-compensate at other than 90° phase angles. A more accurate method of detecting excessively low long-term load impedance is thus desirable.

One simple method exploits the relationship between peak current and transition losses and between the integral of current and conduction losses by means of an analog quasi-peak detector that produces a value intermediate between the two. Such a circuit has proven more accurate than either alone.

More complex methods are also possible.

One such method, which can be applied using either simple analog components or software, develops improved accuracy as a result of a variable relationship between power device duty cycle and allowed maximum peak current in each of the half-cycles. The current sense input can be used to develop values for both peak current and duty cycle, as the duty cycle of non-zero current values will be the same as the duty cycle of the power device. As the duty cycle is reduced below 50% (corresponding to a 90° phase angle) the allowable maximum peak value may be increased to reflect both the reduced transition and conduction losses. As the duty cycle increases above 50%, the allowable peak current may be varied to reflect the net result of lowered transition losses offset by the greater conduction losses.

Another such method employs the relationship between peak current and transition losses by sampling the current demand at the transition. Again, a correction may be applied that reflects the device duty cycle or phase angle so as to account for variable conduction losses.

Another such method correlates instantaneous current demand with one or more points in the conductive period of the power device. The available voltage at any given point in the half-cycle can be measured (if a voltage sense input is provided, for example, for line regulation) and, at one or more points in the half-cycle, the current demand of the lamp load can be compared with a predetermined set point representing the current demand of the maximum rated load. If this set point is exceeded for multiple half-cycles (that is, it does not represent a rated load that has not yet been warmed), the long term limit will be tripped and the dimmer shut down. These set points can be maintained in an analog circuit by appropriate design and component value selection, or in a table in software.

Another method may be employed in dimmers that have access to both current and voltage information.

Using these two values, load impedance can simply be calculated and compared with an allowed value. Again, analog and digital techniques are both possible, and voltage can be approximated without a sense input by phase angle.

IMPROVED SUPPRESSION OF AUDIBLE LAMP NOISE

The EMI effects of the abrupt transition into conduction of prior art thyristor-based phase control dimmers have been known since their introduction. A current rise time limiting inductor, or choke, has been added to such designs in an effort to reduce such effects. The various disadvantages of such inductors have been described at length in prior related applications, as well as in the literature.

One major EMI issue in dimmer design has long been the undesirable noise generated by electro-magnetically induced vibration of lamp filaments, as well as from mechanical motion induced in distribution wiring and the metal enclosures surrounding it. Considerable efforts have been devoted to minimizing such noise. It has long been axiomatic that achieving this object requires maximizing the voltage rise time of the transition between non-conduction and conduction; which requires chokes of considerable size, weight, and cost. Maximizing the efficacy of noise suppression for any given rise time, in turn, has long been desirable for this reason. Further, while controlled transition dimmers lack chokes, there is, at longer rise or fall times, a relationship between rise time and thermal dissipation. Thus, audible noise suppression efficacy is also an issue in controlled transition dimming.

Figure 1F:
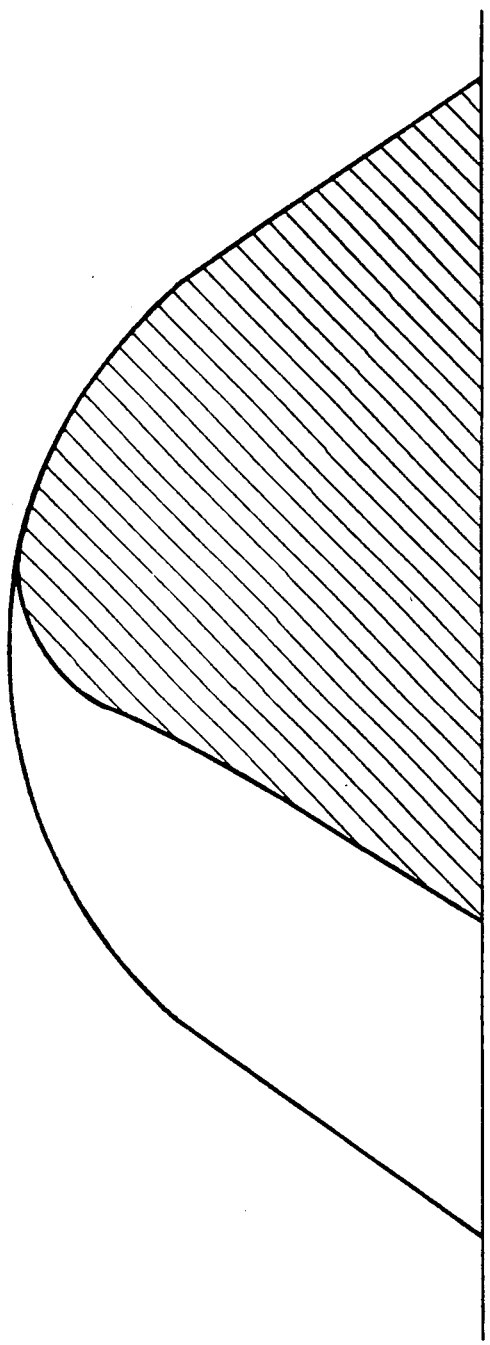
FIG. 1F illustrates a typical transition as produced by a prior art inductively-filtered dimmer.
Figure 1G:
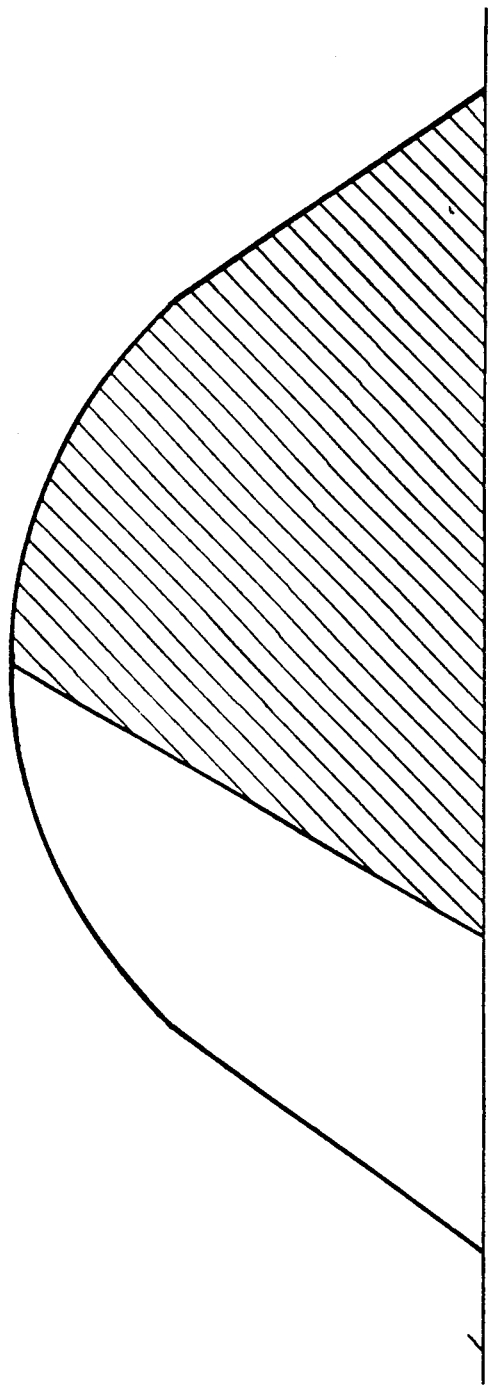
FIG. 1G illustrates a transition minimizing the rate of voltage rise.

It has been believed that the significant factor in audible noise generation for a given rise time is the rate of voltage rise (or slope) during the transition. Therefore, minimizing the rate of voltage rise has been understood to produce the best results for a given rise time. FIG. 1F illustrates the type of voltage rise produced by a typical choke. Given that the rate of voltage rise is significant, for a given rise time, it would follow that the best results would result from minimizing slope throughout the transition—as is illustrated in the case of FIG. 1G. Chokes cannot produce such a transition but, as taught by the applicants in the prior related applications, controlled transition power stages offer the capability of electronically determining their rise (or fall) profile. In fact, a controlled transition power stage producing the transition of FIG. 1G, when compared with a conventional, choked power stage producing the shape of FIG. 1F, has been found to produce more apparent noise for a similar rise time.

By contrast, the applicants have determined that, for a given rise or fall time (transition duration), superior results can be achieved by the transition profile of FIG. 1H. Such a result is unexpected because the rate of voltage rise of the transition of FIG. 1H, notably at its center, is considerably faster than that of either prior Figure. Based upon conventional expectations, a dimmer producing the transition of FIG. 1H would be regarded as inferior to that of either prior Figure.

It is a property of the transition profile of FIG. 1H that it minimizes not the rate of voltage rise (or fall), but the rate of change of the rate of change in voltage (delta delta of voltage). That is, abrupt changes in the rate at which voltage changes are avoided. A power stage built to produce this type of transition profile has proven to produce significantly less audible noise.

Figure 1I:
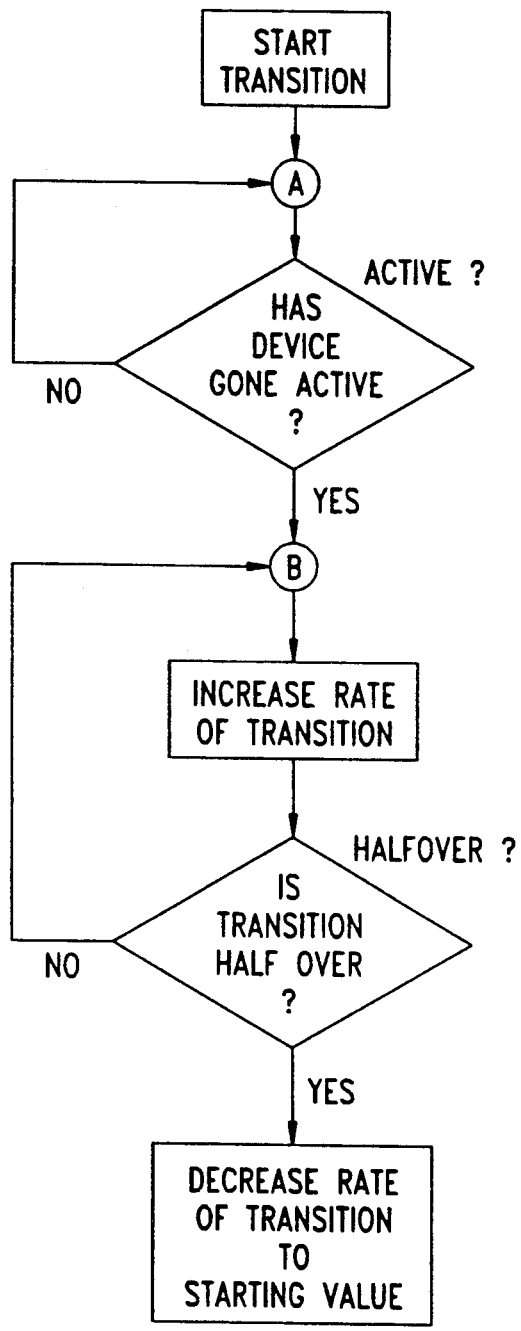
FIG. 1I illustrates one method by which the improved transition shape of FIG. 1H can be produced.

Such a transition profile can be produced in hardware or software. Refer now to FIG. 1I, where one method of producing such a profile is illustrated. One hardware embodiment may employ a dimmer like that of FIG. 3H, which includes a processor 400A, which is provided with current and voltage sense inputs, and is coupled to Device Gate Control means such that transitions between conduction and non-conduction can be triggered, and that the "Transition Slope" or rate of change between one and the other of the two conditions can be controlled. This control of "Transition Slope" has many possible applications including producing the "controlled rate of voltage rise (or fall)" operation required to stabilize transition duration despite variations in load impedance; producing faster, dissipation-limiting transitions in response to excessively low load impedances; and controlling the profile of the transition. It will be apparent that the same functions can be and have been performed in hardware, as disclosed in prior applications.

Figure 3A:
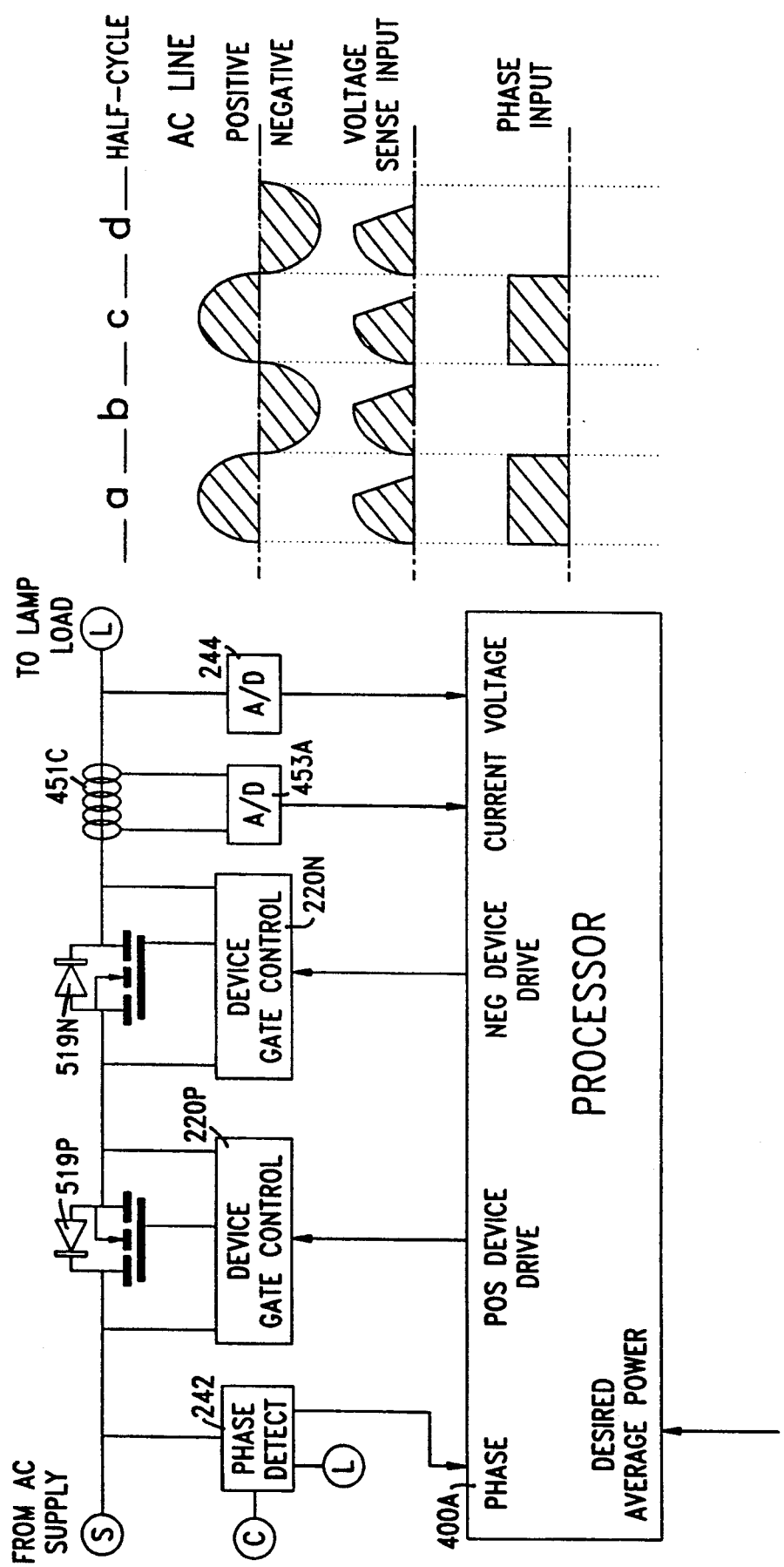
FIG. 3A is a block diagram of a processor-based dimmer design, which is provided for purposes of illustration.
Figure 3B:
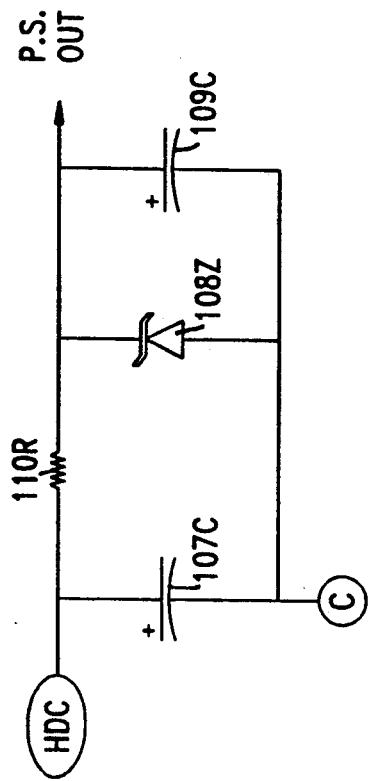
FIG. 3B illustrates a conventional circuit for limiting the power supply voltage produced across two power devices.
Figure 3E:
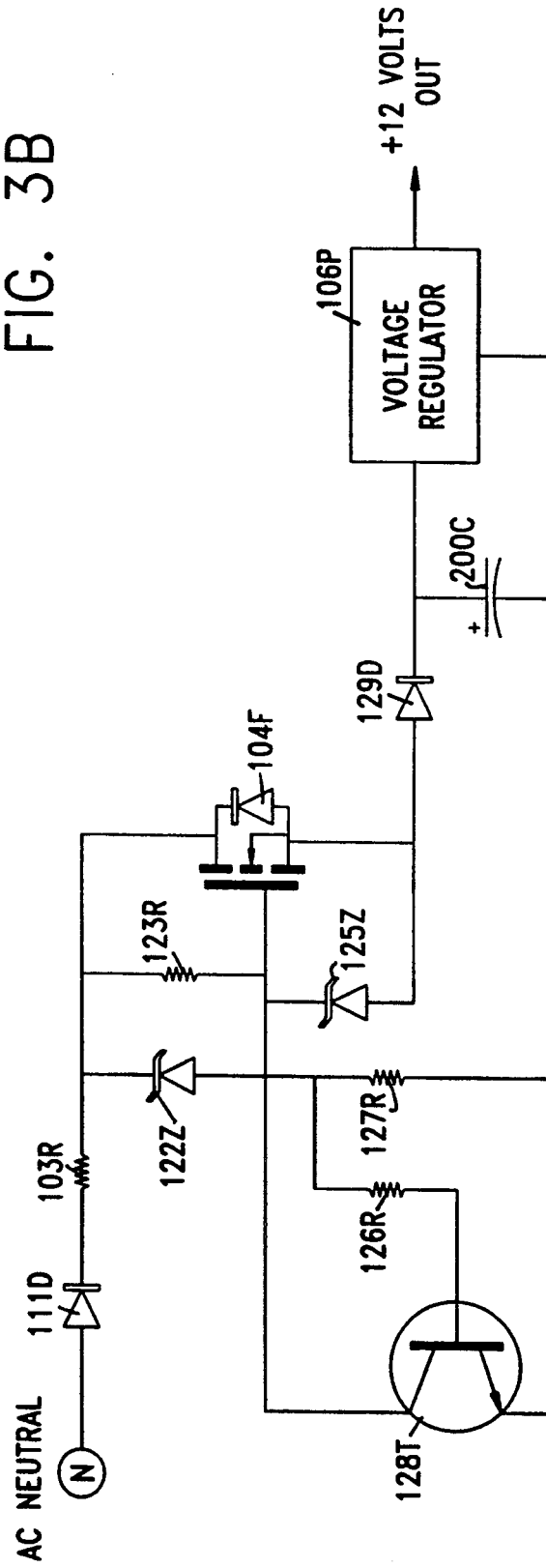
FIG. 3E is a schematic of a suitable power supply circuit for the arrangement of FIG. 3D.
Figure 3C:
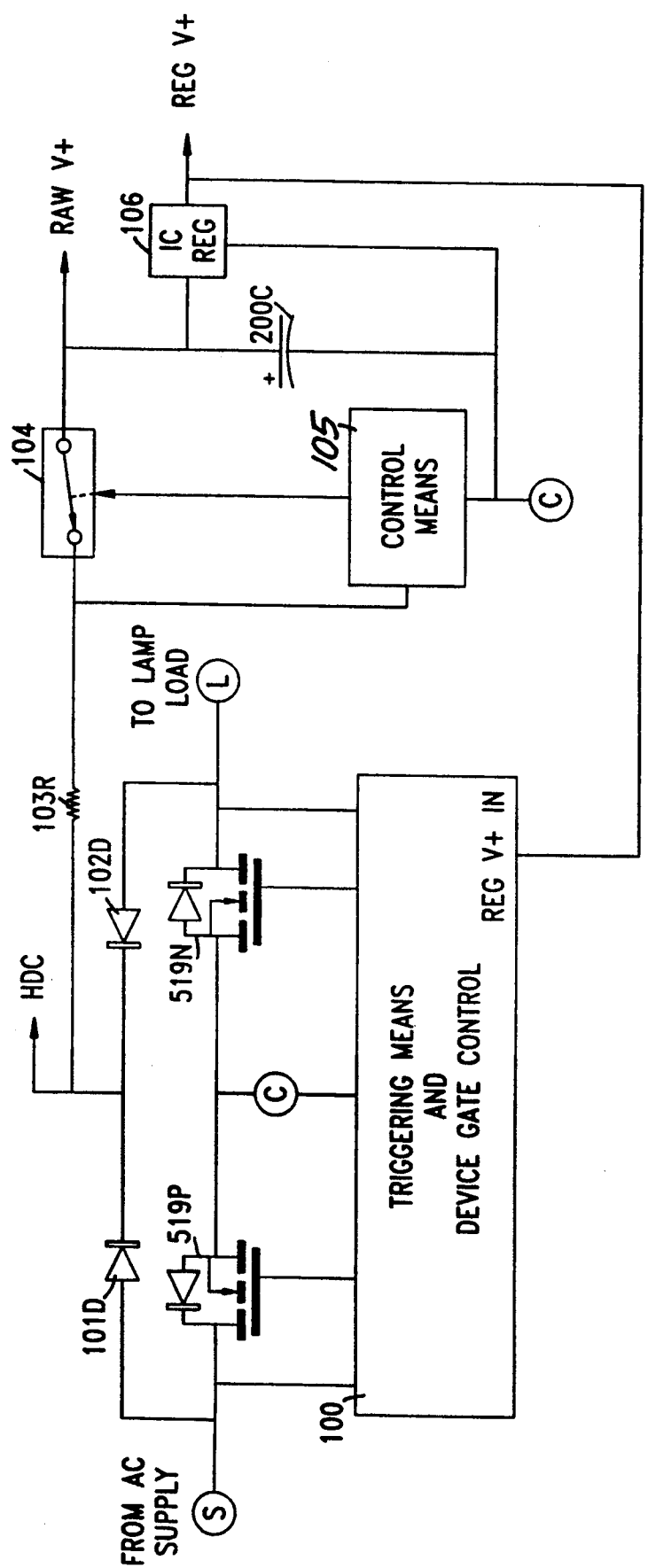
FIG. 3C illustrates an improved power supply making use of the potential across the power semiconductors.
Figure 3D:
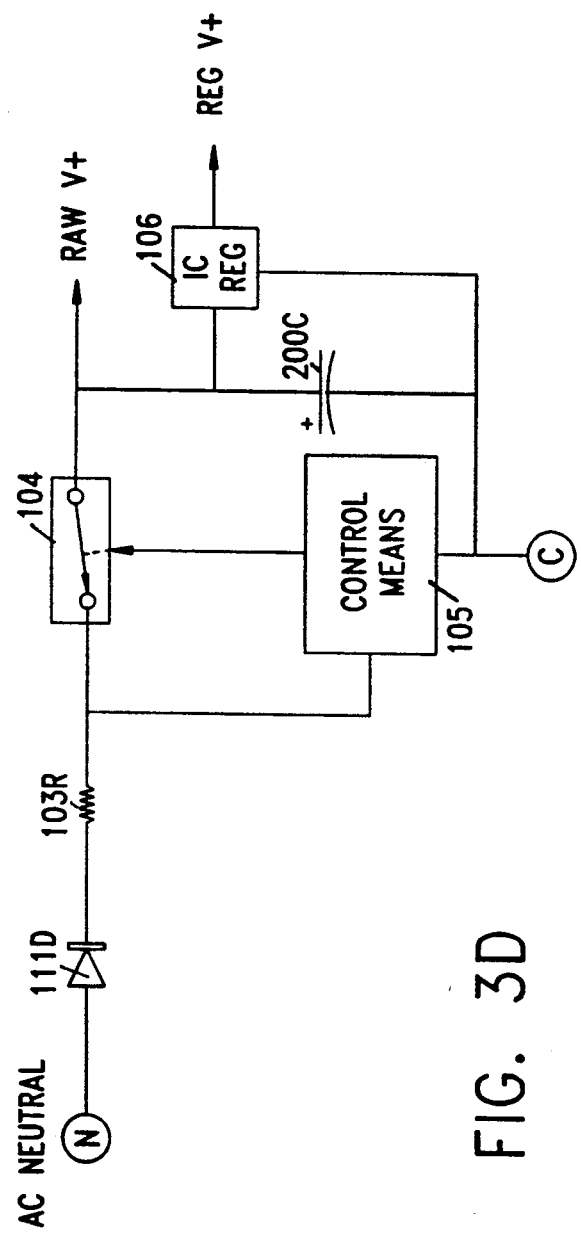
FIG. 3D illustrates an improved power supply connected with the AC neutral.
Figure 3F:
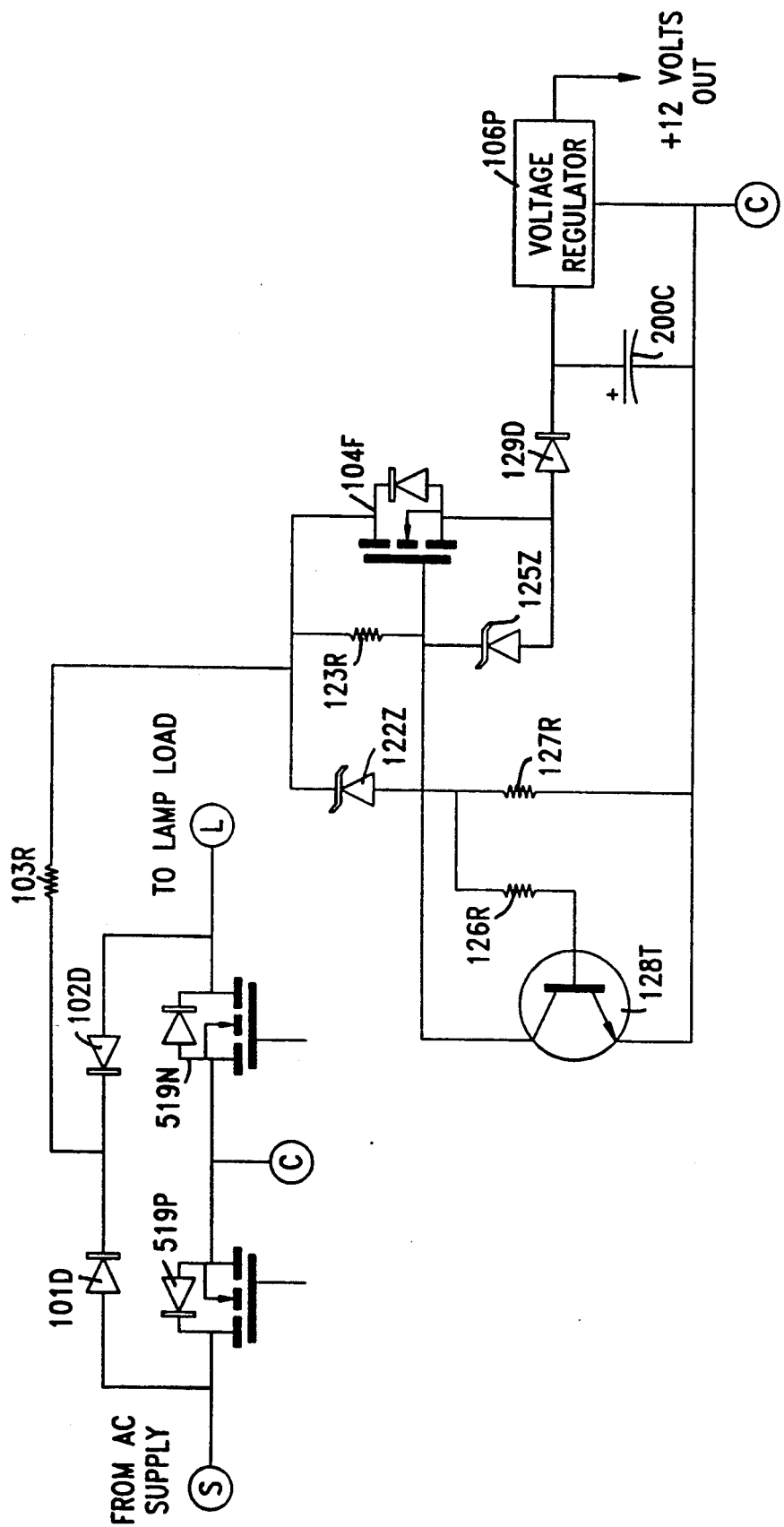
FIG. 3F is a schematic of the circuit of FIG. 3E connected across the semiconductor power devices in the manner of FIG. 3C.
Figure 3G:
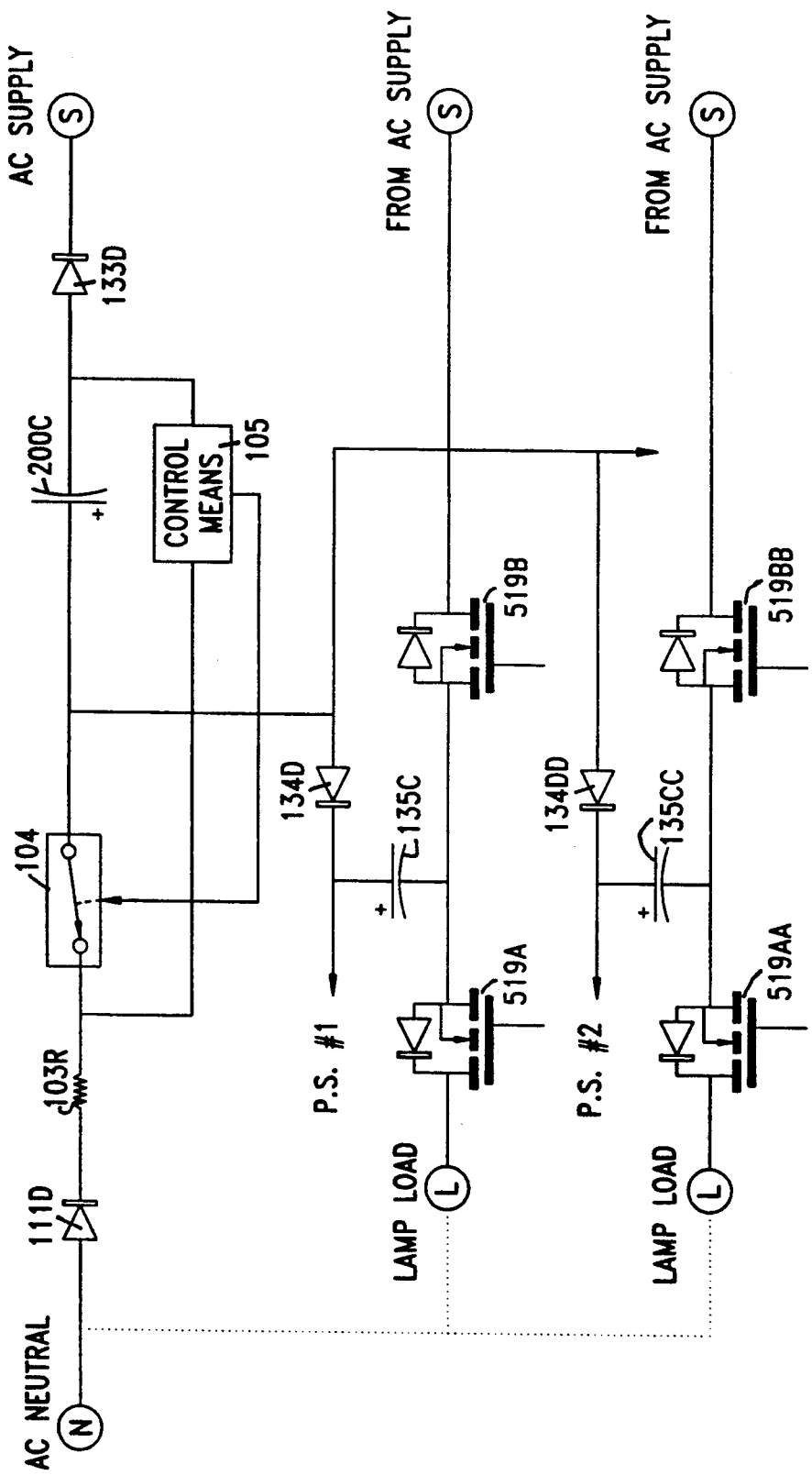
FIG. 3G illustrates a method of providing isolated power supply to multiple power stages from a common source.
Figure 3H:
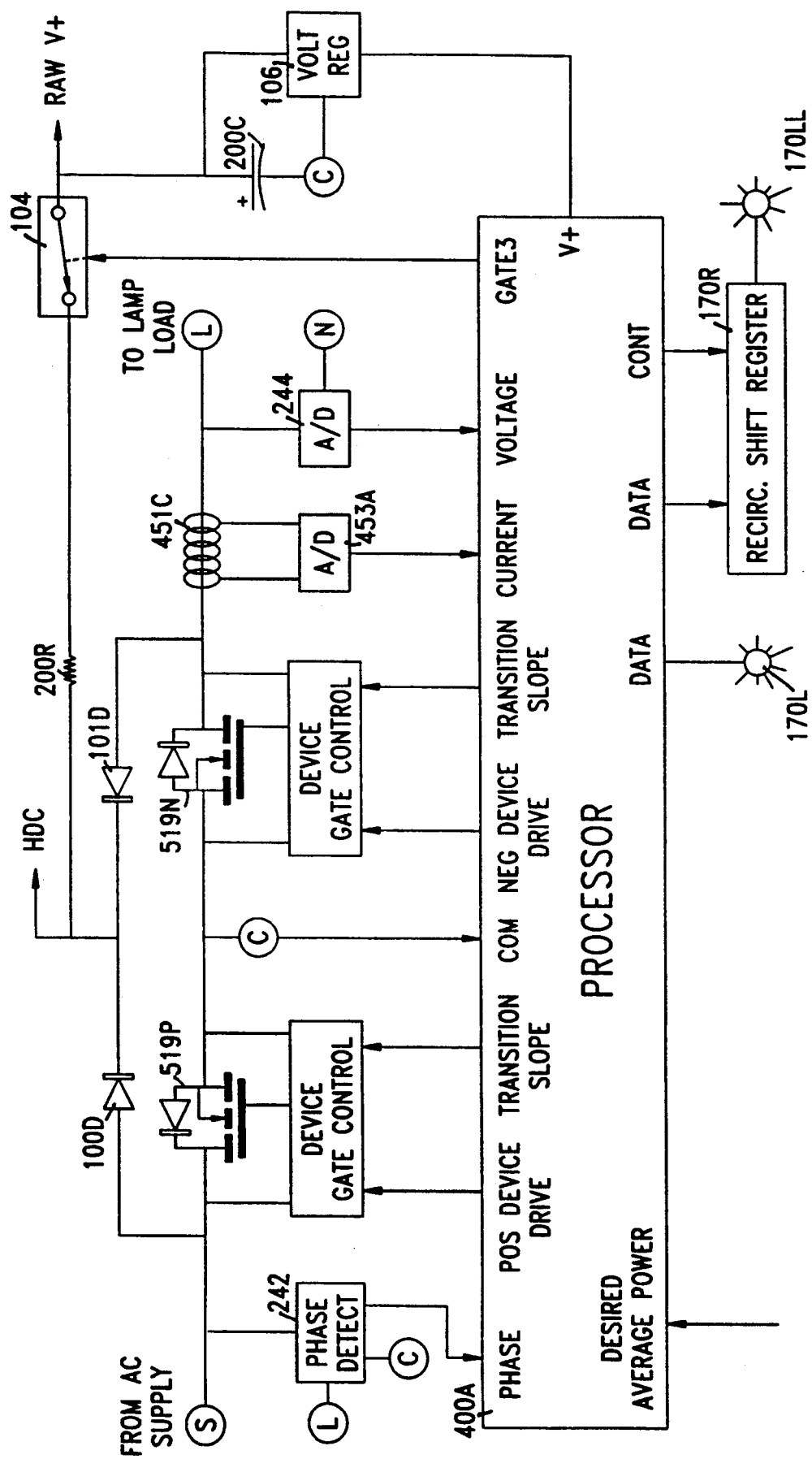
FIG. 3H illustrates a dimmer in which the power supply of the previous Figures is operated by the same means controlling the power semiconductors and in which various other disclosed improvements are provided.
Figure 4A:
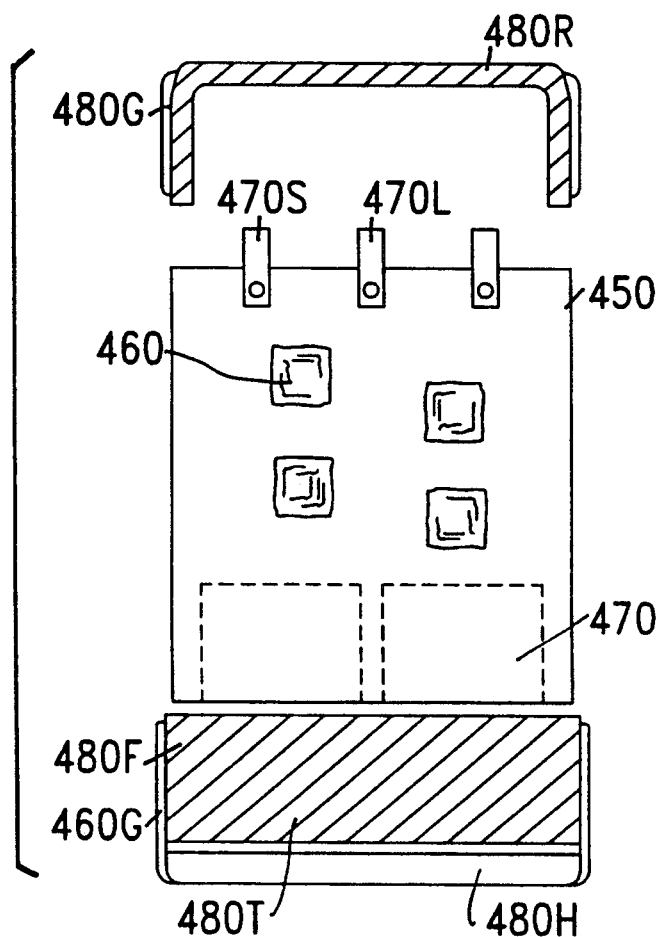
FIG. 4A is a partially exploded plan view of an improved mechanical design for a plug-in dimmer drawer.
Figure 4D:
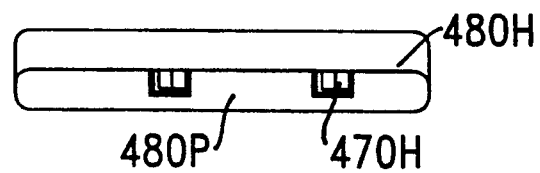
FIG. 4D is a front elevation of the assembled drawer.

A hardware embodiment like that of FIG. 3H can implement the method of FIG. 1I in software. At the desired phase angle, a transition is initiated by the processor 400A, generating a signal on its Device Drive output to the Device Gate Control means of the power device 519P or 519N of the appropriate polarity for the half-cycle. The Device Gate Control Means will begin to drive the gate of its power device at an initial transition rate set via the "Transition Slope" output from processor 400A. It is a property of such power stages that a change in the value applied to the power device gate may be required for some period before the device begins to change its conduction behavior, and that the amount of change required (and therefore the duration between the start of the change in the value applied to the power device gate and the beginning of the power transition) also varies from device to device within a batch and with other factors. The simplest method of accounting for this offset is to watch the voltage output of the power stage and declare the transition started when that voltage begins to change. Such a feature in desirable to produce a symmetrical transition shape. This determination of the start of the transition may be performed in hardware or software, and is here illustrated by the "active?" decision.

Once the transition has begun, a means, in this case processor 400A begins to progressively increase the speed or slope of the transition until the half-way point of the transition. This determination of the half-way point may be performed in hardware or software, by simply measuring voltage or by timing, or by other means.

Once the half-way point has been reached, the rate or slope of the transition is progressively decreased. With the change in direction at the half-way point, the result will be that the rate o slope will decrement to the starting value by the end of the transition.

The result will be a transition profile like that of FIG. 1H.

Other embodiments are possible. In an analog component design, a triangle wave can be produced by an integrator, with its apex at the half-voltage point, and that wave applied to the means controlling the rate of transition (such as a capacitor).

POWER DEVICE INITIALIZATION

Further improvements relate to restoring a power device that transitions in a given half-cycle to the initial condition required for its next transition.

Most SCRs, transistors, FETs, and IGBTs, presently will control only one polarity of the AC supply. Thus, two such power devices (or on device and steering diodes) must be provided, which, together with associated elements, comprise the semiconductor power controlling means of an AC dimmer. In either forward or reverse phase control using two power devices, each such power device has a transition in the half-cycle in which its polarity is correct, and requires restoration to its initial state prior to the next half-cycle of the same polarity.

In the case of forward (conventional) phase control dimmers using SCRs, the appropriate device is triggered into conduction at the desired phase angle. It is a property of SCRs that, once they begin conducting current, they will remain in conduction (even after removal of their gate drive) until that current flow is interrupted. As a result, once fired at the desired phase angle, an SCR will remain in conduction until the end of the half-cycle. As a result of this property, some SCR-based dimmer designs have simply "pulsed" gate drive at the desired phase angle, relying on the SCR to remain in conduction until the end of the half-cycle, when current flow will cease, and when, having no gate drive, the SCR will fall out of conduction. Other SCR-based dimmer designs continue gate drive until zero-crossing.

In the case of transistors, FETs, IGBTs, and similar power devices, the power device will conduct current of the appropriate polarity only so long as gate drive is present. Thus, for forward and reverse phase control and their variants, gate drive must be applied and removed, and both that application and removal must be controlled. The transition must be aligned with the desired phase angle, and the restoration or initialization to the condition prior to transition, conventionally, aligned with a zero-crossing.

In either forward or reverse phase control, it is undesirable that the initialization occur when the device will conduct, as a current/voltage transition will be produced having some, if only theoretical, EMI and thermal consequences. Thus, conventionally, when one aims at a zero-crossing point for initialization, it is desirable that one hit it.

Some form of phase detection is a feature of phase control dimmers, as phase angle firing must be related to the AC waveform, and the zero-crossing represents a convenient synchronization point. Phase information can also be used in phase-control controlled transition dimmers for power device initialization timing, whether by employing the same source as the phase-control triggering means or by providing an additional means for the function.

Various methods of phase detection have been employed.

One common method is to sense instantaneous voltage, and to declare a zero-crossing when voltage falls close to zero, as occurs around zero-crossing. With due allowances for tolerances, and to prevent false-triggering, the voltage at which a signal is generated is typically set significantly above true zero. As a result, two signals are generated around each zero-crossing; one where the instantaneous voltage falls past the set point towards zero-crossing, and the second where it rises past the set point after zero-crossing. Thus, this method does not precisely identify the location of zero-crossing.

On the other hand, highly-responsive voltage-based zero-crossing detection methods have been false-triggered by glitches in the AC waveform.

Figure 2A:
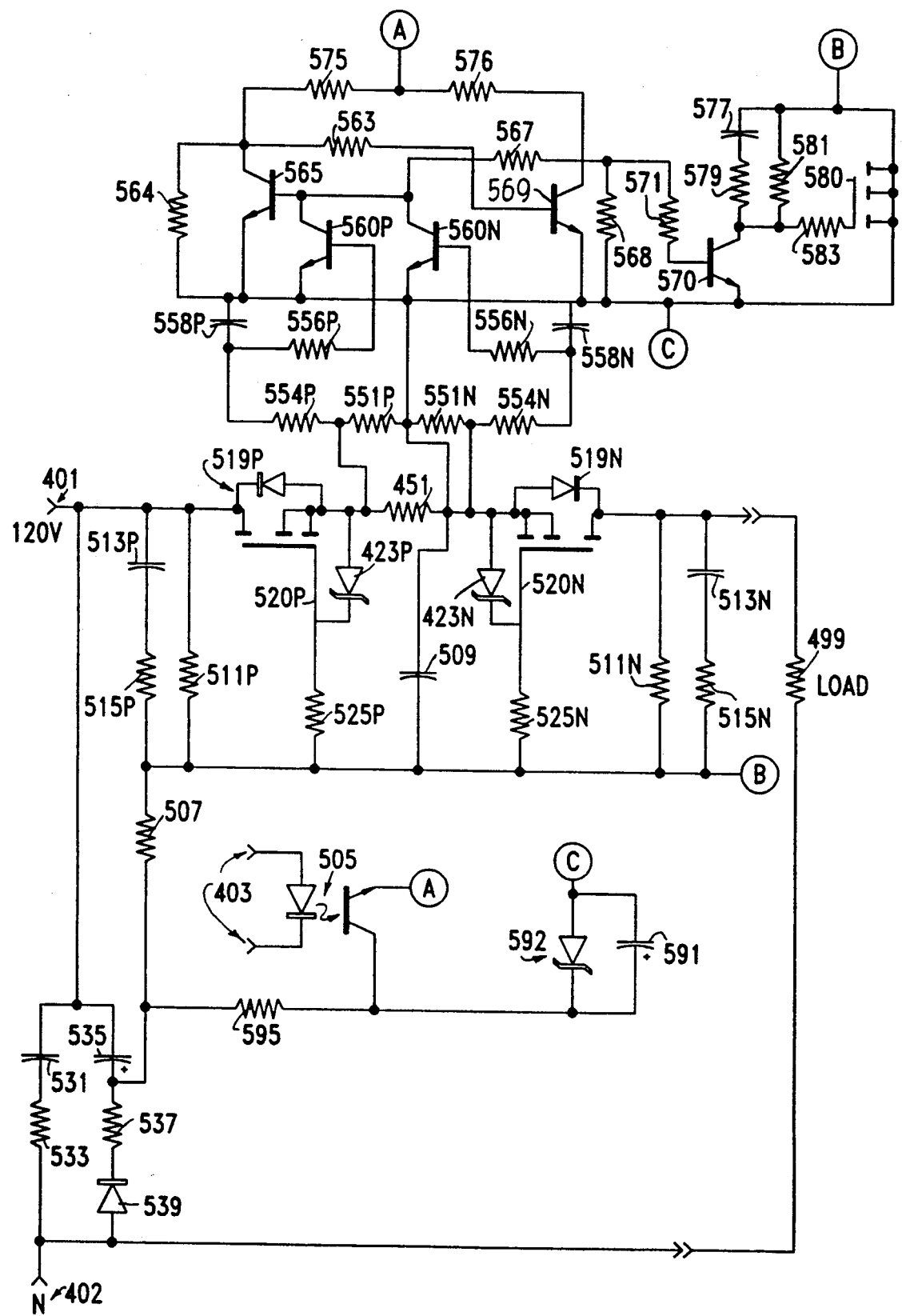
FIG. 2A illustrates a circuit design for a controlled transition power stage reproduced from the prior related applications.
Figure 2B:
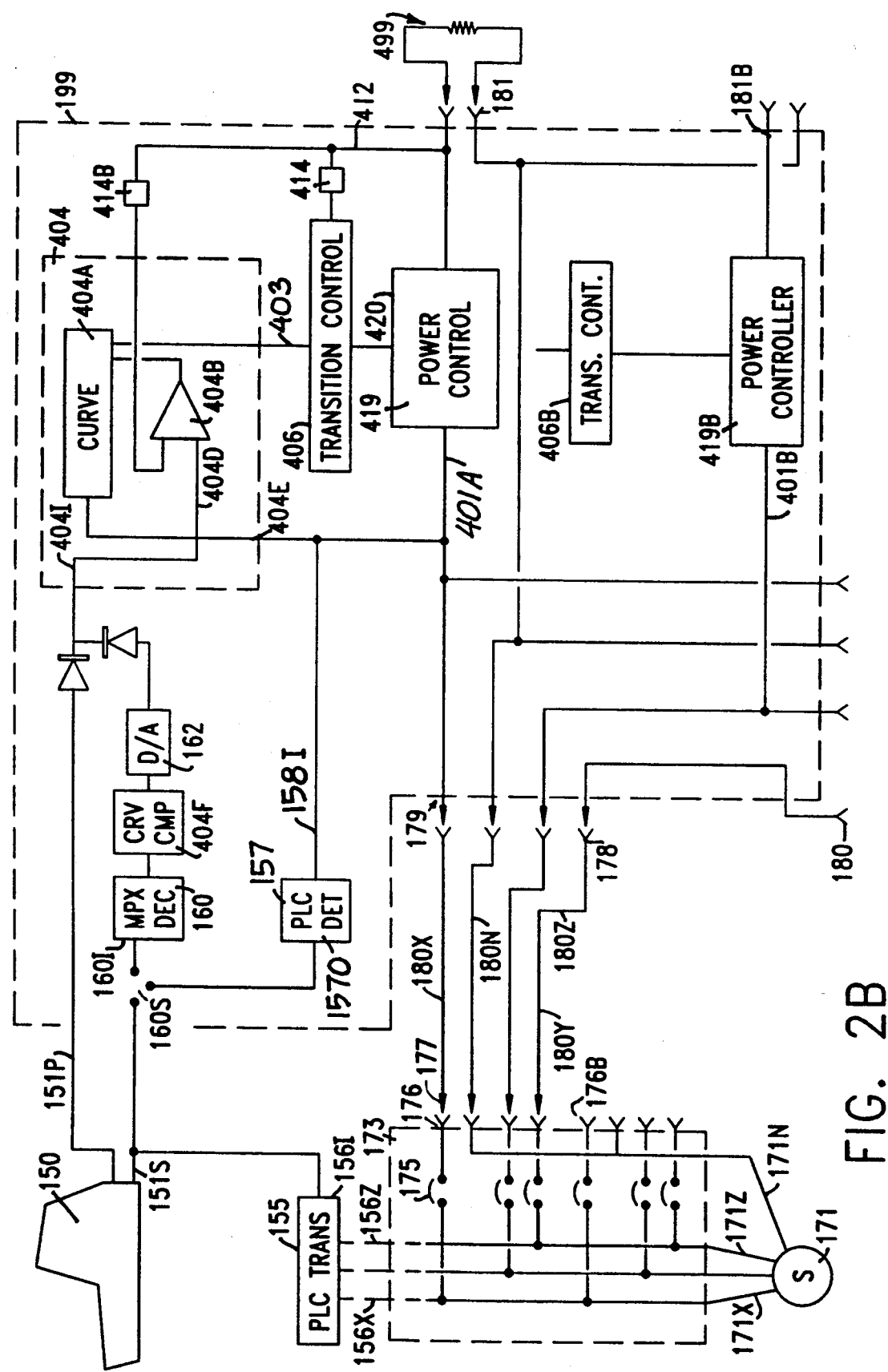
FIG. 2B is a block diagram of a distributed dimming system reproduced from the prior related applications.
Figure 2C:
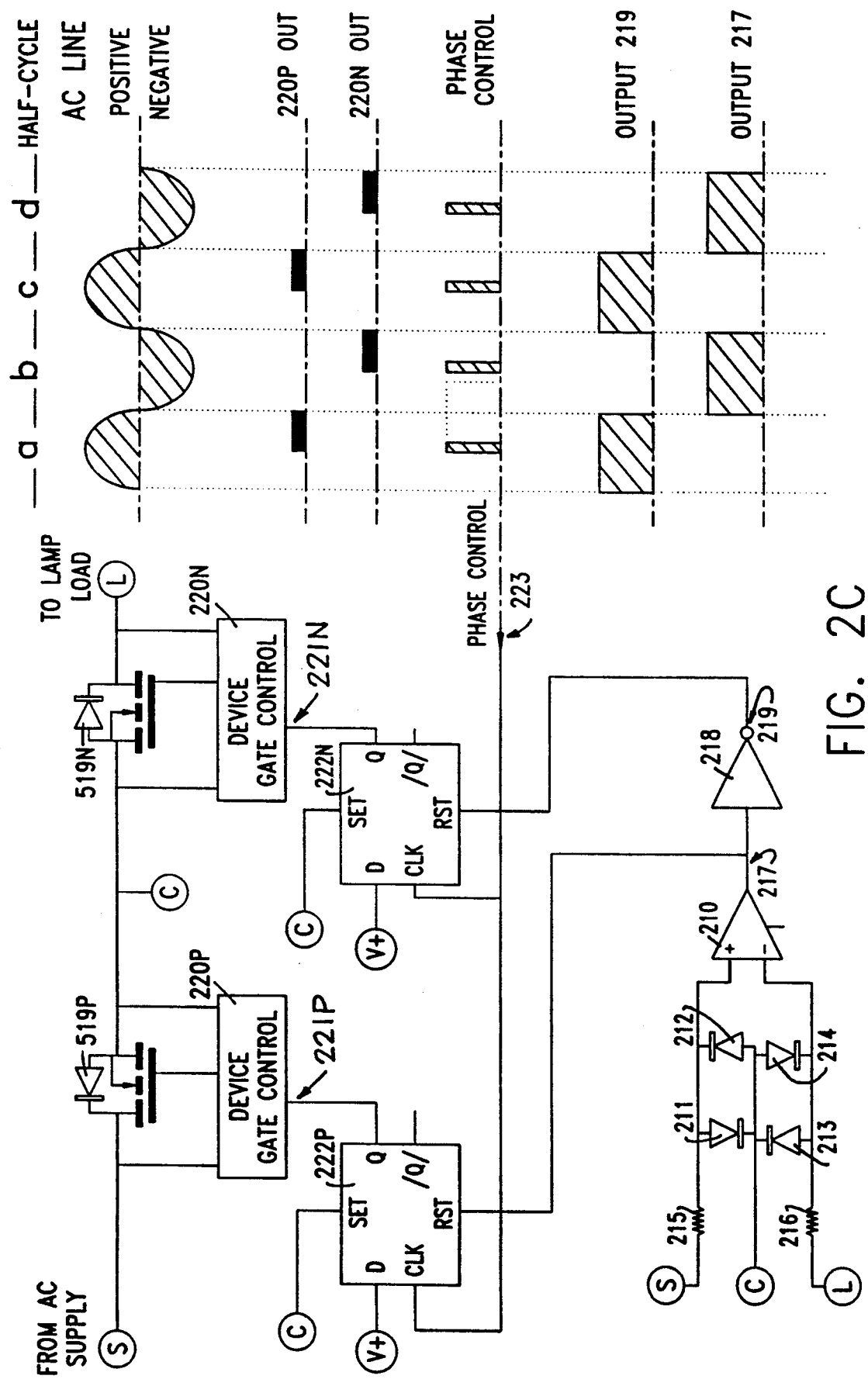
FIG. 2C is a diagram of a controlled transition power stage employing a more accurate means of detecting the end of the half-cycle.

FIG. 2C illustrates an improved zero-crossing detection method that produces more accurate data; which is substantially less subject to false triggering by glitches in the AC waveform; and which does not require access to a reference neutral.

The disclosed method looks for the polarity change in the AC waveform at zero-crossing, rather than low line voltage.

The circuit of FIG. 2C comprises a diode array 211, 212, 213, and 214 connected in front-to-back relationship across the series-connected power devices 519P and 519N, such that they form two inputs to comparator 210. In half-cycle "a", the positive half-cycle, when power device 519P can conduct, the voltage drop across device 519P is present across resistor 215. Diode 211 conducts, clamping the voltage at the minus input of comparator 210 to approximately +0.6 volts. During the same, positive, half-cycle power device 519N is shunted by an inverse diode, inherent or provided. As a result point "L" is approximately 0.6 volts below point "C". Point "L" is connected by resistor 216 to the positive input to comparator 210. The voltage difference between point "C" and point "L" is a diode drop, hence, there will be very little current flow through diode 214. Therefore the positive input to comparator 210 will be approximately minus 0.6 volts when compared to point "C". The difference between the positive and minus input to comparator 210 will be approximately 1.2 volts. This will cause comparator 210 to be saturated in a low state, and output 217 will be low. During negative half-cycles, the differential voltage relationships will reverse. In positive half-cycles the voltage across resistor 215 will vary with phase angle, but will always be significantly larger than the 0.6 volt drop across diode 211. The same is true for negative half-cycles with respect to resistor 215 and diode 213. (It should be noted that the circuit will function correctly without either diode 212 or 214 present, and that they are provided simply for protection if either device 519P or 519N should fail.) The output 217 of comparator 210 will thus change state with each change in the polarity of the AC waveform, and therefore at each zero-crossing. Output 217 is also inverted by 218 to produce a second, inverted output 219.

One benefit of the use of polarity detection per se is that "glitches" in the AC waveform are less likely to result in a false indication of zero-crossing. However, by connecting the polarity detector across the power devices (rather than between line and neutral) additional advantages are achieved. One is that a reference neutral is not required. This capability is desirable in architectural lighting applications, where a neutral is frequently not pulled to the wall-box in which a dimmer is mounted. Similarly, few modern high-density dimmer racks supply a reference neutral to the dimmer power stage drawer, and the disclosed designs may be of value in retrofitting controlled transition drawers to such dimmer racks. Further, the zero-crossing is signalled at the point at which current flow through the devices reverses, and not simply the point at which line voltage reverses; which allows the dimmer to continue to operate correctly when driving inductive loads like low-voltage lamps that are provided with step-down transformers and lamps requiring ballasts.

The change in output state of such a detector will also be more closely aligned with zero-crossing than most voltage schemes.

In determining polarity, a discrete polarity detector may be provided, or a sense input used for quantifying instantaneous voltage can also be employed, for example, by the use of two inverse-parallel diodes to dual inputs of an A/D convertor.

The value of a polarity detector is not limited to detecting zero-crossing.

In SCR-based dimmers, the gates of the two power devices are typically driven by a common means (although electrically isolated from each other). Gate drive to the power device whose polarity is opposite that of a given half-cycle will have no effect, as the device will neither conduct nor latch. In such SCR dimmers with common gate drive, the interruption of gate drive prior to zero-crossing, such as is produced by the low instantaneous voltage detection scheme described above, is actually desirable, as the continuation of gate drive past zero-crossing and into the half-cycle in which the second device is of correct polarity, will result in undesirably latching that device into conduction for that entire half-cycle (despite the removal of gate drive and its resumption at the triggering point actually intended for that device). Further, the "latching" property of the SCR conducting in the prior half-cycle will cause it to continue conducting to zero-crossing despite a premature removal of gate drive. Even if the SCR falls out of conduction shortly before zero-crossing, the effect on average power supplied to the load will be minimal, and corrected by any overall load feedback scheme.

In dimmers employing transistors, FETs, or similar devices, the application of gate drive to a power device of the wrong polarity for a given half-cycle may cause the device to become capable of conduction, when viewed in isolation, but, being of the wrong polarity, it will not conduct as no current can flow (as is true of SCRs). Unlike SCR-based dimmers, removal of gate drive from a conducting non-SCR power device prior to zero-crossing (in the case of forward phase control), produces an at least theoretically undesirable second transition under load. If the device is to be initialized at zero-crossing, then an accurate method of locating zero-crossing would seem to be required.

Refer now to FIG. 2C, which illustrates one improved method of driving and initializing power devices in a controlled transition power stage. Devices 519P and 519N are the power devices themselves, which are series-connected between the AC supply and load. Device gate control means 220P and 220N provide the transition control function, such that a rising edge received at their input 221P or 221N results in a transition to a substantially conductive condition and a falling edge produces a transition to a substantially non-conductive condition. The input 221P or 221N of each device gate control means 220N or 220P is coupled to the output of a corresponding latch 222P or 222N. The D input of each such latch is connected to V+, and its Clock input to the output of the phase control triggering means. The reset input of each latch 222P and 222N is connected to the output of the previously-described polarity detector, one such input being inverted by 218.

The operation of the circuit of FIG. 2C is as follows:

The illustrated dimmer is of the conventional phase control type, such that the half-cycle begins with neither device conducting. At the desired phase angle of the half-cycle, the phase control triggering means drives the phase control input 223, which is supplied to the Clock input of both latches 222N and 222P. As the D input to both latches is held up by its connection to V+, the result would be that the Q output of both latches would go high, resulting in a transition by both devices. However, the outputs of the polarity detector are connected to the Reset inputs to both latches, and one such output 219 is inverted. Thus, during the negative half-cycle, when the output 217 of comparator 210 is high, it will hold the Reset input to latch 222P high, such that its Q output will not go high, and no transition will be caused for device 519P. Conversely, 218 will invert the output of comparator 210 and the Reset input to latch 222N will remain low, such that the receipt of the phase control triggering signal via 223 on its Clock input will send the latch output high, initiating a transition to conduction by the power device 519N of the appropriate polarity.

At the end of the half-cycle, when the polarity detector reverses the state of outputs 217 and 219 at zero-crossing, the result will be the application of a Reset input to the latch 222N of the power device 519N in conduction, producing initialization of the power device; as well as the removal of Reset from the latch 222P for the other power device 519P, such that when the next Phase Control triggering signal is received via input 223, the operation of the circuit will reverse, and power device 519P will be transitioned into conduction.

With the use of the disclosed polarity detector, the initialization of the power devices may be made accurate enough to avoid a second transition under load.

The tolerance of any circuit for the control of such non-SCR devices must be considered with respect to variations in the timing behavior of its inputs; both the relationship between the phase control input and any additional inputs provided or signals generated, as well as the response of the power stage to an absence of phase control signal input. Such an absence of phase control signal can be produced when a phase control triggering means is brought to "zero" and no pulses are generated, as well as at "full on", when the phase control input may become a steady-state DC voltage having no edges.

By these standards, the circuit of FIG. 2C is relatively tolerant. As indicated by the Phase Control signal waveform, a phase control signal is required whose rising edge aligns with the desired firing angle, and whose falling edge can be at any point prior to the next rising edge of the next Phase Control signal. Such a power stage will respond to no Phase Control input by turning off. However if, with increasing phase angle, the Phase Control signal becomes a steady-state voltage (DC), the dimmer will, undesirably switch off again. (If the phase control triggering means is chosen or adapted with this characteristic in mind, such an effect can be avoided.)

Figure 2D:
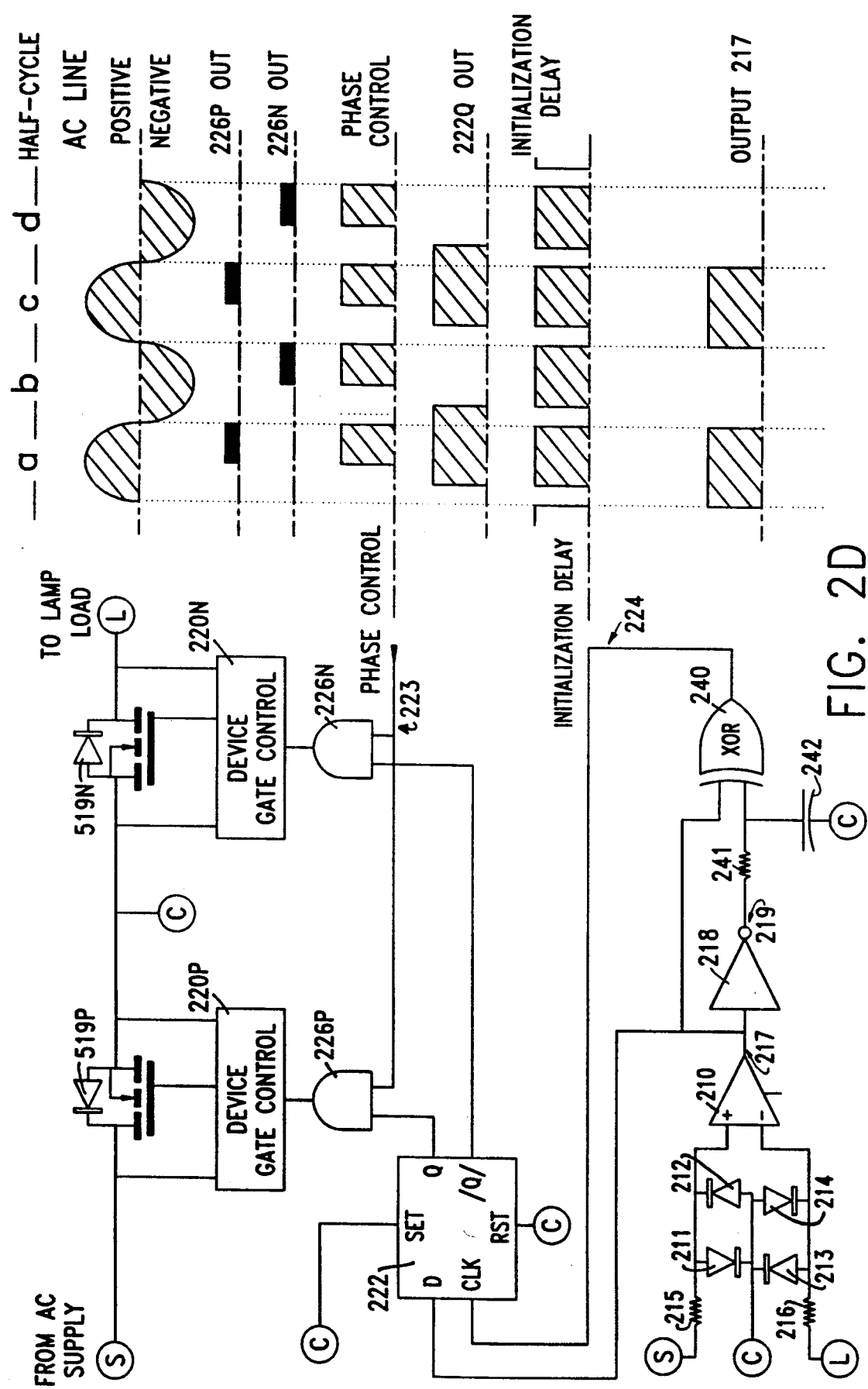
FIG. 2D is a block diagram of a controlled transition power stage responsive to a means generating a signal after the end of the half-cycle.

Refer now to FIG. 2D. Parts having the same function as those of FIG. 2C are identified with the same reference number. FIG. 2D differs from FIG. 2C in that it provides for a "Initialization Delay" signal; a signal that follows the true zero-crossing. It is not necessary, indeed not desirable, that this "Initialization Delay" signal align with the true zero-crossing; merely that it follow true zero-crossing—nor is the length (or even the consistency) of the delay between true zero-crossing and the "Initialization Delay" signal per se important.

"Initialization Delay" can be produced by any one of a number of means. One is to wait a delay (whether in hardware or software) after a relatively accurate means declares true zero-crossing. Thus a delay responsive to the polarity detector could be employed. Another method is to use a relatively inaccurate means that provides signals spaced-apart on either side of true zero-crossing (or at least one of which is spaced after it), such as the previously-described low instantaneous voltage method, and to employ the second signal (such as that produced when voltage rises again after zero-crossing) for "Initialization Delay". Another method is to examine the instantaneous voltage of the AC supply more generally, and to call "Initialization Delay" in response to an extended fall in instantaneous voltage followed by an extended rise (the relatively long sample period reducing sensitivity to AC supply "glitches").

In FIG. 2D, an Initialization Delay signal can be produced by the addition of three components: resistor 241, capacitor 242, and Exclusive-OR gate 240, to the previously-described polarity detector. The outputs of 210 and 218 are inverted square waves, and consequently never the same. Resistor 241 and capacitar 242 form a delay network, delaying the output 219 of 218. At a change of state of the output 217 of comparator 210, the result will be a similarity of states between 217 and delayed 219 for a period equal to the time necessary for the voltage through the delay network to reach the logic threshold of gate 240. Consequently, for every change of state of signal 217, the output of gate 240 go low starting at the change of state of 217 and lasting for a period of time depending upon the RC constant of 241 and 242 and the logic threshold characteristics of gate 240.

This Initialization Delay signal is provided via 224 to the Clock input of latch 222. The phase/polarity signal on output 217 is provided to the D input of latch 222, whose Set and Reset inputs are connected to point "C", the common point for the gate electronics. One output, Q, of latch 222 is provided to one input of AND gate 226P and the /Q/output to one input of AND gate 226N. The second input to both AND gates is connected to a phase control triggering signal input 223.

The operation of the circuit is as follows: At the beginning of the positive half-cycle, neither power device 519P nor 519N is conducting. The polarity detector will be holding high the D input to the latch 222. Latch 222 will be clocked by application of the rising edge of the Initialization Delay signal shortly after zero-crossing, resulting in the Q output of the latch going high, raising one input to the AND gate 226P of the power device of the appropriate polarity. At the desired phase angle, the phase control triggering means will drive input 223, and the second input to the AND gates will go high. The output of the AND gate for the device of the appropriate polarity (in this case, 519P) will go high, and that device transition into conduction. At the end of the half-cycle, the outputs of the phase/polarity detector will reverse state. However, the output Q of the latch 222 will remain high until clocked by application of the rising edge of the next Initialization Delay signal to its Clock input. Thus, the device conducting in a given half-cycle will not be initialized until either the falling edge of the Phase Control signal or the rising edge of the Initialization Delay signal, whichever comes first.

The circuit of FIG. 2D requires a Phase Control signal whose rising edge aligns with the desired firing angle, and whose falling edge is not earlier than zero-crossing nor at or after the rising edge of the Initialization Delay signal. This circuit has the advantage that the signal used for initializing the conducting power device need not be precisely aligned with zero-crossing. However, the circuit of FIG. 2D is not practical in that it cannot transition off a power device in conduction in response to an excessive current demand without additional provisions.

Figure 2E:
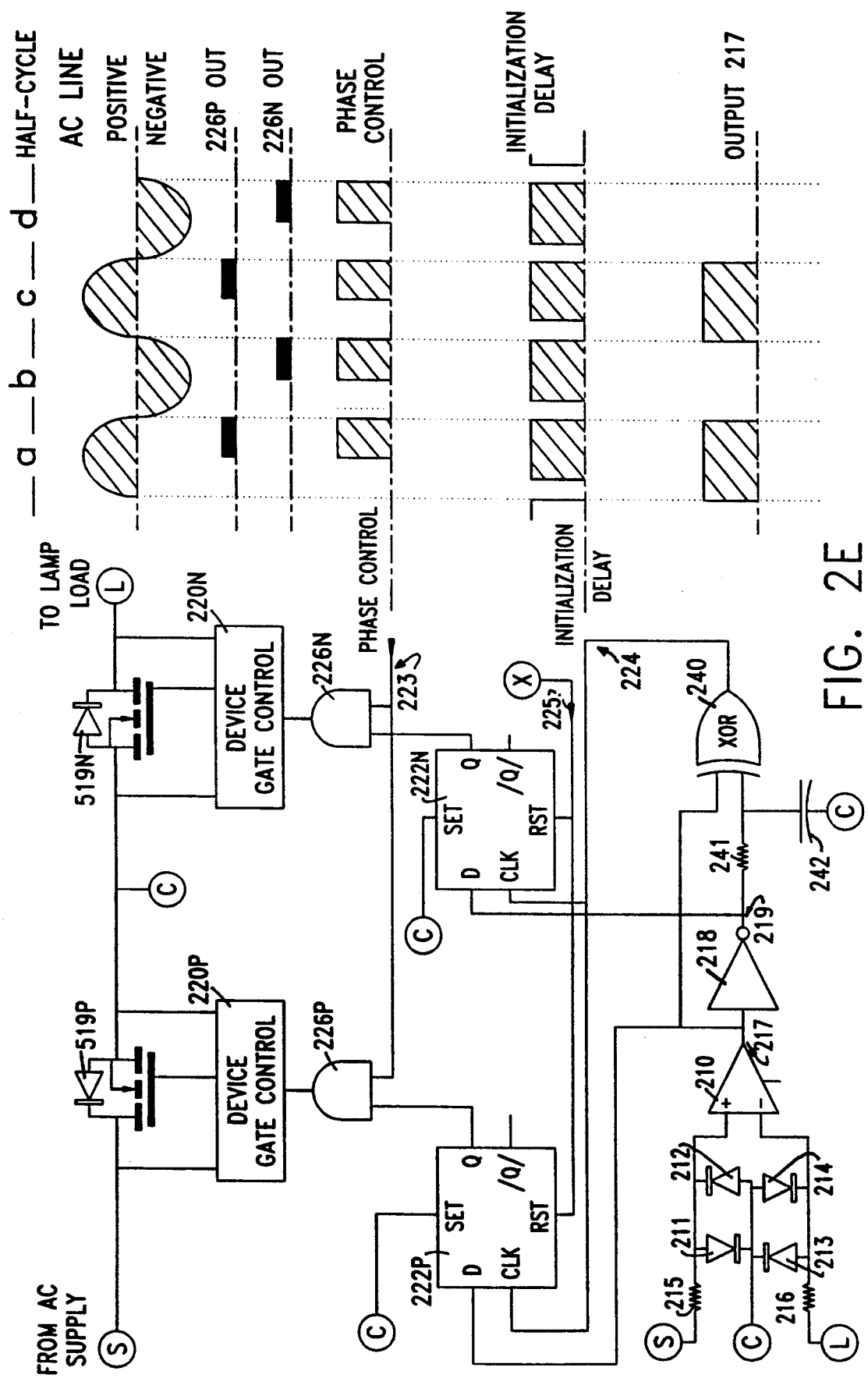
FIG. 2E illustrates the circuit of FIG. 2D improved with the addition of a provision to respond to excessive current demands.

FIG. 2E corrects this difficulty. Two latches 222P and 222N are provided, whose inputs are configured in substantially the same manner as the previous Figure, except that they separately drive the device gate control means associated with the power devices, and their Reset inputs are connected with the current-limiting means via 225 at point "X". Operation of the circuit of FIG. 2E is similar to that of FIG. 2D in that the combination of a Phase Control signal and a phase/polarity signal at the input of the latch 222P or 222N for the power device appropriate for the current half-cycle polarity will transition that power device into conduction. The power device is initialized at the loss of the Phase Control signal, which, again, may occur at the zero-crossing or after it, so long as it is prior to the rising edge of the Initialization Delay signal.

The circuits disclosed in FIGS. 2D and 2E will respond properly to loss of Phase Control signal in either "off" or "full on" modes. The maximum phase angle at which a transition can occur will not be greater than the phase angle at which the Initialization Delay signal terminates, which, desirably, should not be more than a reasonable fraction of the total half-cycle time (although a relatively protracted such delay will have no significant effect on maximum RMS volts out).

Although the circuit of FIG. 2E has some advantages, it still requires a relatively accurate signal (in this case Phase Control) which has one edge at or not earlier than zero-crossing, if a second transition under load is to be avoided. Subsequent Figures illustrate circuits in which no such accurate signal is required, and indeed, in which the initialization of the conducting device is deliberately delayed until after zero-crossing. In fact, with the reversal of line polarity at the end of the half-cycle, that power device will no longer conduct, and so the delay in initialization until after zero-crossing has no undesirable effects. However, were common gate drive employed for both power devices, the non-conducting device, enabled by gate drive would, for the brief period after zero-crossing (when it becomes of the correct polarity again), briefly conduct. It would then be initialized to non-conduction with the other power device, only to be transitioned to conduction again at the desired phase angle—resulting in a second transition in the same half-cycle. But, by separately driving the two device gates in the manner disclosed, this effect is avoided, and the result is a controlled transition power stage that initializes its power devices without the requirement for accurately locating true zero-crossing.

In fact, it will be seen that a power device conducting in one half-cycle can be restored to its initial condition at any point in the following half-cycle, so long as it has been initialized before the zero-crossing at the beginning of the next half-cycle in which it will conduct (it is of the correct polarity). As has been seen, this delayed initialization can occur at any point in the half-cycle so long as it falls in the non-conducting period of the power device, and a variety of means can be used to generate such a signal, some of which have previously been described.

Figure 2F:
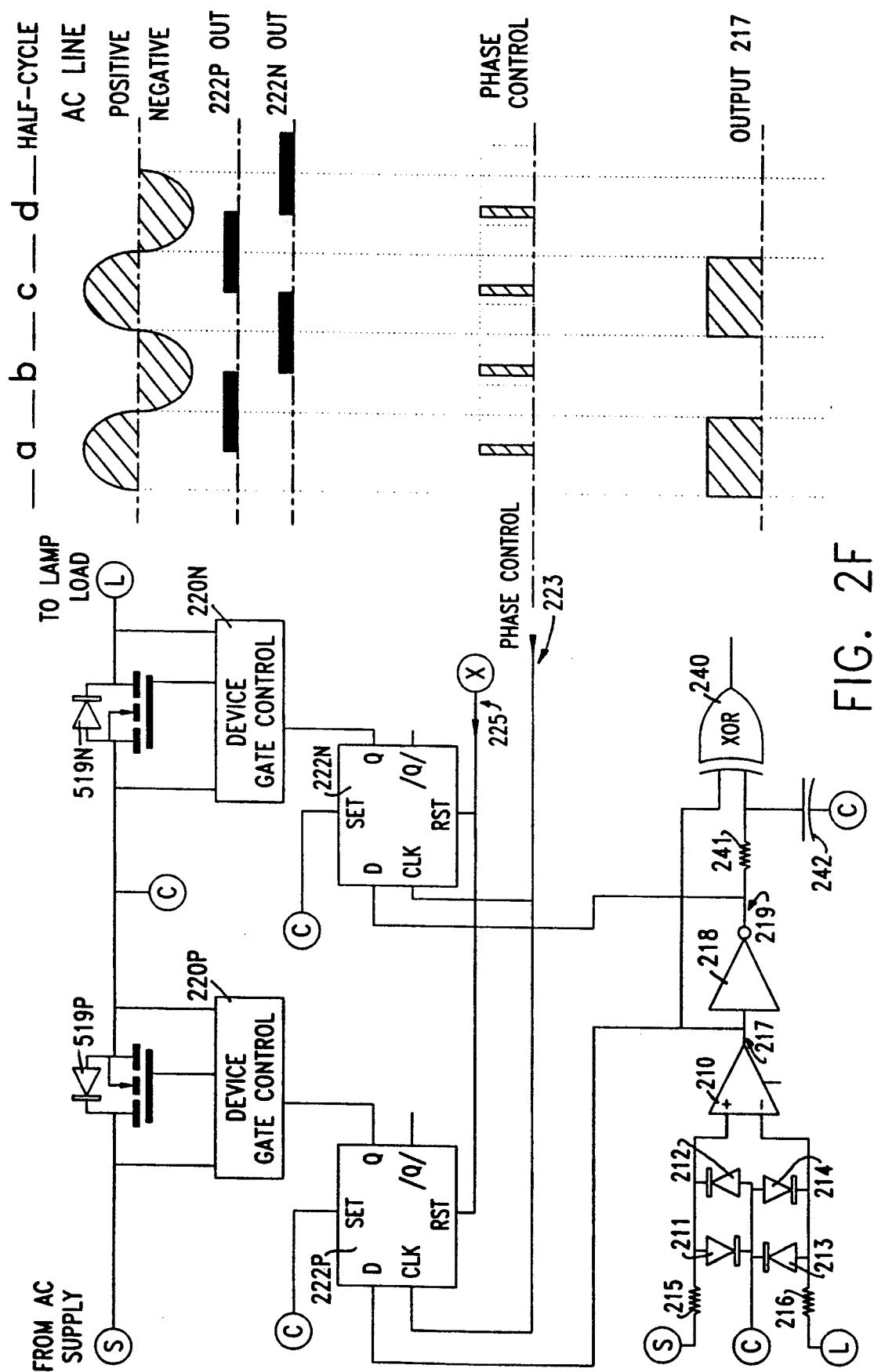
FIG. 2F is a circuit that delays the initialization of the conducting power device until after the zero-crossing.

In fact, FIG. 2F illustrates a circuit in which the Phase Control signal is used for both phase angle control of the conducting power device and initialization of the now non-conducting power device used in the previous half-cycle. The outputs 217 and 219 of the phase/polarity detector provide the D input to the latches 222P and 222N, and the Phase Control signal is provided via 223 to their Clock input. It will be seen that the rising edge of a Phase Control signal will clock the state of the D input to the latch 222P or 222N, which will appear at the Q output of the latch. Thus, the D input of the latch for the power device of the correct polarity will be high, and the Q output of the latch will go high at the desired phase angle, causing the device gate control means to bring the power device into conduction, where it will remain through the zero-crossing at the end of the half-cycle and until the next Phase Control signal, when the now low state of its D input from the phase/polarity detector will be clocked in, sending the output of the latch low, and with it, initializing the power device to non-conduction.

Without a means to send the conducting device to non-conduction in the event of low load impedance, the circuit of FIG. 2F is not a practical one, and so a means for this purpose, illustrated as the application of a signal from the current- and dissipation-limiting means via input 225 at point "X", is provided. Without such a requirement (or if achieved by other means), it will be recognized that a single-latch version equivalent to FIG. 2D can also be produced.

Further, the illustrated circuit has one very undesirable trait. If, by design, adjustment, or drift, the phase control triggering means ever produces an "off" or "full" output state (one in which the Phase Control signal at input 223 either stays low or high), the result will be that one power device will remain in conduction for entire half-cycles, and the other in non-conduction for entire half-cycles—feeding half-wave DC to the load.

Figure 2G:
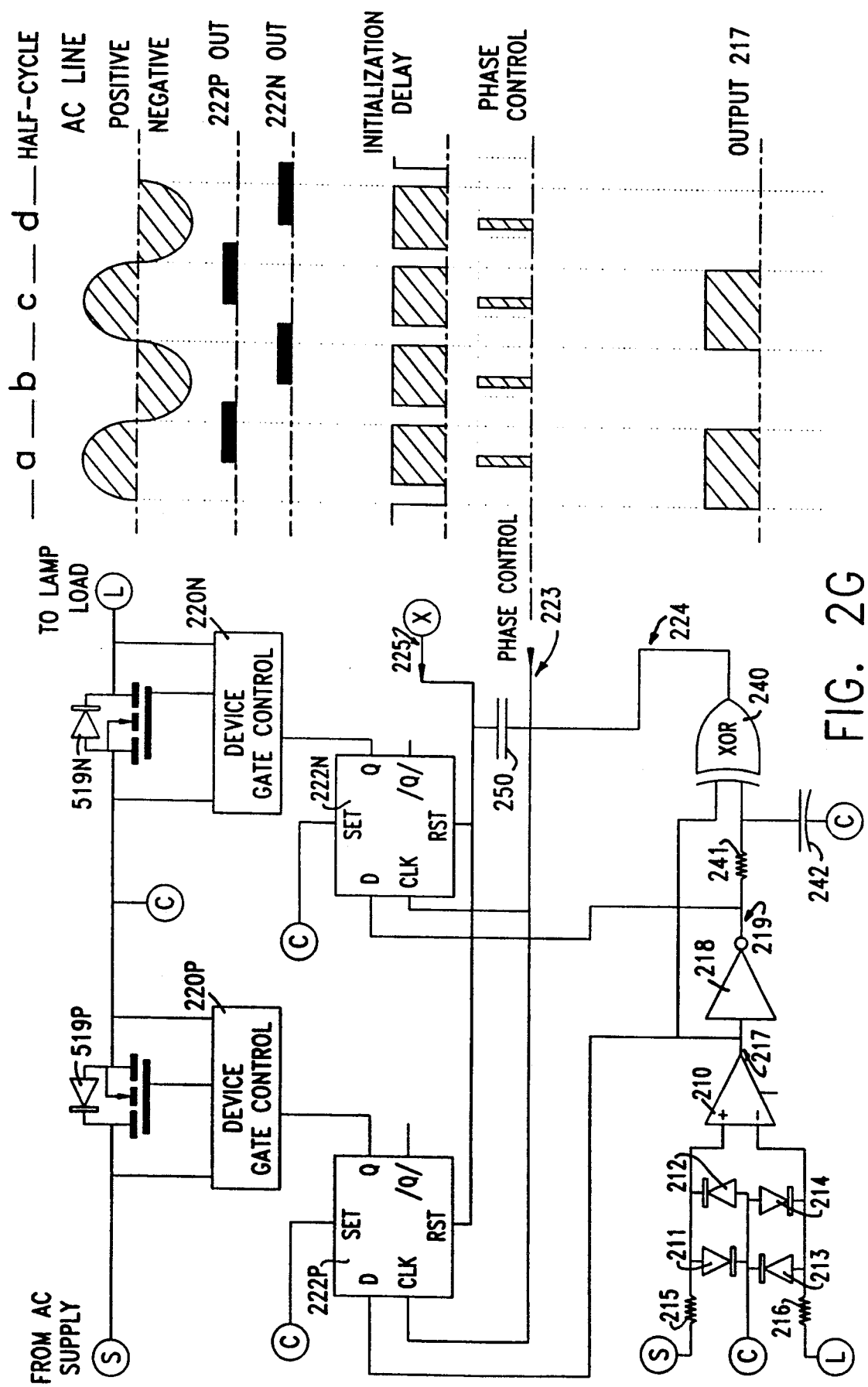
FIG. 2G is an improved version of the circuit of FIG. 2F.

It is thus highly desirable that a more positive means is provided of assuring that a conducting power device is restored to non-conduction at some point in its non-conducting half-cycle, and FIG. 2G accordingly illustrates the application of the Initialization Delay signal via 224 to the Reset inputs of the latches for this purpose. As has been noted, there are many means of generating such a signal, which should not be understood as limited. Capacitor 250 functions as an edge detector such that it is the positive-going edge of the Initialization Delay signal that resets the latches. As previously described, a relatively "sloppy" signal occurring at some time in the half-cycle can be employed for "Initialization Delay".

Figure 2H:
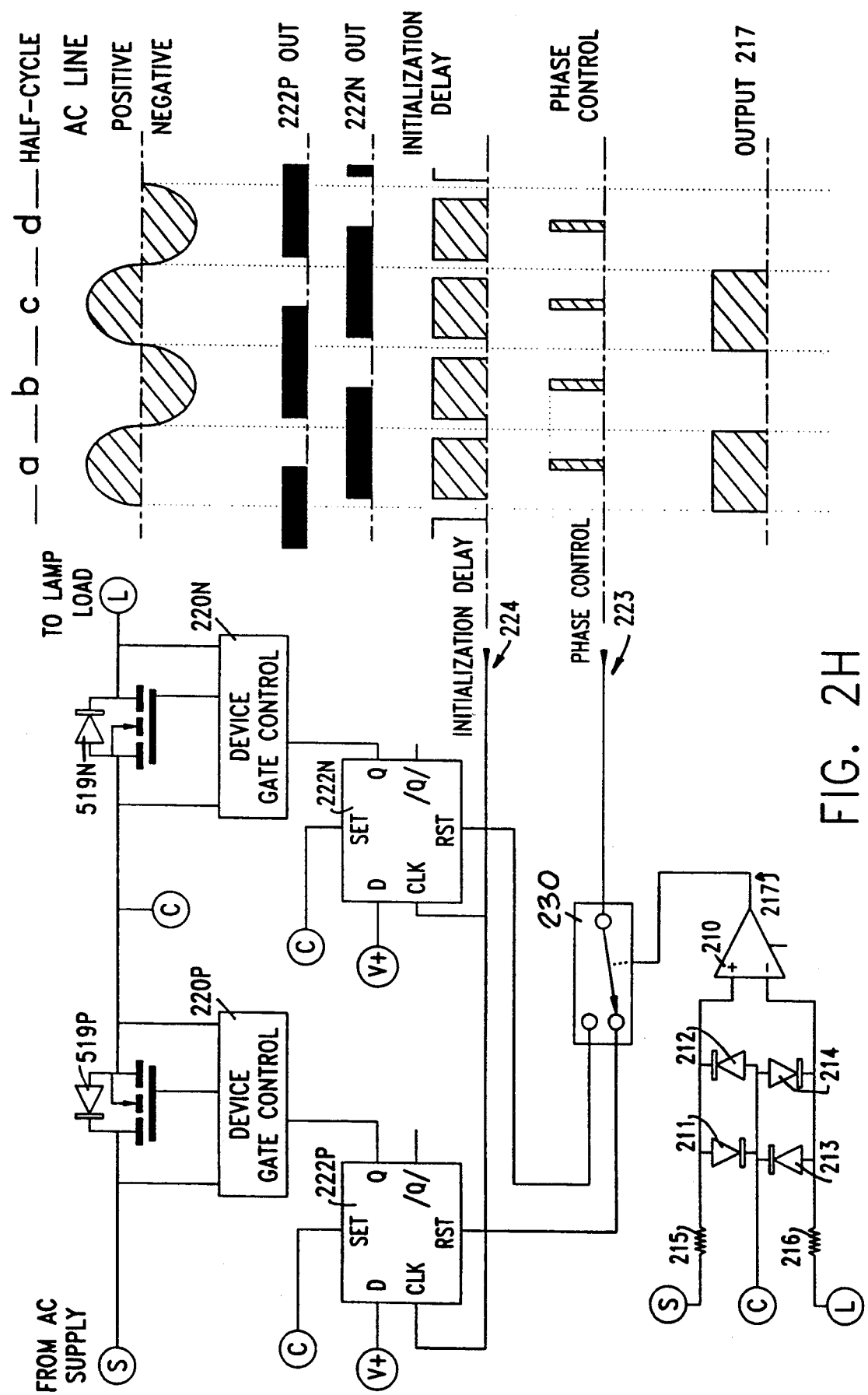
FIG. 2H is a block diagram of a controlled transition power stage that is highly stable in operation.

FIG. 2H illustrates a still more stable approach. In this Figure, a means 230 directs the Phase Control signal from input 223 to the Reset input of the appropriate latch 222P or 222N, depending upon the phase/polarity of the AC supply. The dimmer, which is of the reverse phase control type, begins a given half-cycle with the power device of the appropriate polarity having been preset into conduction by the output of its latch 222P or 222N being high. At the desired phase angle, the phase control triggering means generates a signal via input 223 that is directed to the Reset input of the latch 222P or 222N of the currently conducting power device; resetting the latch and causing the power device to transition into non-conduction. The Initialization Delay signal is applied via input 224 to the Clock inputs of the latches 222P and 222N and clocks both. The D inputs to these latches being held high by V+, the output of the latch for the power device that had been transitioned off in the previous half-cycle will go high again, initializing that power device early in its non-conductive half-cycle so that it is preset conductive for the next half-cycle in which it is of the correct polarity. The latch for the device that must conduct in the current half-cycle was preset at the beginning of its previous, non-conducting half-cycle, and the receipt of a second "Initialization Delay" pulse will have no effect. While the phase/polarity detector illustrated can be employed, a "sloppy" detector of, for example, the low instantaneous voltage type, can be employed. Further, another "switch pole" can be provided in parallel to means 230 that serves to direct the signal used for "Initialization Delay" only to the latch for the currently non-conducting power device.

The circuit of FIG. 2H is very stable with respect to extreme Phase Control signal conditions.

It will be understood that many methods of achieving the object of initializing a power device that conducts in one half-cycle at a point subsequent to that at which it ceases to conduct are possible. It will, for example, be seen that the process of FIG. 1D provides for this feature. Further, while many of the Figures illustrate forward phase control operation, reverse phase control power stages can be built using similar methods (and vice versa).

It should be noted that it is also possible to generate zero-crossing information for device initialization by employing a pilot thyristor in the drive circuit, such that it is coupled to the AC line in such a manner that it "latches" until zero-crossing, and serves, for example, in the role of a "pilot relay", maintaining drive to the power device gate. Thus, the "latching" property of thyristors is used to impart similar behavior to a non-thyristor.

USE OF BI-DIRECTIONAL TRANSITIONS

It will be understood in the context of FIG. 1J of the parent application, that modes of operation are also possible in which no "reset" of the power device is necessary, as a given power device transitions from non-conduction to conduction at the desired phase angle in one half-cycle, and transitions back to non-conduction at the desired phase angle of the next half-cycle of the same polarity. In addition to obviating the need for device initialization, such a waveform holds out the prospect of reducing or eliminating excess neutral currents.

POWER SUPPLY

The disclosed phase/polarity detector operates without a neutral reference, with the advantages previously described. Power supply for the operation of active electronics in the power stage can be generated across the power devices, provided that the maximum phase angle is limited. A limit sufficient to provide adequate raw voltage has no significant effect upon maximum average power delivered to the lamp load.

In FIG. 3C diodes 101D and 102D are applied to a controlled transition power stage as shown in a manner analagous to that used in some prior art phase control dimmers to generate power supply across the devices. It is a property of such an arrangement that voltage will be generated during that portion of each cycle during which the power device of the appropriate polarity for the half-cycle is in its non-conducting condition. Thus, as the phase angle at which the power device is transitioned is varied, so too is the maximum instantaneous voltage produced. When the power device is non-conducting close to zero-crossing, a DC voltage of more than 20 volts can readily be produced. At a phase angle at which the power device is non-conducting for at least 90°, a voltage in excess of 160 volts can be produced. As a result, the DC voltage present at HDC fluctuates widely. This requires the use of some method of limiting maximum voltage to within the safe operating limits of the active electronics to be supplied.

FIG. 3B illustrates a traditional passive arrangement for providing this limitation. Capacitor 107C is a storage reservoir that may optionally be provided. If provided, the problem arises that 107C must be a component capable of withstanding (given adequate safety margins) 250 volts, and therefore is both physically large as well as expensive. 110R is a series dropping resistor. Diode 108Z is a zener regulating diode. Alternatively 109C can be used as the sole storage capacitor. This has the advantage that the maximum voltage applied across capacitor 109C will be limited to the threshold of zener diode 108Z. However, even in this case, fluctuations in voltage at HDC will result in wide variations in the current supplied through dropping resistor 110R and the current through zener diode 108Z. Assuming active electronics drawing 0.05 Amperes at 15 volts, and a range of 30 volts to 169 volts at HDC, it can be shown that zener diode 108Z will have to be capable of dissipating 7 watts and resistor 110R 78 watts.

FIG. 3C illustrates a method of exploiting the voltage available across the power devices that is not subject to the large thermal losses of the circuit of FIG. 3B. In the circuit of FIG. 3C, a means 104, illustrated in relay form, is connected between HDC and storage capacitor 200C. A surge limiting resistor 103R is provided to protect diodes 101D and 102D and capacitor 200C from current surges Control means 105 is coupled effectively between HDC and the common point C and senses the voltage available Upon detecting a voltage less than a predetermined value, control means 105 will cause switch means 104 to connect the storage means 200C with HDC. Current through the circuit will charge storage means 200C until the available voltage rises above the threshold, at which point, control means 105 will disconnect the storage means 200C from HDC and current flow will cease. The result will be that the voltage on 200C will never exceed the predetermined threshold and the dissipation required for resistor 103R will be minimal. If fine regulation is required, an optional voltage regulator 106 may be added, the limits on the maximum voltage at storage means 200C having the added benefit of not requiring regulator 106 to drop excessive voltages in storage means 200C, thus minimizing its dissipation. As a result, well-known integrated-circuit voltage regulator packages can be employed.

FIG. 3D illustrates that a similar circuit can be used when connected to AC neutral. Diode 111D is employed as a half-wave rectifier FIG. 3E illustrates a specific circuit for the arrangement of FIG. 3D. FET 104F is used for the switching means. Control means 105 comprises resistors 123R, 126R, and 127R; zener diodes 122Z and 125Z; and transistor 128T. With the instantaneous voltage provided at the anode of diode 111D less than the predetermined amount, zener diode 122Z is non-conductive. Hence, resistor 127R grounds the base of transistor 128T, causing 128T to be maintained in a non-conductive state. The voltage present at the anode of diode 111D flows through resistor 123R, raising the gate voltage of 104F, causing 104F to come into conduction, coupling voltage supplied via diode 111D through diode 129D to capacitor 200C. Zener diode 125Z is provided to protect the gate of FET 104F from excessive voltages. When voltage at the anode of diode 111D rises to a level causing zener diode 122Z to conduct, current will be applied to resistor 127R. When the voltage produced increases above the threshold of transistor 128, current will flow through resistor 126R and the base of transistor 128T. This causes transistor 128T to conduct. The collector of transistor 128T shunts the current from resistor 123R, removing gate drive from FET 104F. This causes FET 104F to become non-conductive, effectively disconnecting capacitor 200C from the current of diode 111D. The effect of this circuit is therefore to limit the voltage to which storage means 200C is charged to less than the zener voltage of zener diode 122Z. (That voltage is limited by the voltage drop across FET 104F, which is relatively stable, and the zener voltage of zener diode 122Z can be selected to compensate.) Resistor 126R limits base current provided to transistor 128T to safe levels. Diode 129D prevents back-feeding of current from capacitor 200C.

FIG. 3F illustrates the circuit of FIG. 3E applied to the arrangement of FIG. 3C.

In all such cases, the voltage regulator 106P is optional.

The common point "C" of all previously-illustrated circuits has a voltage potential that varies with respect to that of the AC supply and neutral, as well as relative to the corresponding common point of other power stages, depending upon the conduction angle of their active power device. As a result, active electronics referenced to common in this manner cannot share a common power supply bus, requiring the duplication of a power supply for each such power stage. FIG. 3G illustrates a method of providing sufficiently isolated power supply to multiple power stages from a common source. The function of diode 111D, resistor 103R, capacitor 200C, switch means 104, and control means 105 are substantially the same as in the previous Figures. As in the circuit of FIG. 3D the circuit of FIG. 3G employs a half-wave rectifier active during the negative half-cycle of the AC line. The negative side of capacitor 200C is here coupled to the AC line via diode 133D so as to prevent reverse flow of current during the positive half-cycle. This circuit will provide a voltage on capacitor 200C that is positive with respect to the AC line. During negative half-cycles the common point of the two illustrated power stages will effectively be coupled to the AC line by the inherent diode in devices 519A and 519AA, the common point being not greater than a diode drop above the AC line. Hence, the negative terminal of capacitors 135C and 135CC will effectively be at the same voltage as the negative terminal of capacitor 200C. Therefore, the voltage across capacitor 200C will be provided through diodes 134D and 134DD, charging capacitors 135C and 135CC to the voltage of capacitor 200C, minus a diode drop. This provides power supply for the active electronics associated with each power stage via P.S.#1 and P.S.#2. During positive half-cycles, the voltage at the common point of power stages will vary greatly, depending upon the conduction angle that the power stage has been set to. When power device 519A comes into conduction, it will raise the voltage at the common point to that of the AC line, raising the voltage at the anode of 134D, causing it to decouple capacitor 135C from capacitors 135CC and 200C. In like manner, when power device 519AA conducts diode 134DD will decouple capacitor 135CC from the other capacitors. In this manner, the power stages are coupled to a common power supply only when their relative potentials are correct for the transfer of power from the common power supply to the local storage means associated with each power stage.

FIG. 3H illustrates a dimmer in which the power supply of the previous Figures is operated by the same means controlling the power semiconductors. In that Figure, the improvement relative to the prior Figures is that the voltage supplied to the storage means 200C is controlled without a separate means for that purpose. In the illustrated embodiment, in fact, it can be controlled without reference to the actual voltage available to the storage means. It can be predicted with relative confidence what the voltage available across the power devices will be at various phase angles when the appropriate one of power devices 519P or 519N is non-conducting. Switch means 104 may be rendered conductive only during those portions of the half-cycle in which the voltage across the power devices will be less than or equal to the desired value. FIG. 3H illustrates that many means are possible for control of 104.

REGULATION METHODS

FIG. 3A illustrates a dimmer in which a processor is employed for many functions. The illustrated embodiment may operate in a reverse phase control mode. There may be several reasons for the choice of such a waveform.

One relates to the difficulties of achieving the highest possible degree of output voltage regulation using forward phase control waveforms.

Various sources of variations in the amount of power supplied to a lamp load by a dimmer, relative to the desired value, have long been known. One source is actual or purported variations in the performance of analog triggering circuits. Such variations rendered attractive a "digital" dimmer (such as generally disclosed in U.S. Pat. No. 4,241,295). The reason is that, its simplest conception, a phase control dimmer triggering means represents a timer which delays firing of the power semiconductor for each desired input value for that period previously determined to supply the desired amount of average power to the load, and digital circuits can be used to make very accurate timers.

Such a model of a dimmer is too simple.

One reason is variations in line voltage due to fluctuations in utility voltage; to line losses in feeder cables connecting the dimmers with their AC supply; and to the effect of variable current demand on such line losses as the various dimmers in a system vary the total load. Many prior art analog and digital triggering schemes have provided some form of compensation for line voltage variations (which is identified as "line regulation").

Another reason is variations in the performance of the dimmer triggering means and/or the power stage itself. Thus, even if variations in line (input) voltage are accounted for by a "line regulation" scheme, the output of a dimmer may still not conform to the desired average power. Non-linear losses in a choke over the output voltage range and at different load impedances are one source of such variations in dimmer power stage performance. Some analog and few (if any) digital triggering schemes have provided compensation for such variations (which is identified as "load regulation").

Classic analog dimmers that sense the voltage supplied to the load as one input to the comparator means of a negative feedback loop used to stabilize dimmer performance can provide both line and load regulation. Such designs have, however, fallen into disfavor.

Line regulation alone can be provided by any one of a number of means. Some analog ramp comparator circuits use the averaged line voltage to scale the comparator.

In U.S. Pat. No. 4,241,295, the instantaneous line voltage is used to generate a frequency variable with voltage which, in turn, is used to scale the time-base of the digital "timer". Such methods fail to properly account for asymmetrical distortion of the AC waveform, because they assume any variance to be uniformly distributed across the AC waveform, and allot a correction across the entire half-cycle, if they can apply it at all.

Because a forward conduction dimmer must base its decision on when to fire the power device on that portion of the AC waveform it can see prior to firing, it must "assume" that the power content of the portion it sees will be representative of that portion later in the half-cycle that it cannot yet see. An asymmetrical distortion of the AC supply waveform (such as a deep notch caused by large numbers of other dimmers firing simultaneously on a "soft" service) will not be properly compensated for. If the distortion occurs prior to the firing point, the dimmer will advance the firing angle to compensate for the loss; raising the actual power delivered later in the half-cycle above the desired value. If the notch occurs after the firing point, a correction cannot, by the nature of forward phase control, be made in the same half-cycle.

Alternatively, the power content of the entire waveform can be summed and the appropriate value applied to correcting phase angle in the following half-cycle, on the premise that the AC waveform is consistent on a short term basis. Even were that true, the correction for an asymmetrical distortion will be applied proportionately across the entire half-cycle, while the effect such a notch has, if it reoccurs, will vary depending upon where it falls relative to the firing angle. A firing angle after a notch will "edit out" the latter and the dimmer will have overcompensated. A notch falling after a firing angle producing low average power levels will have the opposite effect. This problem proved enough of an issue that the "digital" dimmer of at least one major manufacturer required a redesign to, presumably, maintain a multitude of discrete voltage samples, "digitizing" the AC waveform; compare the projected firing angle for each power stage with the sampled waveform (as such dimmers typically share a common processor among large numbers of power stages); and to apportion corrections accordingly.

Even given the ability to recognize asymmetrical distortions of the AC waveform, it is an inherency of forward phase control that, with a single transition into conduction in a half-cycle, a triggering circuit cannot regulate the average power supplied in each half-cycle in that half-cycle, for it must fire the power device before the power content of that portion of the AC waveform that it will pass can be known. All such line regulation schemes must instead rely upon either data from a discrete prior half-cycle or upon averaged data from multiple prior half-cycles. Further, even a successful line regulation method does not itself provide load regulation.

It has also long been recognized that an inherency of reverse phase control is that the triggering means can accumulate the amount of power supplied to the lamp load in a given half-cycle and provide a very high degree of regulation by firing the power device earlier or later to compensate for variations (making due allowances for the amount of power let through during the transition to non-conduction). Further, by coupling the voltage sense input to the AC line after the power devices, such that the triggering means "sees" the actual amount of power supplied to the load, and not simply the amount that was provided as input to the power stage, load regulation can also be provided. Such an approach is appealing for "digital" dimmers.

At least two designers of dimmers for the stage and studio market are believed to have been working along similar lines. The embodiment of FIG. 3A is presented to illustrate such a phase control triggering scheme. Processor 400A is provided with a control input for a value representing the desired average power to be supplied to the load. Inputs are provided from a voltage sense input digitized by A/D convertor 244; a current sensor 451C input digitized by A/D convertor 453A; and a phase/polarity detector 242 comprising the detector previously described or, for example, an opto-isolator series-connected between the AC line and neutral via a diode. When applied to controlled transition dimming, outputs are provided to the device gate control means 220P and 220N controlling power devices 519P and 519N, either directly or via additional hardware logic.

The operation of such a dimmer may be as follows: At the start of a given half-cycle, at least the power device of the appropriate polarity 519P or 519N has been reset to its conductive state. Voltage will be sensed and quantified via the sense input and A/D convertor 244, and processor 400A will begin to accumulate a running total of power supplied to the lamp load connected at "L" so far in the present half-cycle. Simultaneously, in hardware or software, the increasing current sensed via the current sense input from 451C is compared with the various limits, for example, using the approach of FIG. 1D, and transition behavior modified accordingly.

When the desired amount of power has been supplied to the lamp load at "L" (less the allowance for transition let through), processor 400A will cause the appropriate power device 519P or 519N to be transitioned to non-conduction by its device gate control 220P or 220N, and both current and voltage flow through the system (and the values at the sense inputs to processor 400A for both) will fall to zero.

The other power device having been reset at or between zero-crossings bracketting the present half-cycle, it will not conduct until line polarity reverses and the next half-cycle begins. At that time, the voltage and current sense inputs to the processor 400A, quiescent since the transition to non-conduction of the first power device, will become active again (indicating a zero-crossing), and the processor will respond by beginning the accumulation process again.

The determination of zero-crossing by the change at a voltage and/or current sense input is sufficient for the purposes of generating or of initiating the generation after a delay or accumulation of an "Initialization Delay". Alternatively, the power device initialization can be delayed by a duration after the transition of a given device calculated to guarantee that initialization will occur in the following half-cycle. That delay can be variable with the desired phase angle and/or current and/or voltage let through to assure that it will fall within the non-conducting period of the power device.

Phase detection, in some form, assures that the devices of the correct polarity are transitioned and initialized in the correct half-cycles.

A high degree of regulation can also be provided in forward phase control by an embodiment like that of FIG. 3A. Operating in such a forward phase control mode, such a dimmer can detect line phase/polarity by means of a connection to the line side of the power devices. The state change at the phase/polarity detector is sufficient to start a conventional timing function that results in a transition to conduction at a phase angle expected to produce the desired amount of power at the load, based upon data from at least one previous half-cycle. The appropriate power device is brought into conduction at this phase angle, which couples power to the lamp load and to the sense inputs to processor 400A. In the manner previously described, processor 400A accumulates the total power supplied to the load while current limits are observed. Provided that the power device is not first transitioned because of low load impedance, power flow will end at the zero-crossing concluding the half-cycle, and the other power device, having been initialized at or after the prior zero-crossing, will be in its non-conductive condition. The total energy supplied to the lamp load in the just-ended half-cycle will then be compared with the desired value, and any difference used to correct the phase angle in a following half-cycle, both to reflect a more accurate line condition and to offset the excess or insufficiency of power provided in the prior half-cycle. It will be understood that this mode of operation represents a digital analog of negative feedback in an analog dimmer.

It will be apparent that similar results in either version can be achieved by means other than a processor, whether digital or analog.

MODULAR DIMMER DRAWER EMBODIMENTS

The various improvements disclosed provide important advantages when employed in conventional, centralized dimmer racks.

FIGS. 4A through 4E illustrate an application of improved techniques to the packaging of a controlled transition power stage in a modular drawer for such racks.

In the construction of portable and permanently installed dimmer racks, it has long been desirable to package at least the power stage of the electronic dimmer in a mechanical module which can be removed from the rack chassis, and to which the necessary input and output power connections are made. In the practice of the 1960s, typically one such dimmer module was provided for each power stage and the same module incorporated an electronically-independent triggering card for that power stage as well. In the practice of the 1980s, the modules were typically stripped of their triggering circuits, which were centralized and shared for a common phase of the AC supply in a single, separate "control drawer." As a result of this, and of the fabrication of SSR packages incorporating two SCR die, snubbers, and optoisolator, the dimmer drawers of recent professional racks contain one 6000 watt or two 2400 watt power stages, and have a limited number of components: one or more SSR packages; one choke and supply circuit breaker per power stage; input and output connectors from the module to the rack; and necessary interconnect wiring.

Due to the number of modules required in a modern dimming system, considerable effort has been devoted to reducing the construction cost of such dimmer drawers. In addition to reducing the component count by the use of an SSR package and by the centralization of triggering circuitry, the attempt has been made to further minimize the mechanical complexity of the module itself. In the case of one dimmer, a five-sided drawer was reportedly both formed and punched in a single stamping operation. In a subsequent design, the metal drawer has been replaced by a molded plastic enclosure, which is both thermally and electrically an insulator. The SCR die are bonded directly to a small heat sink extrusion, which is retained in cavities of the plastic enclosure. An unusually high volume of forced air cooling of the small heat sink is required and provided.

The goal, therefore, has been to reduce the parts count and labor content of dimmer drawers, and very large investments to "simplify" their construction have been required. Yet interconnect wiring and assembly are still required.

One object of the present invention is to reduce the complexity of the construction of a dimmer drawer, especially that of one housing a controlled transition power stage. Specifically, the costs associated with the design and fabrication of a semi-custom SSR package are avoided; the thermal performance of the drawer improved; and the requirement for interconnect wiring (and potentially for any hand labor) is virtually eliminated.

One aspect of the invention is its use of a composite printed circuit card that is both a selective conductor and insulator of electricity as well as a thermal conductor (rather than insulator). The Bergquist product identified in the parent application or its equivalents can be used.

First, the composite card is designed for the distribution of electricity between its interconnect to the rack chassis and the components onboard.

The semiconductor die may then be mounted directly to one surface of the composite card. This has several advantages: it avoids the costs of either buying the die in their commercial packages, or of having them mounted in the SSR packages conventionally used in the art. It offers flexibility in locating the die at different points on a common card depending upon the desired wattage, dissipation, and/or thermal conditions of the specific application. It allows distributing the thermal load presented by the die over a substantially larger area, reducing the thermal gradient. And by eliminating the vertical clearance required by the conventional SSR package, it allows either increasing the number of drawers that can be accomodated in a given vertical space—or providing vertical heat-sink fins or other radiators in the airflow.

Refer now to FIGS. 4A through 4E, where one possible embodiment is shown. Composite card 450 has four die 460 mounted directly to it, and covered with a thermally transmissive compound to protect the die and lead wires.

One advantage of the use of such card is that it could be interfaced to the rack by means of a high-current edge connector, requiring no separate contacts be installed on the module/card. However, in the illustrated embodiment, male pins are installed on the module, one pin 470S to supply up to 60A to the module as a whole, and one pin 470L provided for the load connected to each output. In this case, the rear portion of the pin is illustrated as split, it is slipped over a conductive region of the card, and, upon being bolted, rivetted, bonded, soldered or otherwise attached to the card, is also electrically connected with it. Thus, no round wire is required between the interface connections and the power devices.

Similarly, the module is illustrated as having two circuit breakers 470, which can be mounted to one side of the composite card 450, the act of mechanically mounting them also potentially serving to electrically connect them. Further, one side of the circuit breaker housing could be removed, such that a portion of the composite card 450 is directly connected to the interior workings of the circuit breaker at the appropriate points. All this can be done with little modification to stock circuit breakers. The heat transmitted through the composite card 450 is likely to be little greater than that in a conventional drawer's base pan. Further, by the choice of a thermal-magnetic rather than purely magnetically-tripped circuit breaker, it is possible (though may or may not be preferable) to design the interface such that excess dissipation in the module (caused, for example, by failure of the cooling airflow) will cause the breaker to trip.

Thus, all internal power wiring of a dimmer module has been eliminated, and without significant tooling investment.

The required connection for the gate drive can also be provided by edge connector, discrete pin, or by some other means, such as a magnetic or LED non-contact link as disclosed in the prior related applications. Where a discrete wire connection is employed to the drive electronics; multiple polarities, voltages, or frequencies can be used to cheaply "multiplex" separate gate drive signals to the devices via a common conductor. Alternatively, the triggering means can be installed in the drawer, such that multiplexed desired intensity value data is distributed to the drawers, which constitute complete and independent dimmers. Where a non-contact means is used for either desired intensity or gate drive signals, by mounting such that its range is less than the minimum proper engagement of the power interconnect, or that it is installed on the side of the card such that it aligns only on proper engagement, an automatic interlock prevents mating or breaking the power pins with the devices in conduction. Various means can be used for addressing modules, including those disclosed in the parent application.

If it is desired that information be returned from the dimmer (for example, regarding its status or that of the connected load), a discrete connection per module or multiplex buss could also be provided for that purpose. Another possibility is to use a relatively low-speed broadcast link, such as an infrared LED broadcasting into the void of the plenum of the dimmer rack in the rear or that formed by the rack cover in the front. Such a technique eliminates the fault propagation path offered by a discrete link, and adds nothing to the cost of the basic module or rack frame; only to modules adapted for this option.

Status information provided by a drawer can be polled via the drive electronics and detected by a single receiver for a plurality of drawers.

Alternatively, visible light LEDs are typically provided on such drawers for indicating the presense of power, signal, and/or output. Such LEDs can be readily modulated to digitally-encode more complex status data and, while appearing lit, such data can also be "read" from them by holding near that LED a photodetector-equipt handheld remote or a light pen connected to such a remote.

FIG. 3H illustrates two methods of driving such an LED. LED 170L is driven directly. To reduce the processor time devoted to servicing this "output", a second method is illustrated, employing a buffer in the form of a recirculating shift register 170R, which is loaded with the encoded light/dark sequence by means of Data and Control inputs from the Processor 400A. Thereafter, the sequence will be clocked around in the shift register, which drives (via suitable means) LED 170LL. No processor time is required to produce a constant status report via LED 170LL, except when a new status message is loaded. This useful feature is added without significantly increasing either cost of the drawer or the rack, because it is not necessary to add a more sophisticated display on each module or to couple the data from each drawer to a centralized display.

Further, such LEDs can also be used as part of a non-mechanical "pushbutton". There is a need on such modules for a "goose" or self-test button and for other controls. Traditionally a mechanical switch is used, whether a pushbutton or membrane switch, which requires mounting and is subject to eventual failure. However, by placing a photodetector such that the output of LED 170L or 170LL falls upon it, and that a space sufficient for the user to insert his or her finger provided between the two, a user control having virtually infinite life can be produced. By comparing the light/dark sequence supplied to LED170L or 170LL with that received by the photodetector, whether in hardware or software, the obstruction of the path between the two by the finger of the user "pressing" a labelled spot on the module can be detected and used as a switch closure.

It will therefore be seen that the composite card 450 illustrated represents, itself, an electrically complete dimmer power module. Further, the reduction in height required by the power devices, plus the heat-spreading action of the composite card, permits providing large heat sink fins or other means on the underside of the card, further increasing the dissipation-handling ability of a given card and/or permitting a reduction in air flow velocity, with a benefit in reduced audible noise. It will be understood that, using known aerospace "cold plate" cooling techniques, that the thermal path could be via direct contact between bearing surfaces of the module and rack, the rack in turn, conveying heat to another point by means of a circulating fluid coursing through it.

Such a card could be racked directly in a card cage, with the addition of any covers required.

The illustrated embodiment has additional features:

Two "caps", a front cap 480F and rear cap 480R. are illustrated. These may be cast or formed out of any suitable material including, but not limited to, plastics and phenolics. These caps are illustrated as being slightly wider than the card, and as providing internal card slots 480S to accept it. The "caps", in turn, are provided with guides 480G that engage the rack chassis (although grooves or any other suitable technique could also be used). Pass holes are provided in the rear cap 480R for the supply pin 470S and the load pins 470L; and in the front cap 480F for the handles 470H of the circuit breakers 470. The caps are attached to the card to form an integral unit. Thus, the card is surrounded by protective caps on all sides. While the card is insulated it is double-insulated with respect to the rack chassis.

As can be seen, the rear cap 480R is bevelled and radiused to simplify insertion of the module into the rack.

The front cap 480F is provided with a handle 480H for removal of the drawer, that also serves to shield the handles 470H of the circuit breakers 470. (Because of electronic current-limiting, the circuit breaker is not expected to trip unless under extreme failure conditions.) A shielded vent is provided between the handle 480H and the front surface 480P of the cap (through which the circuit breaker handles 470H protrude) that provides a passage for air over the top surface of the card (in addition to that drawn through the gap between the top surface 480T of the front cap 480F and the clearance plane 490B established by the bottom surface of the module above). Cooling air for the bottom of the card flows through this gap. It will be apparent that, with the appropriate clearances, shapes, and baffles, airflow across the card and the components mounted on it can be altered to suit. It will also be seen that, in the illustrated embodiment, the top and bottom surfaces of the composite card are open. However, they can be covered, either by the caps, or by separate means. Side elevation FIG. 4C illustrates a panel over the top surface of the card, whose purposes include blocking direct radiation from the heat sinks of the module above. Further, the end caps can extend completely along the sides of the module to a mating surface. They may either be attached to the card by separate means, or by the same means used to fix the power pins and breakers. The front cap 480F, may also be designed to form the enclosure required for the components of circuit breakers 470.

Finally, active circuitry can be mounted either to the composite card 450 itself, or to a daughterboard carried on it. This latter alternative has advantages in field service and in adapting modules to provide different sets of orderable options. Indicators can be seen through slots or openings provided in the front cap, or by the use of a transparent, preferably smoked, plastic. A flexible circuit with membrane switches and indicators can also be used, and the handle modified as per 480HH in FIG. 4E to provide a flat surface for the former.

It will thus be seen that the disclosed embodiment offers a near total saving of assembly labor; improved thermal characteristics; flexibility in accomodating the need for options and variants; and does so without undue initial tooling costs.

IMPROVED DISTRIBUTED PACKAGES

Controlled transition dimming can be employed, to particular advantage, for applications in which the dimmers are distributed in proximity to their connected lamp loads, as has been discussed in detail in the prior related applications. FIGS. 7A through 7F and FIGS.

8A through 8E both disclose embodiments having specific features and advantages.

Figure 7A:
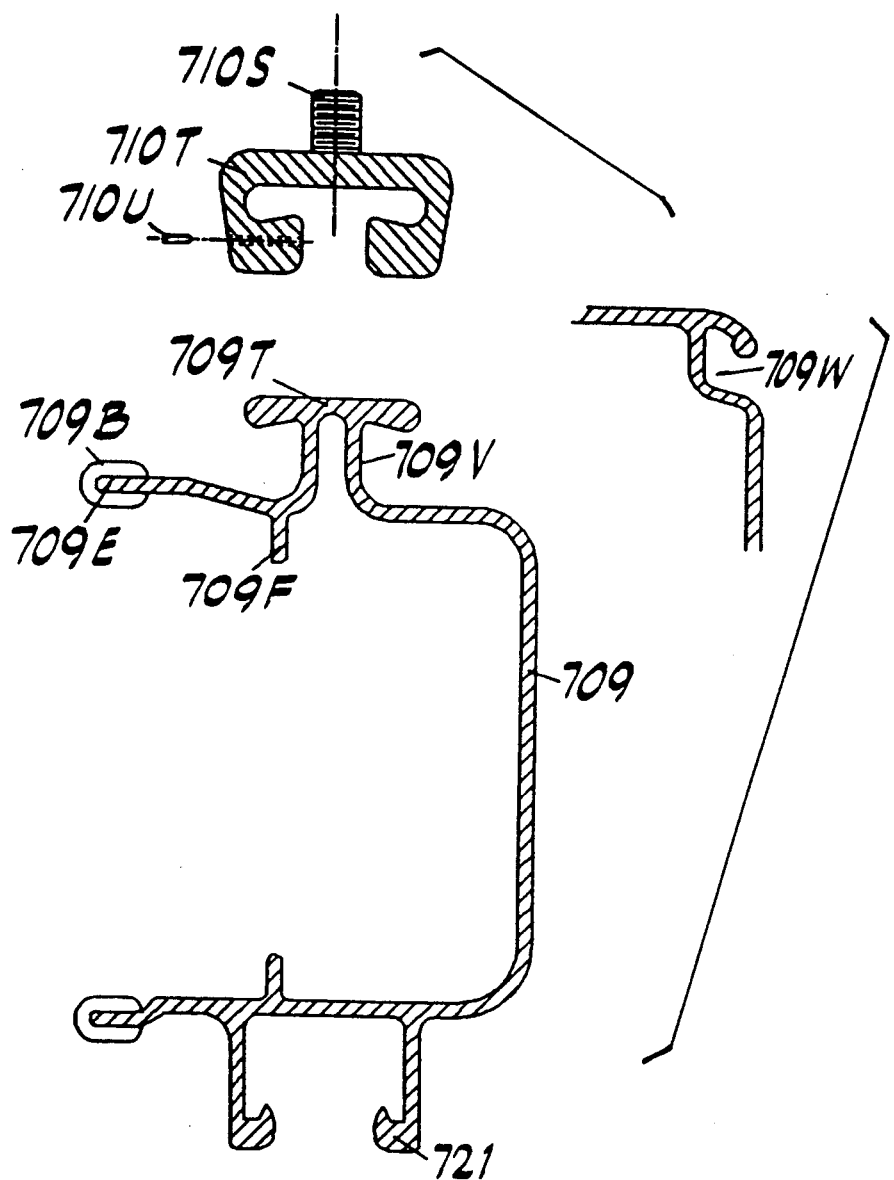
FIG. 7A is a section through one possible design for an extruded raceway/lamp bar.
Figure 7D:
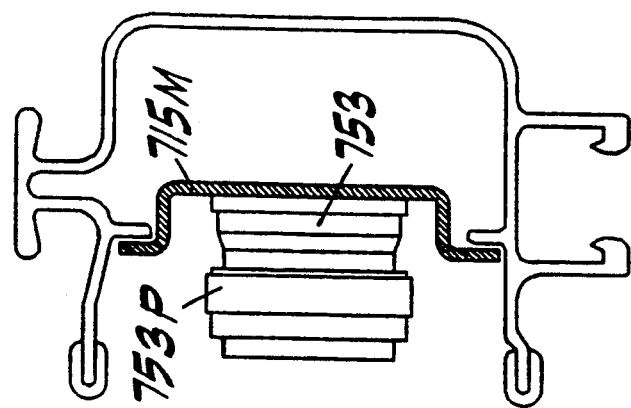
FIG. 7D is a section equivalent to FIG. 7A, illustrating a deeply-recessed panel mounting a multipole multi-connector so as to protect it from damage.
Figure 7C:
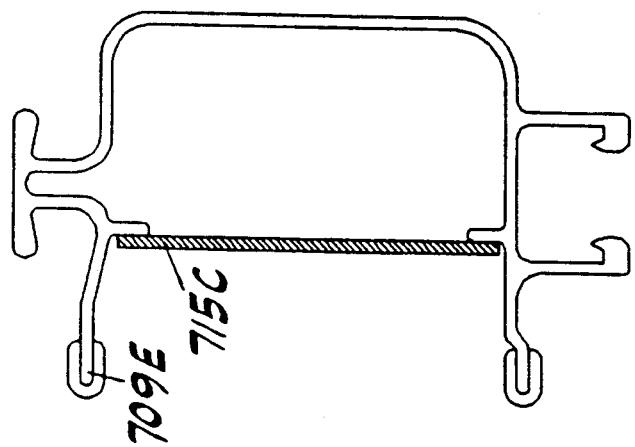
FIG. 7C is a section equivalent to FIG. 7A, illustrating a possible profile of a controller panel/module recessing the controls and indicators mounted thereon for protection.
Figure 7B:
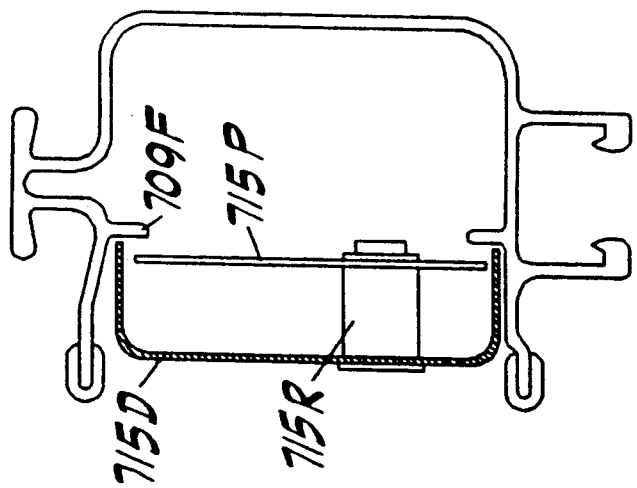
FIG. 7B is a section equivalent to FIG. 7A, illustrating a possible profile of a dimmer panel/module maximizing behind-panel space.

The embodiment of FIGS. 7A through 7F is generally related to that of FIGS. 7A and 7B of prior related application Ser. No. 943,381, now U.S. Pat No. 4,823,069, in which embodiment at least the dimmer power stages are distributed through an elongated structural member that also provides for the support of the lighting fixtures whose power they supply.

FIG. 7A represents a side elevation of one extrusion design that can be used. Extrusion 709 incorporates a track 721, equivalent to the widely-used Unistrut. Fixtures are attached via bolts to track nuts that ride in track 721, such that the spacing between fixtures can be readily adjusted. Such extrusion can be trimmed to any length, and can be permanently attached to a ceiling or overhead structure. Alternatively, it can be trimmed to shorter lengths that are used for portable "lamp bars" which, in turn, hang via theatrical C-clamps or similar means from the overhead pipes or battens in a theater, or from the chords of a structural truss.

Detail 709T is provided for the attachment between the extrusion and the clamps or other means by which the former is hung. In prior distribution raceway designs, one method of attachment is simply to bolt such clamps through the to surface of the extrusion (or similar, braked form). However, it is generally necessary to be able to displace such clamps along the long axis of the extrusion in order to avoid their obstruction by the hangers or cross-bracing on the batten or truss chord from which the extrusion is hung. Slots can be milled or punched in the top surface of the extrusion or similar shape to permit sliding the clamp or hanger along the extrusion, but the slot produces an opening through which dirt and moisture can enter, and the problem arises of access to the bolt head, as well as the safety concerns of loosening and retightening a bolt holding the suspended weight of the raceway and the lamps on it. Alternatively, brackets have been built in the form of "stirrups" to which the clamp attaches and in which the extrusion sits, without a mechanical connection, such that the brackets can be slid along the extrusion (at least until they reach a protruding connector or fastener). However, such stirrups obstruct access to the sides of the raceway, rendering it difficult or impossible to readily open or remove panels, particularly while the extrusion is in use. Detail 709T interlocks with an adaptor 710T, to which a clamp or other hanger, in turn, is attached, for example, via threaded stud 710S. Adaptor 710T could be designed to be removeable at any point, but for safety has here been illustrated as being solid, such that it is slid onto detail 709T at one end of a length of extrusion and slid into any desired position. There, it can be retained without additional locking means, although a setscrew 710U bearing upon the extrusion or similar means can be employed. When field conditions require, the setscrew (if provided) can be backed off and the adaptor and clamp slid to any new position. Stops can be provided to prevent movement of the adaptor past a specific point. Methods are also possible of making the adaptor self-locking, such as bevelling the sides of the "T" at an angle to form a ramp, such that when weight is placed on the adaptor, the adaptor is wedged in place. Alternatively, a detail serving as ratchet teeth into which the adaptor sits could be provided Shapes for 709T other than that illustrated could be provided, the illustrated shape having additional advantages. One is the improvement in stiffness produced in the extrusion. While one vertical could be used, the doubled vertical walls also serve as a "chimney".

Many methods of cooling electronic components interior to the extrusion are possible. Air can be pulled or pushed the length of the extrusion. A "plenum" approach can be used that draws or exhausts air through one end of the extrusion and exhausts or draws it in parallel through a number of vents spaced along the length of the extrusion, such that no two heat-producing components are placed in series between the supply of cooling air and ambient. This airflow may be horizontal along the extrusion to a point at which the heat-producing components are located, and then turned vertically over them to a vent, so as to be assisted by convection. A third approach is a plurality of vertical convection paths through the extrusion.

In most such cases, at least one outlet is required at or near the top of the extrusion that permits the inlet or outlet of air, but preferably does so without permitting liquids (and ideally dirt) to readily enter, and further does so without impinging on the useful interior volume of the extrusion. The illustrated embodiment does so by means of the dual vertical wall of detail 709T. By producing slots for vents 709V in one or more vertical wall of detail 709T, openings at the top of the extrusion can produced which, nonetheless, are deeply recessed under the "eaves" provided by detail 709T, so as to reduce the entry of liquids and falling dirt. The use of positive pressure and filtration at the inlet further reduces ingestion of airborn particles. Further, foam or similar air filter material can be inserted in the void formed between the two vertical walls of detail 709T, where it will be retained by friction, and without consuming otherwise useful space.

The alternative detail 709VV in FIG. 7A provides a shielded vent in an upper edge of the extrusion.

The illustrated embodiment provides for the insertion and removal of modular panels along one side of the extrusion. Such panels may mount dimmer power stages, controllers, and connectors (among other elements). In one example, a six-lamp bar, the extrusion is cut to a 7' length. Six dimmer output modules are provided, each 11" long. One each controller module and power/signal input connector panel, each 9" in length, are also provided.

The illustrated embodiment provides extended edges 709E that form a protective recess for such panels. These edges 709E are preferably covered with a rubber, neoprene, or similar protective edge trim, such as manufactured by Trim-Lok, Inc. of Paramount, Calif. The edges are offset such that the edge trim does not reduce or obstruct the useable panel size.

Flanges 709F are provided for the retention of panels. Different panels may have different profiles, depending upon the relative requirements of the elements they mount for clearances in front of (versus behind) the panel surface.

FIG. 7B, for example, is a section through a dimmer unit. To maximize behind-panel space, and because the components mounted on it are of low height and relatively rugged construction, the panel/cover 715D (which may be of fiberglass or similar material) extends close to the front plane of the extrusion. In FIG. 7C, a section through a controller unit, a flat panel 715C close to the plane of flanges 709F is used, so as to recess the controller's front-panel components well behind the protective edges 709E. In FIG. 7D, a male multipole multiconnector 753, as identified in the prior application, is mounted on a panel 715M formed to drop behind the plane of both edges 709E and flanges 709F so as to protect the locking ring 753P from damage.

In such an embodiment it is desirable that dimmers be made removeable, both for field service, and where a particular lighting design does not locate a fixture, or requires a fixture or other load that cannot be dimmed.

Figure 7E:
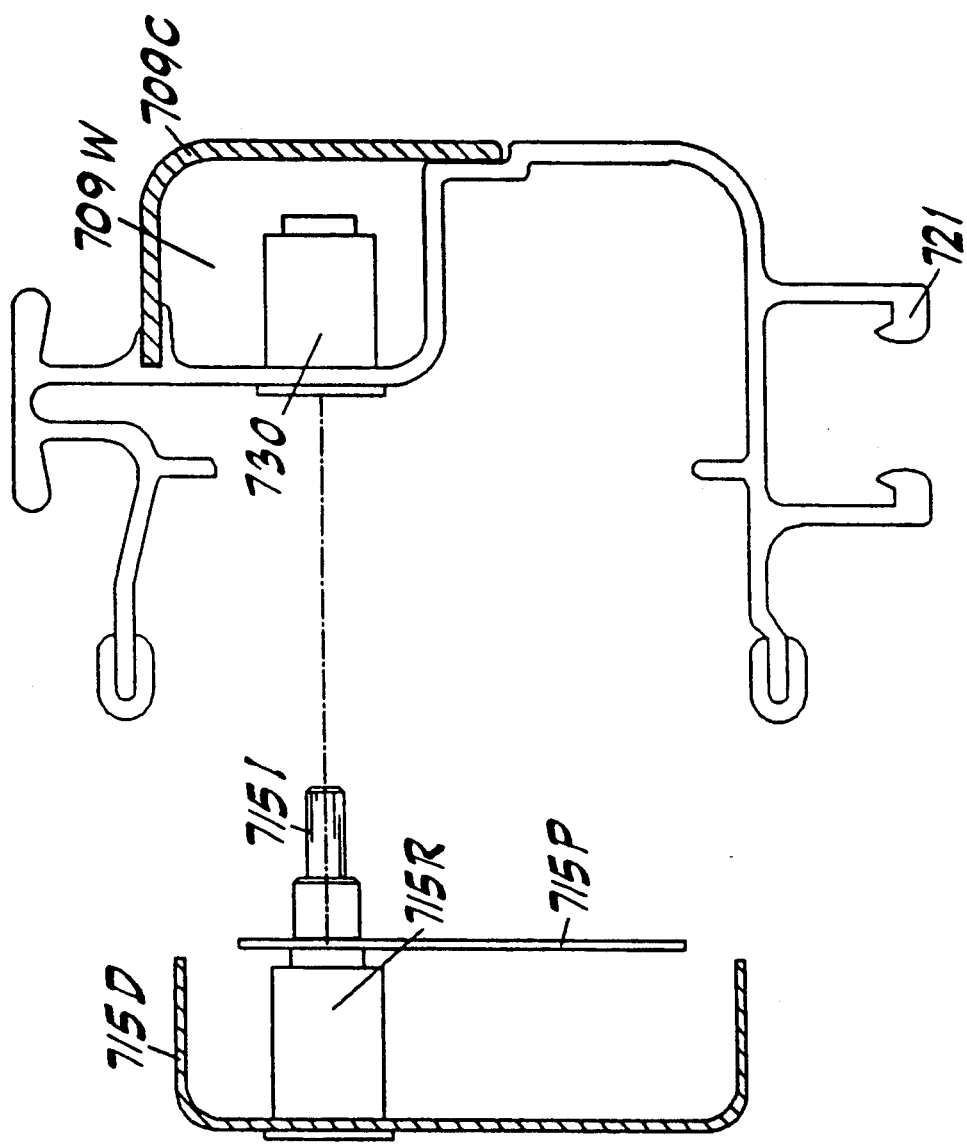
FIG. 7E is a section equivalent to FIG. 7A, illustrating the use of an internal raceway and connectors to which dimmer modules can be plugged, or to which loads that need not be dimmed can be plugged directly.

The various panels can be made plug-in, either by means of a wiring harness, or by literally plugging into fixed receptacles. Blank panels can be provided where no dimmer or hot-patch is required, and a "hot-patch" panel that simply mounts a receptacle wired directly to the AC supply used where an un-dimmed source of AC is needed. FIG. 7E illustrates a section that provides a separate wiring chamber 709W, covered by a separate cover 709C, and that mounts a receptacle 730 into which a load can be plugged directly. Thus, the basic extrusion provides a dead-front "hot-patch" plugging strip, into which loads can be plugged directly. Alternatively, dimmer modules can be configured that insert into the extrusion, with internal inlet connectors that mate with receptacle 730, and mount a corresponding female outlet on their front cover, between which the dimmer power stage has been wired in series. Thus dimmers need only be inserted where required. As illustrated in FIG. 7E, Male pins 715I may be connected to the neutral and ground contacts of output receptacle 715R on dimmer panel/module 715D, so as to plug directly into the raceway receptacle 730. Control signals can be coupled by contact or non-contact means, for use by either dimmer modules or coupling to other loads, for example, via the combined power and signal connector first disclosed in the grandparent application.

Figure 7F:
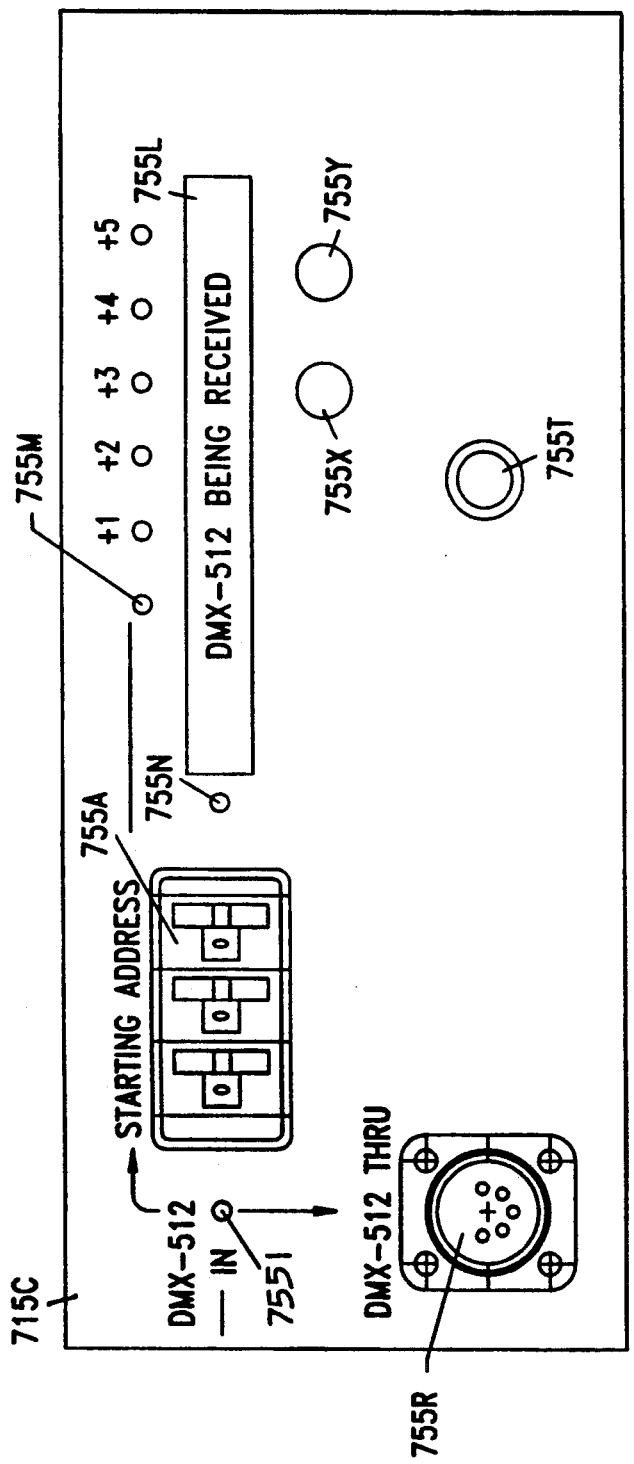
FIG. 7F is a front elevation illustrating possible front panel controls on a controller panel/module.

FIG. 7F is a front elevation of one possible design for a controller unit. Wired internally to multipole inlet connector 753, to a discrete signal input receptacle, or mounting the latter connector itself, the illustrated panel 715C mounts at least the required front panel controls. An address selection switch 755A, operating on the basis of either starting address (as shown) or bar number could be provided. LED 755I indicates that DMX512 or a similar digital protocol is being received. An LCD display 755L provides status information and allows interaction between the user and controller using buttons 755Y and 755X. LED 755N is a high-brightness LED used to alert the user to a message on the LCD display 755L. LEDs 755M are set above the display 755L such that they align with characters on that display. Thus, the LCD 755L can, for example, be used to identify six dimmer numbers (or their patches or levels), while a tri-color LED above each one signals condition. Each dimmer panel/module may be provided with a "Goose" self-test button as described in the prior related applications. Status information produced by the various dimmer panels/modules may be coupled to the controller, where it can be displayed and/or further transmitted. Button 755T is a "Bar Test" button that initiates a self-test cycle of the controller and of all dimmers and loads on the bar. Receptacle 755R is a buffered and isolated output jack that allows coupling a DMX512 or other digital signal to accessories used with the fixtures on the bar. Other controls and addressing methods may be employed. Indicators on the controller and the other modules may be suppressed during performances, for example, by transmission of a suitable control code from the head end. Indicators may be re-enabled until a time-out by pressing any button on the lamp bar.

The illustrated embodiment and variations on it can be used not only for applications in which the fixture is mechanically attached to the raceway, but as a conventional raceway, the fixtures being attached to another means.

Figure 8A:
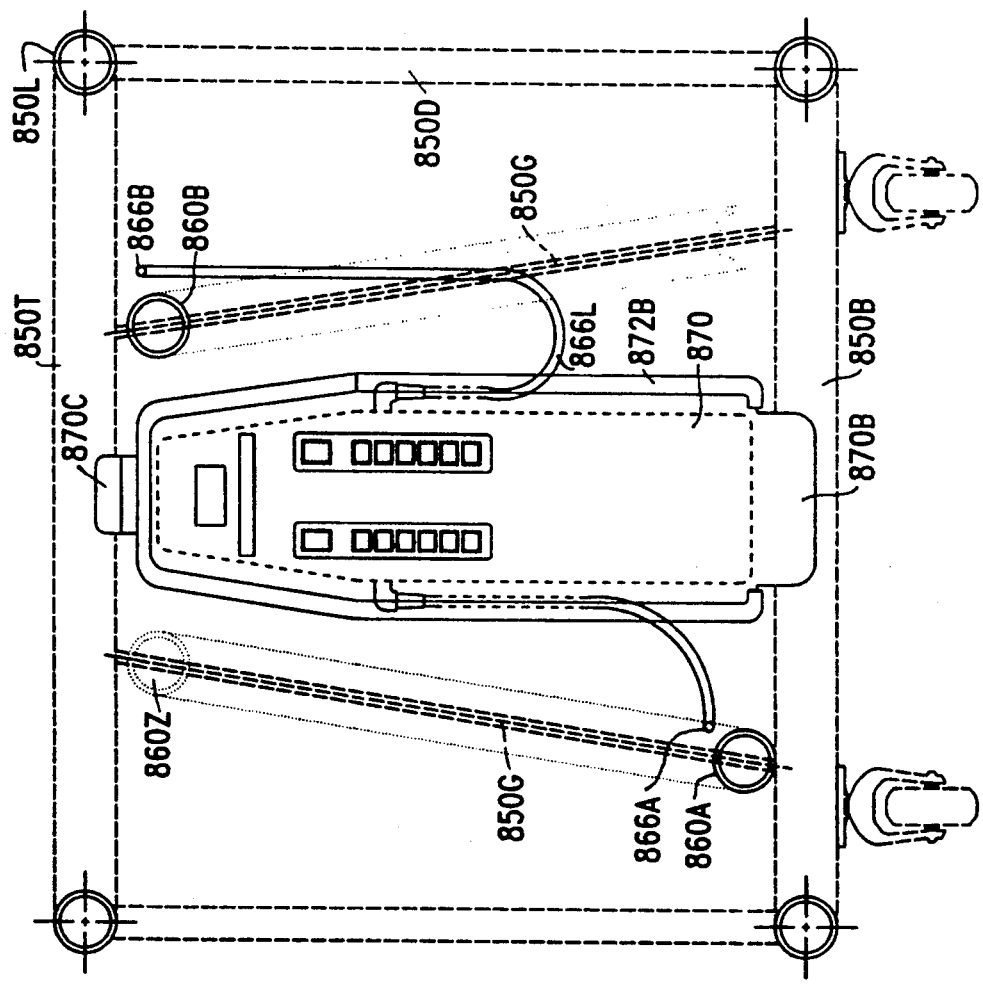
FIG. 8A is a front elevation of a dimmer enclosure designed to be installed in a "drop-frame" truss.

An additional embodiment is illustrated in FIGS. 8A through 8E, adapted for use with so-called "dropframe" trusses, such as presently manufactured by James Thomas Engineering of Pinvin, Worcestershire, England. Such truss designs, first used almost two decades ago, incorporate at least one elongated structural member or "lamp bar", to which fixtures are semi-permanently attached. This "lamp bar" also typically serves to distribute circuits from an inlet multiconnector at one end to the fixtures mounted on it. A multiconductor multicable is used to connect each lamp bar with remotely located dimmers. While such lamp bars may be hung, using clamps, from pipes or battens in theaters and externally from structural trusses; in a "drop frame" truss design they are disposed internal to the volume of a structural truss that is square or rectangular in section. FIG. 8A illustrates such a truss, having four chords extending parallel with its long axis, 850L being typical. Cross-braces are provided (including 850T and 850B) across the top and bottom surfaces of the elongated volume rectangular in cross-section defined by the four chords of the truss, and diagonal bracing 850D connects the upper and lower such chords on a side. Sections, in the case of the Thomas design, are approximately 7' in length, and provide four casters (two being illustrated) to permit rolling the section about. Two lamp bars 860A and 860B, each providing for the mounting and distribution of circuits to six fixtures, are disposed to ride internally within the volume defined by the sides of the truss structure, on two guide rods 850G. Each lamp bar, for example 860A, can be manually raised and lowered between a position (shown in the case of 860A) in which the lamp bar sits at the bottom of the truss structure, such that the fixtures on it are displaced substantially outside of the envelope defined by the truss structure (improving the focusability of the fixtures), and a second position (860Z in the case of bar 860A, and illustrated for second lamp bar 860B) in which the fixtures have been retracted inside the volume of the truss structure for shipping. Such a truss is believed to offer a good compromise between the volume of truck space required in transit and the amount of labor required to prepare the fixtures for use at each stop. Such trusses provide little internal volume that is not occupied during either the use or shipping condition of the lamp bars, or whose use would not obstruct access.

FIGS. 8A through 8E illustrate a design for a distributed dimmer enclosure that permits the installation of the dimming capacity required by the fixtures hung in a given truss section in that truss section, without interfering with the operability of the truss, and which may be retrofitted to the hundreds of sections of such truss currently in use without modification to them.

The previously-described construction of the truss section defines a volume between the upper 850T and lower 850B cross-braces that also provide the supports for the lamp bar guides 850G, and through which no fixture can extend if it is to clear the lower brace 850B. Dimmer enclosure 870 is designed to conform with the volume defined between the clearance planes of the two cross-braces 850T and 850B on one hand, and those of the two lamp bars 860A and 860B on the other. (Alternatively, one or more enclosures conforming with the volume defined between one lamp bar and the side bracing 850B of the truss could also be employed.)

Many means for retaining such an enclosure in place are possible. Illustrated is an extension 870B of the side panels of the enclosure 870 that bracket lower brace 850B. 870C is a spring-loaded bracket that bears upward against the underside of upper cross-brace 850T. The enclosure 870 is mounted by inserting it in the truss section off vertical to engage bracket detail 870B with lower cross-brace 850B; depressing bracket 870C against its spring; and then rotating the enclosure 870 around lower brace 850B until its centerline aligns with that of upper brace 850T. On releasing bracket 870C, that bracket will bear up against the underside of brace 850T, sandwiching the enclosure 870 in place between the upper and lower cross-braces. No mechanical attachment to (or modification of) the truss structure is required, nor does any portion of the dimmer enclosure or its mounting means extend significantly beyond the existing truss structure, where it might be subject to damage. Preferably, bracket 870C consists of two halves, split along the plane through the centerlines of cross-braces 850T and 850B.

Trusses of this type employ lamp bars wired for six fixtures and terminated in a six-circuit male inlet multi-connector. The illustrated embodiment provides two pigtails, in the form of 866A and 866B, each coupling six of the dimmer power stages in enclosure 870 with the male inlet connector on the lamp bar, via a compatable cable-type multiconnector terminating the free end of the pigtail. The pigtails 866A and 866B can be left semi-permanently plugged into the lamp bars and dressed along them to the approximate location of the dimmer enclosure. There, the termination detail of the pigtail to the dimmer enclosure 870 is designed to provide a loop 866L sufficient to allow the lamp bars to be raised into their shipping position (as 860B) or lowered into use position (as 860A) without the requirement that the pigtails be handled or adjusted.

Further, for maximum field serviceability, the dimmer enclosure end of pigtail 866A or 866B is illustrated as plugging into the dimmer enclosure, such that a dimmer enclosure can be removed for service without requiring that the pigtails be unplugged or undressed from the lamp bars; nor need the pigtails extend from the dimmer enclosure when the latter is being handled, making them substantially less subject to damage.

Further, to simplify internal wiring of the enclosure, the dimmer enclosure end of the pigtails is illustrated as terminating (via a right-angle strain relief 876S) in a connector assembly 876B, that provides not only contacts to the dimmer enclosure, but a male power (and optionally signal) inlet connector 753 (whether a panel or pigtail-mounted connector). An advantage is that neutral and ground conductors for the six circuits in the pigtail need not be routed through the dimmer enclosure, reducing the number of contacts required.

Further, at least the power devices for the circuits of a given pigtail can be mounted to a common mechanical module 875M that may be inserted in the dimmer enclosure 870. The output pigtail 866 and inlet connector 753 assembly 876B are illustrated as plugging into the power device module 875M via socket 875S. Power device module 875M is illustrated as providing contacts 875P for coupling to control electronics optionally located in enclosure 870. It will be seen that one benefit of the disclosed arrangement is that it minimizes the number of power contacts required between the various portions of a highly modular system. It will be apparent that the dimmer module 875M may be electronically complete, such that no additional electronics are required in enclosure 870, or simply that external controls are mounted on it.

In the illustrated embodiment, as detailed in FIGS. 8E and 8F, the top and bottom panels of enclosure 870 extend beyond the sides of the enclosure to form flanges 870F protecting components like the strain reliefs 876S from damage. The edges 870F of these panels are, in turn, protected by edge trim 872B, and are flared outwards so that neither they nor the edge trim 872B interfere with the insertion or removal of modules like 875M (as is illustrated in FIG. 8D). In the illustrated embodiment, heat sink fins are provided that run along the power module 875M, such that the two facing power modules form a nominally-vertical "chimney" for the passage of cooling airflow, by convection-assisted forced air, drawn in at the bottom of the enclosure 870 and exhausted at the upper sides or top.

The illustrated embodiment provides an address select switch, interactive LCD display, and both bar and lamp test buttons, although other controls and locations for them can be employed, and other addressing schemes can be employed.

Further, the modules 875M can be designed to be interchangeable in other package designs. For example, module 875M could also be used as a stand-alone packs (given that they were either electronically complete or "docked" with an adaptor providing the additional components necessary). The same module could also be inserted into a frame that provides inlet power distribution, outlet connectors and additional components to form a high-capacity dimmer rack of more conventional design.

IMPROVED CONNECTOR

There is a need, in embodiments like those described in the prior Figures, for a connector suitable for coupling multi-conductor cables carrying both power and control. By virtue of the number of such connectors required in a system, economy is desirable. Further, the physical conditions under which they are used requires a very rugged design. These two requirements are frequently at odds. Major portions of the entertainment lighting industry have long employed "pin" type connectors, as illustrated in FIGS. 5A–5D of the parent application. While these connectors are simple in design, rugged, and economical, they do not provide suitable control contacts. Nor has a satisfactory method of locking two such connectors together been developed. Locking of connectors is a major issue, particularly when carrying digital control signals through multiple mated sets. Other multi-pole connector types provide other locking provisions, such as jackscrews, threaded and bayonet locking rings, and latches. Most require the user positively engage the lock, which is not always done. Such connectors are generally larger, more expensive, and typically more fragile. Further, strain produced when the cable to which one connector is attached is pulled, relative to the other cable and connector, can overcome many simple latching mechanisms, unplugging the connectors, and frequently damaging or disabling the latching mechanism.

Figure 5A:
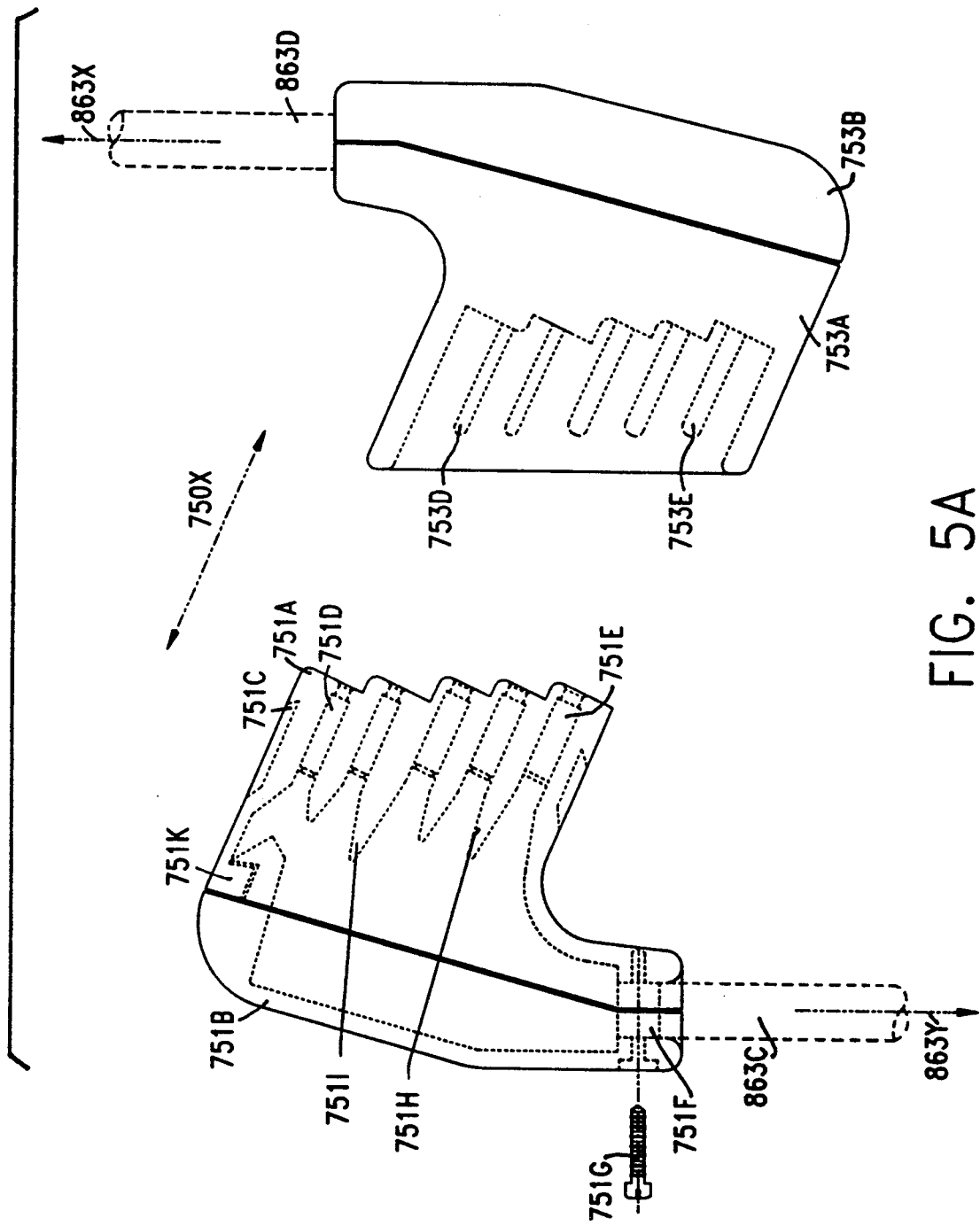
FIG. 5A is a side elevation of an improved multi-pole power and signal connector suitable for use with the disclosed distributed embodiments.

FIG. 5A illustrates a connector that provides a combination of simplicity, ruggedness, and relative economy, while addressing problems with prior art multipole connectors. Two cable-type connectors are illustrated, typical internal details of the female connector being indicated in dashed outline. The body 751A of the female connector is of a suitable insulating material, and provides wells 751D suitable for the insertion of known crimp- or solder-type power contacts. Smaller wells 751A are provided for the insertion of signal contacts. In the illustrated connectors, at least six power contacts are provided (for three phase conductors, double neutrals, and ground) and two sets of signal contacts suitable for RS-422 signal lines. Protrusions such as 751H separate the wells for added insulation, and a longer protrusion 751I separates the power and signal sections of the interior. A common cable 863C containing both power and signal conductors enters the connector via a cable strain relief 751F formed between recesses molded or formed into body 751A and rear cover 751B. A simplified design is illustrated in which a tang on cover 751B is hooked under a projection 751K on body 751A; the rear cover 751B hinged close over the terminated cable 863C; and two screws 751G used to clamp the rear cover 751B and the cable 863C in place. A male connector of similar internal design, including body 753A and rear cap 753B, is illustrated as terminating a second cable 863D. Male power pins 753E and signal pins 753D mate with their corresponding contacts in the female connector and the body 753A shrouds the male pins to protect them from damage, as well as to form a means of aligning the two.

The illustrated connectors are distinguished by the angle produced between the axis 863Y and 863X at which the cable enters the connector bodies, relative to the axis 750X, along which the connectors mate. Unlike prior connectors, the included angle between the two axes is significantly less than 90°, such that strain transmitted along the cable 863Y relative to cable 863X (as indicated by the arrows) cannot pull the mated connectors apart (and, in fact, may mate them more tightly). Unlike prior connectors, the reliability of the connector set increases (rather than decreases) with strain applied to it, and yet no operations are required by the user to produce this integrity. An accessory latch or detent may be provided (for example, a latch (not shown) on body 753A engaging the undercut 751C on body 751A, but such a latch or similar detail is provided only to prevent the connectors from coming apart under no-load conditions, and are, unlike those of prior connectors, not exposed to stresses that would damage or disable them.

Figure 5B:
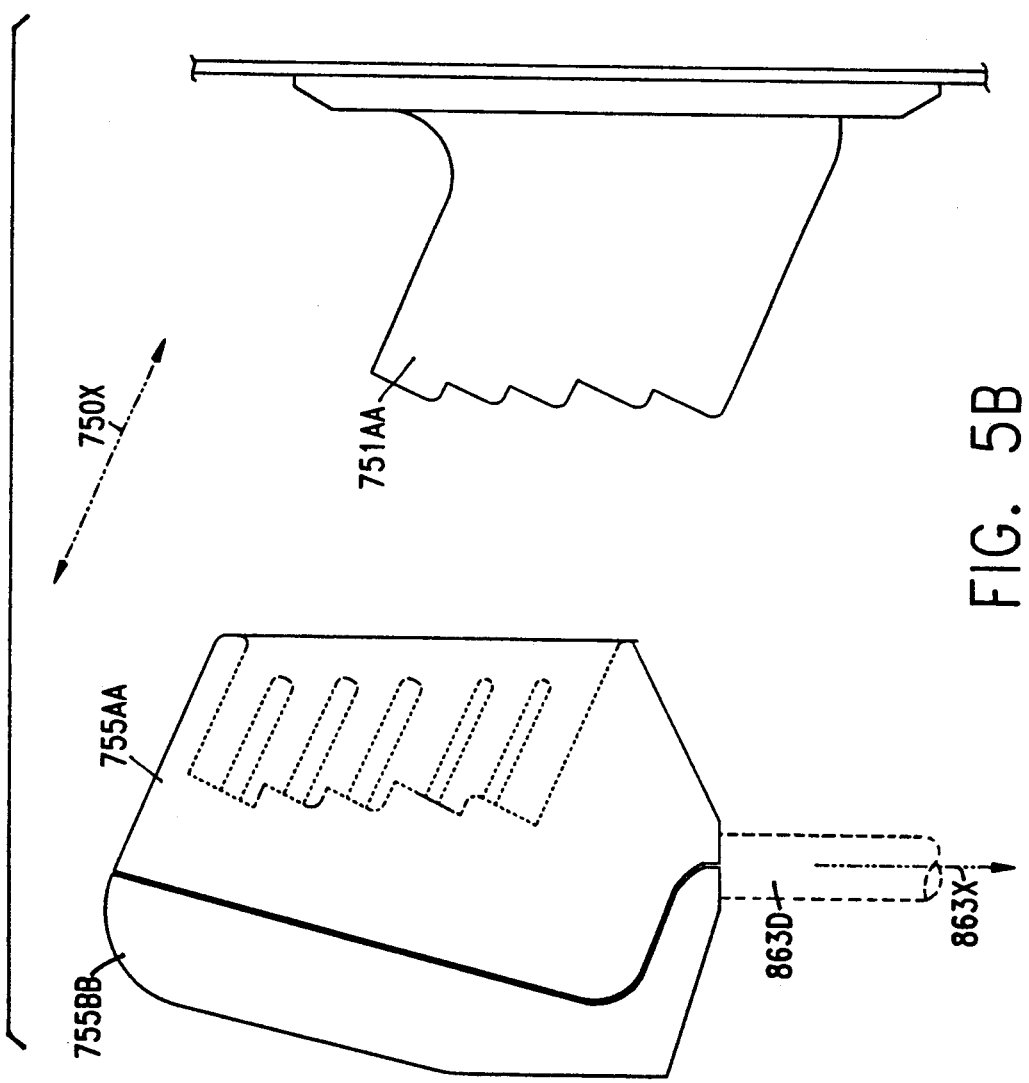
FIG. 5B is a side elevation of the connector of FIG. 5A adapted for panel-mount use.

FIG. 5B illustrates how a panel-mounted version can be produced. Female receptacle 751AA is adapted for mounting to panel 751P. It will be seen that the weight exerted by the male connector and the cable 863D hanging from it will not result in accidental disconnection. The slight upward tilt to the contacts in receptacle 751AA, if it is a concern for outdoor uses, can be addressed by means of a hood extending over the receptacle body.

FIG. 5B also illustrates a cable connector body 755AA, which displaces the axis of cable 863D farther towards the front surface of the connector. One advantage is that the shape of the connector is less likely to snag on obstructions as the connector is dragged in the direction of the cable. A projection could be added to the body design of the previous Figure that would have the same advantage.

The illustrated connector and variants can be used for distribution of power and signal to the distributed embodiments disclosed in this and the prior related applications. It can also be used for other devices in a lighting system. For example, the same cable and connectors can be used for remote and/or automated lighting fixtures and devices. It can be used for chain motor power and control with each signal pair being used for low-voltage switch closures for one of two motors "daisy-chained" to a common cable. As taught in the prior related applications, where one utilization device may not consume the full capacity of a cable, such devices can be designed to permit "plugging through" until that capacity is reached. Single-phase devices can be connected on one incoming phase, and rotate the phase sequence between the incoming and outgoing connectors, such that a number of such devices plugged in series on a common cable will automatically spread their loads across the three phases in a balanced manner.

Other variations will be apparent.

IMPROVED DATA COMMUNICATION

In any such distributed embodiment (and in conventional rack designs) there is a need to distribute desired intensity values to the dimmers, whether in analog discrete or in serial form. In FIG. 2A, reproduced from prior related applications, both forms of desired intensity value distribution (as well as the use of power-line carrier) are illustrated. In the case of serial distribution, a known digital protocol such as the United States Institute of Theater Technology DMX512 protocol can be used. This protocol has the advantage of being based upon EIA RS-422/485 with relatively inexpensive cable and connectors; of requiring no processor to decode; and of being produced by most lighting control consoles.

It has long been seen as desirable that dimmers having local intelligence and developing status information about themselves and/or their loads be capable of reporting such data to the front end of the system. Neither DMX512 nor similar digital lighting control protocols provide for the necessary bi-directional communications or error-detection. Further, the added overhead required by prior such bi-directional protocols at both the transmitter and receiver ends greatly complicate their design. The added overhead on the data link degrades the throughput of intensity values unless a high baud rate is used (which, in turn, requires the use of substantially more expensive cable, drivers, and connectors). Further, while most current consoles produce DMX512, adapting one to produce (and receive) such a complex bi-directional protocol would require considerable modification to its hardware and software design, which would limit the consoles useable with such a system to those that had been redesigned to support this protocol.

Figure 6A:
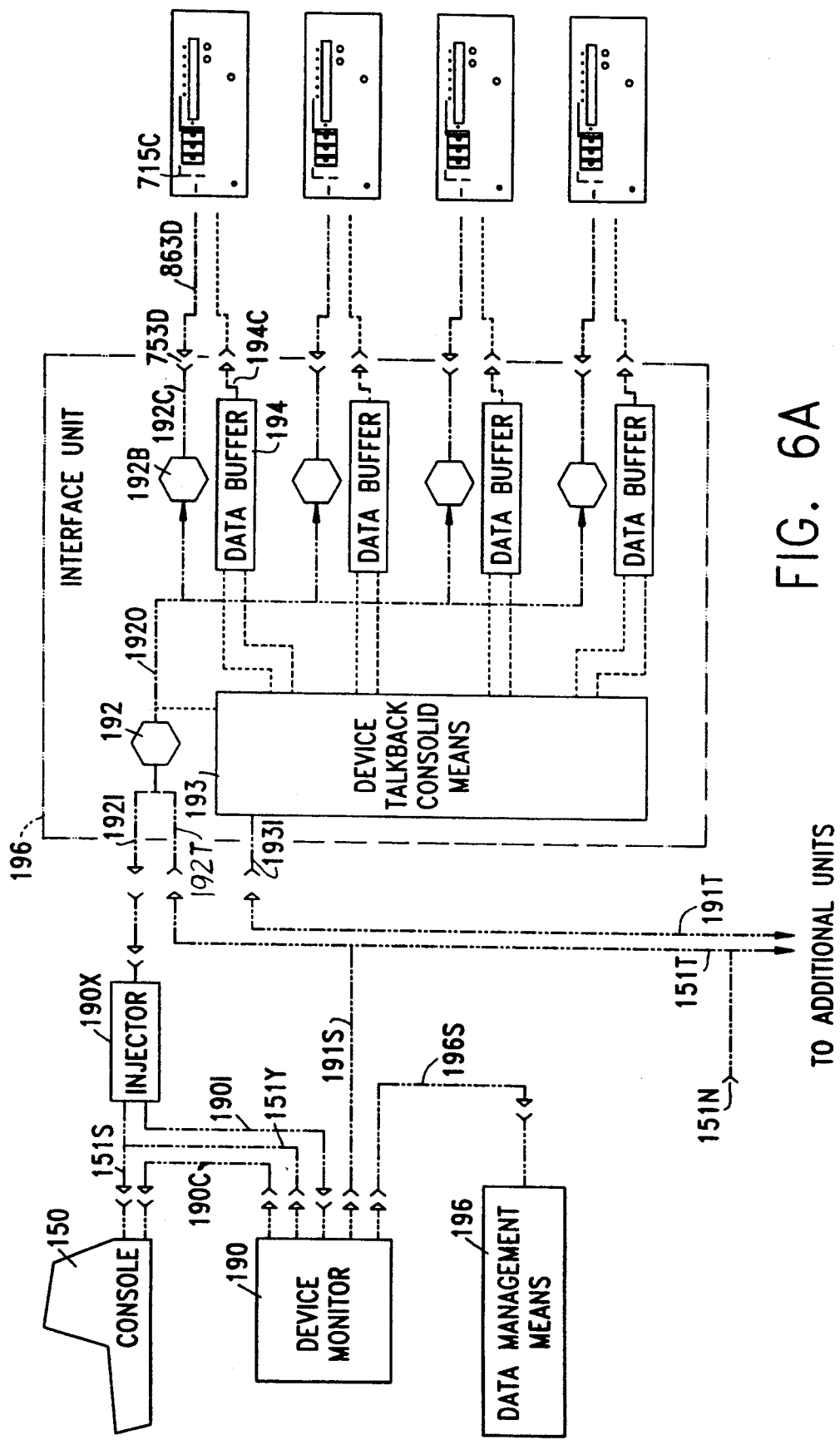
FIG. 6A is a block diagram of a bi-directional signal distribution scheme suitable for use with the disclosed embodiments.

FIG. 6A illustrates an improved data communication scheme that provides the benefits of bi-directional communication in lighting control, while uniquely minimizing the cost and complexity of system components, and while permitting the use of existing consoles without modification to them.

In FIG. 6A, console 150 is a known lighting control console producing DMX512 or a similar digital protocol, via at least one output. A plurality of devices capable of receiving the protocol are distributed throughout the lighting system, at least some of which may be dimmers. Controller panel 715C from FIG. 7F is illustrated as a typical receiving device. The digital serial intensity protocol is coupled via 151S to at least one Interface Unit, the typical contents of which are illustrated within dotted outline 196. Interface Units may be made standalone or may be incorporated within a panelboard 173 distributing power to the connected devices. Similarly, the conductors 863D between the Interface Unit and serial receiving devices such as 715 may be by separate cables, or via a common cable and/or connector 753D (such as that illustrated in FIG. 5A) that also carries power to the serial receiving device.

The digital serial intensity protocol is supplied to the first such Interface Unit via an input 192I, which may also provide a "Thru" jack such as outlet 192T. Other topologies are possible. The serial intensity protocol supplied to the Interface Unit is distributed to multiple serial outputs, such as 192C, and may be electrically-isolated and buffered by means 192 and 192B (one purpose being to prevent propagation of both noise and line voltage faults via the serial intensity protocol distribution system). To this point, the design and operation of the system is conventional.

FIG. 6A illustrates a second data link between the Interface Units and serial devices, illustrated with a short dashed line. A second pair in the same cable used for the serial intensity protocol can be employed. (The DMX512 protocol specifies cable and connectors providing for a second pair, although that second pair is not used.)

A means, illustrated as Injector 190X, is inserted into the serial intensity distribution line 151S. The purpose of Injector 190X is to interleave into the serial intensity protocol data stream, control messages to the Interface Units and to the receiving serial devices.

In the DMX512 protocol, data packets are used, started by a Break of not less than 88 uSec.; identified as containing 8-bit intensity values by a start code in the first byte of "00"; and containing up to 512 additional bytes of desired intensity values. Dimmers are required to ignore all data packets that do not begin with a "00" start code.

In the illustrated system, additional data packets can be inserted into the serial intensity protocol data stream, these additional data packets identified by start codes other than "00", and which, while detected by compatable Interface Units and receiving devices, will be ignored by additional, conventional dimmers, connected to the post-Injector data link (for example, at 151N).

One such Injector can be constructed from a processor or state machine that receives and buffers the serial output of console 150 and retransmits the "00" start code data packets from the console until a control message needs to be sent, which it transmits in lieu of the next "00" start code packet. With a reasonably high refresh rate, no effect will be detected when occasional "00" intensity packets are skipped.

Such a buffer-and-retransmit scheme does introduce a delay into the system, which may be undesirable. Therefore, for Injector 190X, another approach can be used.

In one embodiment, a gate is inserted in the serial line; the control packet injection point located after the gate; and a UART or similar means for Break and clock detection connected prior to both. The control packet to be interleaved is buffered by, for example, a serial register. When a control packet is loaded into the sending buffer, the "Request-to-Send" resulting causes, via state-machine or processor control, the UART or similar device in the Injector to detect the next Break and, upon finding it, to open the gate, "editing out" the "00" start code intensity packet following the Break. The control packet to be interleaved is then injected on the receiver side of the open gate, the gate remaining open until the "00" packet being sent by the console is completed and its output returns to idle. The clock rate used by the serial transmitter of console 150 can be used to synchronize that at which the control packet is injected.

Control packets having fewer bytes than intensity packets, only one "00" start code intensity packet will be edited out by the transmission of each control packet. In fact, multiple messages could be sent in a common packet. Longer transmissions, if any, can be split into multiple packets. Further, more control packets are typically required during setup and rehearsal periods, when intensity update rates are not as critical, and the system may have "Setup" and "Show" modes, differing in the number of control packets allowed insertion in a given period.

When processor-based consoles are used that have a relatively low update rate, but consume a relatively large proportion of the bandwidth of the serial link because their transmission of a data packet is interrupted and idles several times during each packet, then a "buffer and retransmit" scheme may be used for data compression. Space will be generated in the serial data stream in which control message can be inserted, and the effect on system response will be minimal.

Preferably, a normally-closed switching means is connected so as to jump the serial intensity protocol through Injector 190X without interruption, and is connected to a watchdog timer or similar means, such that failure of the Injector will not disable the normal operation of the serial intensity protocol data link.

Control packets frequently require some error detection scheme to make it possible for receivers to determine that an instruction or value has been corrupted and should not be acted upon. Error-detection schemes proposed for similar purposes employ checksums or more complex methods. Such methods cannot identify all possible errors in transmission; considerably increase processor overhead at the transmitter and receiver ends of the system; and are not useable with simple, hardware-based transmitters and receivers. While such methods could be used in the illustrated system, preferably, error-detection is provided for messages requiring it by repeating each byte at least twice. When such a packet, identified by its start code, is received, it is checked for duplicated bytes which, if not found, indicate that the message has been corrupted. The increase in data link time is minimal for most functions and the complexity of both transmitters and receivers is virtually unaffected.

Because transmissions on a serial intensity protocol data link occasionally find adjacent dimmers with common values, the outbound portion of the system can also use other, simple techniques, such as adding an ascending value to each duplicated base value (e.g. 32-32-32-32 becomes 32-33-35-38). This and similar techniques are easy to code and decode and reveal offset errors caused by missed bytes.

Bi-directional communication to multiple receivers has traditionally proven very complex to implement, involving questions of bus control and contention, and requiring approaches like token-passing and collision sensing which, although known in other arts, impose a heavy burden in lighting control applications. The illustrated embodiment avoids the requirement for such approaches. Each of the discrete outputs of the Interface Unit to serial receivers are supplied with a Data Buffer 194, which may be a processor or a state machine. Each such Data Buffer 194 has a input 194C from the serial receiver, and has Data and Control lines that connect it with a Device Talkback Consolidation Means 193. The Device Talkback Consolidation Means 193, in turn, has a port 193I, which is coupled with a Device Monitor 190, which provides supervisory control and operator interface for the system.

The operation of the overall system is as follows. In an example, a report as to the status of each dimmer and its connected load is desired. In conventional system designs, the supervisory means would individually poll each of the serial devices on the data link, consuming considerable time on the data link, and requiring the interaction of the supervisory means and the serial receivers. This is complex under any circumstance, but particularly so when receivers of different manufacturers share a common data link and questions arise as to the interpretation of a complex protocol standard.

By contrast, in the illustrated embodiment, either the operator or an automatic function of Device Monitor 190 enters a "Check Status" request. This results in the formatting of an appropriate control packet, which might comprise the byte "32" repeated ten times or otherwise provided with an error-checking scheme, for injection by Injector 150, Upon the next Break produced by the serial output of console 150, the "32" packet will be inserted into the serial intensity data stream, where it will be distributed to all serial receivers.

Upon receipt of a "32" packet, the minimum number of duplicates or other error-check will be searched for, and, if found, the serial device will undertake its appropriate status check. In the case of controller 715C for a lamp bar, this may include "goosing" the load for one cycle—too fast to produce visible light from the lamp, but sufficient to establish whether one is present. Upon completing its status check, each serial device reports back via its second data link, at the time and pace of its choosing. This Status Report (which may employ the same error-checking scheme and repeat each report several times to allow for corrupted copies) is received and stored by the corresponding Data Buffer 194. The Data Buffers in a given Interface Unit will then indicate receipt of a message to the Device Talkback Consolidation Means 193, which will then poll the Data Buffers 194 to which it is coupled for their contents. These messages, now consolidated, may be readily reported back to the Device Monitor 190 for display or other action via data link 191S. Multiple levels of consolidation may be employed The illustrated embodiment has a number of important advantages. It provides a low-cost, high-speed data link for coupling desired intensity (or other parameter) values to a large number of serial receivers with a minimum of delay and complexity. It allows interleaving control and other specialized communications to serial receivers on the same data link without requiring modification to either the console or to conventional dimmers and similar receivers, such that it can be used with a wide range of unmodified controllers and receivers. It permits those serial receivers capable of acting upon a control message to report status and other data back to the head end asynchronously and in parallel, such that no elaborate interactive multi-user protocol is required; the complexity of neither the transmitters nor the receivers is increased; and very high effective data rates are possible in the "return" side of the system without the use of high-baud rate cabling or components in the distributed portion of the system. As a further result, there is no penalty on system throughput if a given serial device requires a relatively lengthy period for its message, and an aberrant serial device cannot monopolize any more of the system than its own Data Buffer. No significant penalty is imposed by the architecture which is, in fact, ideal for systems in which power and control signals are distributed together.

Interaction is also possible between the disclosed system and other components. For example, Data Management Means 196 may be a "PC" maintaining a known lighting database program that includes descriptions of the type, wattage, color, and focus of each fixture in the system. The Device Monitor 190 may be linked via an RS-232C link 196S with the Data Management Means 196. Similarly, the Device Monitor may be linked with a known serial port on console 150 that provides access to front-panel buttons and data (such as cues and patches) in the console via a serial link 151Y. Further, the Device Monitor 190 may be provided with an input from the serial intensity protocol of console 150 such that it may examine contents of the console output directly. In one example, on depressing the "Goose" button for a given outlet on a lamp bar, a report may be sent via the Data Buffer 194 and Device Talkback Consolidation Means 193 to the Device Monitor 190. The Device Monitor 190 may then query the Data Management Means 196 as to the desired type, wattage, color, and focus of the fixture that has been "goosed", which it reports back to the user via a display, voice synthesizer, or by injecting a message into the serial data stream that results in the display of this data on the LCD display 755L of the controller 715C adjacent to the lamp. In another example, holding the "Goose" button for the dimmer of a fixture depressed for more than three seconds may be understood as a request that all fixtures signal-patched to the same channel be "goosed" as well. After this timeout, a second message is originated by the controller 715C, which is forwarded to Device Monitor 190. If the softpatch is maintained by the console, the Device Monitor 190 may poll the console for the channel assignment of the "goosed" lamp via link 190C, and then by instructing the console 150 (via the front-panel control button-pressing protocol provided on such serial ports) to raise the level of that channel. Patch data can, of course, be downloaded to the serial devices.

The Interface Units may also examine, by means of a suitable connection, transmissions on the serial intensity data link, and may be provided with injectors to permit direct communication with the serial devices connected to them. The Device Monitor 190 may insert data packets with no contents that are used to trigger any pending such injections by the Interface Units.

The disclosed system may also be employed with serial devices other than dimmers.

What is claimed is:

1. A method of operation for a lamp dimmer, said lamp dimmer having an input, comprising the steps of:
   coupling a semiconductor power controlling means for modulating instantaneous voltage or current between an alternating current supply and an output suitable for a lamp load;
   inputting a first value via said input indicating a desired amount of power for said lamp load;
   establishing said semiconductor power controlling means in a substantially conductive power condition not later than the beginning of a half-cycle of the waveform of said alternating current supply, a transition by said semiconductor power controlling means between said substantially conductive and a substantially non-conductive power condition at a first phase angle supplying said desired amount of power to said lamp load;

increasing the duration of said transition at least at said first phase angle to a sufficiently greater duration than the minimum possible said duration less than the remainder of said half-cycle to reduce the electromagnetic interference product of said transition, when said transition would not produce excessive losses in said semiconductor power controlling means; and maintaining said semiconductor power controlling means in said substantially conductive power condition beyond said first phase angle, at least when said transition of greater duration at said first phase angle would cause excessive transition losses in said semiconductor power controlling means.

2. The method of claim 1, including the step of:
determining whether said transition would cause excessive losses in said semiconductor power controlling means.

3. The method of claim 2, wherein a multiple of the maximum current draw of a warmed acceptable lamp load is employed in determining whether said excessive losses would be produced.

4. The method of claim 1, including the step of:
terminating said substantially conductive power condition before excessive conduction losses would be caused in said semiconductor power controlling means.

5. The method of claim 4, including the step of:
determining whether said excessive conduction losses might be caused by referring to a value indicative of the impedance of said lamp load.

6. The method of claim 1, wherein said semiconductor power controlling means is maintained in said substantially conductive power condition, provided excessive conduction losses would not be caused, for at least substantially said entire half-cycle.

7. The method of claim 6, wherein a multiple of the maximum current draw of a warmed acceptable lamp load is referred to in determining whether said excessive conduction losses would be produced.

8. The method of claim 1, wherein a transition is performed in said half-cycle at a phase angle greater than said first phase angle and said transition has a sufficiently greater duration than the minimum possible said duration less than the remainder of said half-cycle to reduce the electromagnetic interference product of said transition.

9. The method of claim 1, including the step of:
determining whether said excessive transition losses might be caused by referring to a value indicative of the impedance of said lamp load.

10. A method of operation for a lamp dimmer, said lamp dimmer having an input, comprising the steps of:
coupling a semiconductor power controlling means for modulating instantaneous voltage or current between an alternating current supply and an output suitable for a lamp load;

inputting a first value via said input indicating a desired amount of power for said lamp load;

determining at least a first phase angle of a half-cycle of the waveform of said alternating current supply at which a transition by said semiconductor power controlling means between one and the other of substantially conductive and substantially non-conductive power conditions would produce said desired amount of power;

increasing the duration of said transition at least at said first phase angle to a sufficiently greater duration than the minimum possible said duration less than the remainder of the half-cycle to reduce the electromagnetic interference product of said transition, when said transition would not produce excessive losses in said semiconductor power controlling means, the possible impedances of the load at said output including low impedances for which there are a range of phase angles at which said transition of greater duration would cause excessive losses in said semiconductor power controlling means;

when the impedance of the load at said output is low enough that said transition of greater duration at said first phase angle may fall within said range of phase angles, increasing the portions of a half-cycle in which said semiconductor power controlling means is in said substantially conductive power condition, relative to said desired amount of power, such that no transition is performed at a phase angle in said range.

11. The method of claim 10, including the step of:
controlling said semiconductor power controlling means to terminate said substantially conductive power condition before excessive conduction losses would be caused in said semiconductor power controlling means.

12. The method of claim 10, wherein a multiple of the maximum current draw of a warmed acceptable lamp load is employed in determining whether said excessive losses would be produced.

13. The method of claim 10, wherein the portion of said half-cycle in which said semiconductor power controlling means is in said substantially conductive power condition is increased, provided conduction losses would not be excessive, to maintain said substantially conductive power condition for substantially all of at least one of said half-cycles.

14. The method of claim 13, wherein a multiple of the maximum current draw of a warmed acceptable lamp load is employed in determining whether said excessive losses would be produced.

15. The method of claim 10, wherein at least one transition at a phase angle outside said range of phase angles is performed in a half-cycle in which said amount of power is increased and that transition has a sufficiently greater duration than the minimum possible duration less than the remainder of said half-cycle to reduce the electromagnetic interference product of said transition.

16. The method of claim 10, including the step of:
determining whether said excessive losses may be produced by referring to a value indicative of the impedance of said load.

17. An electronic dimming apparatus comprising:
semiconductor power controlling means for selectively coupling a lamp load with an alternating current supply and for modulating instantaneous voltage or current, said semiconductor power controlling means having a control input;

means for varying the amount of power supplied to said lamp load over a range of power by controlling the portions of the waveform of said alternating current supply in which said semiconductor power controlling means couples said lamp load with said alternating current supply, said varying means having:

an output coupled with said control input, an input for a first value indicative of a desired amount of power to be supplied to said lamp load, means for determining points at which said semiconductor power controlling means should couple and decouple said lamp load from said alternating current supply in order to supply said desired amount of power, means, coupled with said output, for controlling said semiconductor power controlling means, at least when under load, to gradually transition between one and the other of said coupled and uncoupled conditions, means for relocating said transition under load from a point when the current demand of said lamp load may produce excessive losses in said semiconductor power controlling means, such that, provided that excessive losses would not be produced in said semiconductor power controlling means, an amount of power greater than said desired amount is supplied to said lamp load.

18. The apparatus according to claim 17, in which, during said transition, said semiconductor power controlling means is driven so as to produce a progressive rate of increase in the rate of change in the instantaneous voltage to said lamp load, followed by a progressive decrease in said rate of instantaneous voltage change.

19. A method of operation for a dimmer, said dimmer having an input, comprising the steps of:

coupling a semiconductor power controlling means for modulating instantaneous voltage or current between an alternating current supply and a lamp load, said semiconductor power controlling means having a control input;

inputting a first value via said input identifying a desired amount of power for said lamp load;

determining at least a first phase angle at which a transition by said semiconductor power controlling means between one and the other of substantially conductive and substantially non-conductive power conditions would supply said desired amount of power to said lamp load;

changing the value at said control input of said semiconductor power controlling means to transition said semiconductor power controlling means between one and the other said power condition over a duration greater than the minimum possible duration and less than the remainder of the half-cycle to produce a progressive rate of increase in the rate of change in instantaneous voltage to said lamp load, followed by a progressive decrease in said rate of instantaneous voltage change.

20. A method of operation for a dimmer, said dimmer having an input, comprising the steps of:

coupling a semiconductor power controlling means for modulating instantaneous voltage or current between an alternating current supply and a lamp load, said semiconductor power controlling means having a control input;

inputting a first value via said input identifying a desired amount of power for said lamp load;

determining at least a first phase angle at which a transition by said semiconductor power controlling means between one and the other of substantially conductive and a substantially non-conductive power conditions would supply said desired amount of power to said lamp load;

changing the value at said control input of said semiconductor power controlling means to transition said semiconductor power controlling means between one and the other of said power conditions over a duration greater than the minimum possible duration and less than the remainder of the half-cycle to produce during said transition a substantially minimized second derivative of instantaneous voltage to said lamp load.

* * * * *